United States Patent
Zhang et al.

(10) Patent No.: US 11,080,381 B2
(45) Date of Patent: Aug. 3, 2021

(54) COMPONENT AND USER MANAGEMENT FOR UAV SYSTEMS

(71) Applicant: SZ DJI TECHNOLOGY CO., LTD., Shenzhen (CN)

(72) Inventors: Guofang Zhang, Shenzhen (CN); Yun Yu, Shenzhen (CN); Renli Shi, Shenzhen (CN); Zhicong Huang, Shenzhen (CN); Gang He, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/365,186

(22) Filed: Mar. 26, 2019

(65) Prior Publication Data

US 2019/0278897 A1 Sep. 12, 2019

Related U.S. Application Data

(63) Continuation of application No. PCT/CN2016/100455, filed on Sep. 27, 2016.

(51) Int. Cl.
*H04L 29/06* (2006.01)
*G06F 21/32* (2013.01)
(Continued)

(52) U.S. Cl.
CPC .............. *G06F 21/32* (2013.01); *B64C 39/02* (2013.01); *B64C 39/024* (2013.01);
(Continued)

(58) Field of Classification Search
CPC ......... H04L 9/00; H04W 12/00; G06Q 10/00; G06F 21/32; G06F 21/604; B64C 39/024; G07C 5/008; G08G 5/0013; G08G 5/0069
See application file for complete search history.

(56) References Cited

U.S. PATENT DOCUMENTS 9,113,000 B2 * 8/2015 Havican ................ H04W 4/029
9,154,304 B1 10/2015 Dotan et al.
(Continued)

FOREIGN PATENT DOCUMENTS

CN 102737524 A 10/2012
CN 104283875 A 1/2015
(Continued)

OTHER PUBLICATIONS

World Intellectual Property Organization (WIPO) International Search Report and Written Opinion for PCT/CN2016/100455 dated Jul. 11, 2017 7 Pages.

(Continued)

*Primary Examiner* — Joseph P Hirl
*Assistant Examiner* — Leynna Truvan
(74) *Attorney, Agent, or Firm* — Anova Law Group, PLLC

(57) ABSTRACT

A system for managing an unmanned aerial vehicle (UAV) include one or more storage media storing offline data that comprises verified information associated with a user, an input device configured to receive an input from the user, and one or more processors, individually or collectively configured to determine whether a connection to an online database is established and, if the connection to the database is not established, process the input and the offline data; and manage a flight of the UAV according to the processing of the input and the offline data.

20 Claims, 25 Drawing Sheets

(51) Int. Cl.
  *B64C 39/02* (2006.01)
  *G06F 21/60* (2013.01)
  *G07C 5/00* (2006.01)
  *G08G 5/00* (2006.01)
  *G06Q 10/00* (2012.01)
  *G06Q 50/30* (2012.01)

(52) U.S. Cl.
  CPC .......... *G06F 21/604* (2013.01); *G06Q 10/00* (2013.01); *G06Q 50/30* (2013.01); *G07C 5/008* (2013.01); *G08G 5/0013* (2013.01); *G08G 5/0069* (2013.01)

(56) References Cited

U.S. PATENT DOCUMENTS

| | | | |
|---|---|---|---|
| 9,412,278 | B1 | 8/2016 | Gong et al. |
| 2009/0324105 | A1* | 12/2009 | Tanaka .................. G06K 9/033 382/224 |
| 2010/0241668 | A1 | 9/2010 | Susanto et al. |
| 2013/0127980 | A1* | 5/2013 | Haddick .................. G06F 3/01 348/14.08 |
| 2013/0261949 | A1* | 10/2013 | Eriksson ............. G08G 5/0013 701/300 |
| 2015/0025927 | A1 | 1/2015 | Hershey et al. |

FOREIGN PATENT DOCUMENTS

| | | |
|---|---|---|
| CN | 104932525 A | 9/2015 |
| CN | 105335733 A | 2/2016 |
| CN | 105513434 A | 4/2016 |
| CN | 105518728 A | 4/2016 |
| CN | 105556408 A | 5/2016 |
| CN | 105607645 A | 5/2016 |
| CN | 205229809 U | 5/2016 |
| JP | 2003131929 A | 5/2003 |
| JP | 2013069275 A | 4/2013 |
| WO | 2017013417 A1 | 1/2017 |

OTHER PUBLICATIONS

Yanfeng Xue, Research and Realization of UAV Flight Safety Control System, A Thesis in Test Measurement Technology and Instruments, Nanjing University of Aeronautics and Astronautics, Jun. 2013, China.

Yue Zhao, Integrated Management and Analysis System of Flight Experimental Data for UAV, A Thesis in Navigation, Guidance and Control, Nanjing University of Aeronautics and Astronautics, Mar. 2012, China.

Fan Bao, Research on Autonomous Flight Control and Management Decision Technology of Unmanned Aerial Vehicle, A Thesis in Control Science and Engineering, Nanjing University of Aeronautics and Astronautics, Feb. 2008, China.

\* cited by examiner

COMPONENT AND USER MANAGEMENT FOR UAV SYSTEMS

CROSS-REFERENCE TO RELATED APPLICATION

This application is a continuation of International Application No. PCT/CN2016/100455, filed on Sep. 27, 2016, the entire contents of which are incorporated herein by reference.

BACKGROUND OF THE DISCLOSURE

Unmanned vehicles, such as unmanned aerial vehicles (UAVs) have been developed for use in a variety of fields, including consumer and industry applications. For instance, UAVs may be flown for recreation, photography/videography, surveillance, delivery, or other applications.

Increasingly, not only UAVs but various components utilized in association with the UAVs are becoming prevalent and expanding dimensions of the lives of individuals and industries they are involved with. As their uses are becoming more prevalent however, ability to properly manage UAVs and associated components for various users are becoming increasing concerns.

SUMMARY OF THE DISCLOSURE

Systems and methods described herein improve flight safety of unmanned aerial vehicles (UAVs). Systems and methods may be provided which may aid in registering, managing, and authenticating UAVs and various components (e.g. users, controllers, sensors, etc) utilized with the UAVs. The systems may uniquely identify various components (e.g. UAV, sensors, flight controllers, payloads, controllers, mobile devices, etc) and parties (e.g. users, owners, managers, operators, etc) that are interacting. In some instances, the systems and methods may further aid in registering, managing, and authenticating the UAV and components for various parties, such as users, owners, managers, and operators. For example, the platform may permit individualized management of parameters for the involved UAV and/or components. Personalized flight regulations may be imposed on UAV operation, and may override user manual controls.

Thus, in one aspect, a system for managing an unmanned aerial vehicle (UAV) is provided. The system comprises: one or more storage modules configured to store data received from an online database, wherein the data comprises verified information associated with a user; an input module configured to receive an input from the user; and one or more processors, individually or collectively configured to: determine whether a connection to the database can be established; process the input and the stored data if the connection to the database cannot be established; and manage a flight of the UAV according to the processing of the input and the stored data.

In another aspect, a method for managing an unmanned aerial vehicle (UAV) is provided. The method comprises: storing, at one or more storage modules, data received from an online database, wherein the data comprises verified information associated with a user; receiving, at an input module, an input from the user; with aid of one or more processors, individual or collectively, determining whether a connection to the database can be established; processing the input and the stored data if the connection to the database cannot be established; and managing a flight of the UAV according to the processing of the input and the stored data.

In another aspect, a non-transitory computer readable medium for managing an unmanned aerial vehicle (UAV) is provided. The computer readable medium comprising code, logic, or instructions to: store, at one or more storage modules, data received from an online database, wherein the data comprises verified information associated with a user; receive, at an input module, an input from the user; with aid of one or more processors, individual or collectively, determine whether a connection to the database can be established; process the input and the stored data if the connection to the database cannot be established; and manage a flight of the UAV according to the processing of the input and the stored data.

In another aspect, a system for restricting an unmanned aerial vehicle (UAV) for a user is provided. The system comprises: one or more receivers configured to receive data from a database comprising verified information associated with a user of the UAV; an input module configured to receive an input from an operator of the UAV; and one or more processors, individually or collectively, configured to: process, according to a predetermined criterion, whether the input is consistent with the data; and impose a restriction on the UAV when the processing deviates from said predetermined criterion, wherein a degree of restriction on the UAV is correlated with a degree of deviation from the predetermined criterion.

In another aspect, a method for restricting an unmanned aerial vehicle (UAV) for a user is provided. The method comprises: receiving, at an input module, an input from an operator of the UAV; with aid of one or more processors, individual or collectively, processing, according to a predetermined criterion, whether the input is consistent with data from a database received at one or more receivers, wherein the data comprises verified information associated with a user of the UAV; and imposing a restriction on the UAV when the processing deviate from said predetermined criterion, wherein a degree of restriction on the UAV is correlated with a degree of deviation from the predetermined criterion.

In another aspect, a non-transitory computer readable medium for restricting an unmanned aerial vehicle (UAV) is provided. The computer readable medium comprises code, logic, or instructions to: receive, at an input module, an input from an operator of the UAV; with aid of one or more processors, individual or collectively, process, according to a predetermined criterion, whether the input is consistent with data from a database received at one or more receivers, wherein the data comprises verified information associated with a user of the UAV; and impose a restriction on the UAV when the processing deviate from said predetermined criterion, wherein a degree of restriction on the UAV is correlated with a degree of deviation from the predetermined criterion.

In another aspect, a system for managing a component utilized in operation of an unmanned aerial vehicle (UAV) is provided. The system comprises: one or more processors, individually or collectively configured to: receive data regarding an input received from a user at a user interface, wherein the input designates an operational parameter for the component for a registered operator of the UAV; process the data; and impose the operational parameter for the component specifically to the registered operator of the UAV.

In another aspect, a method for managing a component utilized in operation of an unmanned aerial vehicle (UAV) is provided. The method comprises: with aid of one or more processors, individually or collectively, receiving data regarding an input received from a user at a user interface, wherein the input designates an operational parameter for the component for a registered operator of the UAV; processing the data; and imposing the operational parameter for the component to the registered operator of the UAV.

In another aspect, a non-transitory computer readable medium for managing a component utilized in operation of an unmanned aerial vehicle (UAV) is provided. The computer readable medium comprises code, logic, or instructions to: with aid of one or more processors, individually or collectively, receive data regarding an input received from a user at a user interface, wherein the input designates an operational parameter for the component for a registered operator of the UAV; process the data; and impose the operational parameter for the component to the registered operator of the UAV.

In another aspect, a system for managing an unmanned aerial vehicle (UAV) is provided. The system comprises: a first component utilized in operation of the UAV, the first component having a first identity and configured to communicate data with a second component having a second identity, wherein the data comprises information regarding the first identity and the second identity; one or more processors, individually or collectively, configured to: process a consistency between the first identity and the second identity; and manage a flight of the UAV according to the processing.

In another aspect, a method for managing an unmanned aerial vehicle (UAV) is provided. The method comprises: communicating data between a first component having a first identity and a second component having a second identity, wherein the data comprises information regarding the first identity and the second identity, and wherein each of the first component and the second component is utilized in operation of the UAV; with aid of one or more processors, individually or collectively, processing a consistency between the first identity and the second identity; and managing a flight of the UAV according to the processing.

In another aspect, a non-transitory computer readable medium for managing an unmanned aerial vehicle (UAV) for a user is provided. The computer readable medium comprises code, logic, or instructions to: communicate data between a first component having a first identity and a second component having a second identity, wherein the data comprises information regarding the first identity and the second identity, and wherein each of the first component and the second component are utilized in operation of the UAV; with aid of one or more processors, individually or collectively, process a consistency between the first identity and the second identity; and manage a flight of the UAV according to the processing.

In another aspect, a system for supporting unmanned aerial vehicle (UAV) workflow management for a user is provided. The system comprises: one or more receivers configured to receive a trigger information for the UAV; one or more processors, individually or collectively configured to, process the trigger information; select a workflow from a plurality of workflows based on the processed trigger information, wherein the workflow determines a process by which the user registers, authenticates, and/or manages the UAV; provide the workflow to the user.

In another aspect, a method for supporting unmanned aerial vehicle (UAV) workflow management for a user is provided. The method comprises: receiving, at one or more receivers, a trigger information for the UAV; with aid of one or more processors, individually or collectively, processing the trigger information; selecting a workflow from a plurality of workflows based on the processed trigger information, wherein the workflow determines a process by which the user registers, authenticates, and/or manages the UAV; providing the workflow to the user.

In another aspect, a non-transitory computer readable medium for supporting unmanned aerial vehicle (UAV) workflow management for a user is provided. The computer readable medium comprises code, logic, or instructions to: receive, at one or more receivers, a trigger information for the UAV; with aid of one or more processors, individually or collectively, process the trigger information; select a workflow from a plurality of workflows based on the processed trigger information, wherein the workflow determines a process by which the user registers, authenticates, and/or manages the UAV; provide the workflow to the user.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

Figure 1:
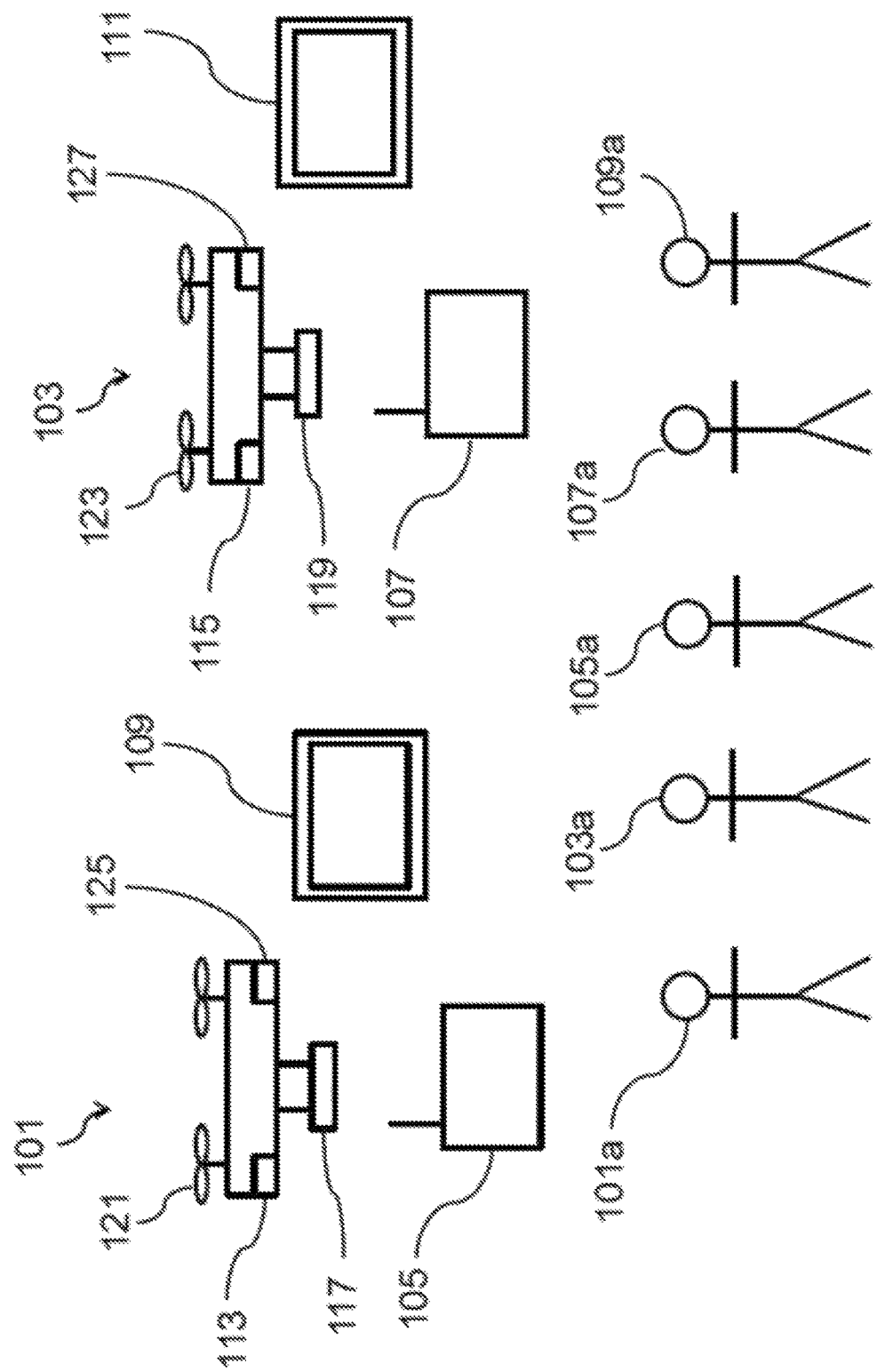
FIG. 1 shows an example of various components and parties that may be involved in operation of one or more UAVs, in accordance with embodiments.

Unmanned vehicles, such as unmanned aerial vehicles (UAVs) may be operated in accordance with a safety system for improving flight safety the unmanned vehicles. Any description herein of UAVs may apply to any type of unmanned vehicle (e.g., air-based vehicles, land-based vehicles, water-based vehicles, or space-based vehicles). Flight control and authentication systems and methods may be provided which may aid in monitoring and controlling UAV usage. The systems may uniquely identify various components and/or parties that are interacting (e.g., owners, managers, users, operators, remote controllers, UAVs, sensors, other UAV components, geo-fencing devices, etc). In some instances, an authentication process may occur and only authorized parties may be permitted to operate the UAV or various associated components. Flight regulations, also referred to herein as flight restrictions, may be imposed on UAV operation, and may override user manual controls.

Flight safety challenges during use of UAVs may arise in a number of different forms. For example, the flight of UAVs may not be restricted (e.g., UAVs may fly over somewhere it should be prohibited). For instance, UAVs may fly to sensitive areas without authorization, (e.g., airport, military base). Furthermore, UAVs may fly into the course of other aircrafts without authorization. UAVs may fly to the territory of enterprise or individuals without authorization, causing noise pollution, personal injury and property damage. In some instances, UAVs may fly to a public area without authorization, and may cause personal injury and property damage. Where flight is restricted, the restriction may be globally based, e.g. on geography, temporal considerations, and/or based on activity. In some instances, continued connectivity (e.g. internet connectivity) may be required for authenticating UAVs and/or users. Systems and methods provided herein may provide a set of flight regulations which may impose the necessary restrictions on the UAVs, which may be component based and or user specific. A UAV may automatically comply with the flight regulations without requiring input from a user. In some instances, controls may be generated for the UAV based on flight regulations that may override manual input from a user.

A platform may be provided for managing information regarding the various parties and components that are interacting. The platform may provide an avenue in which relevant parties (e.g. owners, designated managers, manufacturers, authorities, etc) may define a relationship between the various components that are interacting. As one example, the platform may provide an avenue to designate an operator of a UAV (or component) and further designate a permission parameter for the given UAV (or component) specific for the operator.

The platform may address various challenges to ensuring accountability and proper management of UAV components for various involved parties. For example, as UAVs become utilized in all aspects of life by various industries, use of UAV may involve more than a single party or individual. Collaborative projects are becoming more commonplace where different components owned or managed by different parties are utilized in conjunction to undertake novel applications. Accordingly, the platform may provide an avenue for designating temporary or permanent operators of UAV and its components and an appropriate permission parameter as deemed by an owner or manager of the UAV (or component). As another example, an owner or manager of a UAV (or a specific component) may desire to impose different permission parameters for different registered operators such as friends, family, client, etc, and the platform may provide an avenue for doing so.

The platform may further be utilized in registering the relevant UAV components and/or the various parties involved and/or authenticating them for proper usage. In some instances, a relevant work flow may be determined (e.g. automatically) for a given user based on a trigger information. The trigger information may be utilized in providing a relevant workflow for registering, managing, and/or authenticating various components and parties involved in flight of the UAV and may advantageously allow the platform to be utilized by differing jurisdictions which may have different requirement for the registration, management, and authentication processes.

In some instances, matching of the various components involved in flight of the UAV may be required. For example, the each of the UAV components may comprise an identity. Optionally, the identities may be registered to be utilized in concert with one another, e.g. on the platform. A matching of identities of the UAV components may be required for flight of the UAV. Advantageously, matching of the UAV components may ensure that the UAV or components are not improperly utilized in a way that is not envisioned by owners or managers of the components. In some instances, matching of the UAV components may ensure that improper components are not utilized in flight of the UAV which may jeopardize a flight of the UAV. In some instances, the matching of identities may allow an unrestricted flight. Optionally, inability to match identities of the components may restrict (e.g. prevent, limit, etc) a flight of the UAV and/or restrict a use of the components whose identity cannot be matched or verified.

In some instances, authentication of the UAV or its components may be required. The authentication may involve comparing a user input to registered information (e.g. in a database, registered via the platform, etc). Authentication may in some instances allow the UAV or its components to operate within designated permission parameters personalized for the operator of the UAV at a given point in time. For example, the input may be verified (e.g. matched) with registered information which may be associated with permission parameters for the user of the input. In some instances, such authentication may be required according to predetermined criteria to enhance safe flight and accountability of the UAV flight. The predetermined criteria may be based on temporal, location based, or optionally may be user configured. For example, flight safety may be increased by requiring a scheduled connection such that UAV components and the parties involved in operation of the UAV may be verified or authenticated.

Optionally, deviation from the predetermined criteria may be associated with restriction on flight or restriction on operational parameters for the UAV or components. In some instances, a degree of restriction may be correlated with a degree of deviation from the predetermined criteria. For example, if authentication is supposed to happen at set intervals but does not happen, a small restriction on an operational parameter of the UAV may be imposed but for continued lack of authentication, the restriction may increase until the UAV is grounded or reported to a relevant authority.

Authentication as referred above may require a connection to a database. In some instances, ensuring safe flight and accountability may be desired where no connection can be established. Accordingly, an offline process for authentication may be provided. Identity information (e.g. registered information on the database, etc) may be stored and compared or verified against a user input. Utilizing an offline authentication process, a region in which the UAV may operate in while ensuring safe flight and accountability may be maximized.

Systems and methods provided herein may monitor usage, which may ensure proper operation of the UAV and/or aid in identifying when misuse of a UAV is occurring. The data may also be used to forensically track the parties involved in the misuse or any related data. In some instances, flight data may be recorded and may be uploaded to relevant databases. Optionally, the upload may be compulsory and may ensure reliability and integrity of flight history data. Systems and methods may also be provided that may warn a user or other entity when misuse is occurring and/or override any controls that enable misuse.

System Overview

FIG. 1 shows an example of various components and parties that may be involved in operation of one or more UAVs, in accordance with embodiments. Components as used herein may refer to any component discrete, or integrated with other components, that are utilized in operation of a UAV. The components may also be referred to as UAV components. A component may include, but are not limited to, UAVs 101, 103, manual controllers 105, 107, mobile devices 109, 111, sensors 113, 115, payloads 117, 119, propulsion units 121, 123, and/or any other components 125, 127 (e.g. memory, battery, processing modules, user input modules, storage modules, etc). Herein, manual controllers and mobile devices may collectively be referred to as remote controllers. Parties as used herein may refer to any individual or individuals involved in operation of the UAV. The parties may comprise users 101a, 103a, 105a, 107a, 109a of the components such as owners, managers (e.g. designated managers), or operators of the components. The operators of the components may be registered (e.g. authorized) operators. In some instances, the operators of the components may be unregistered or unauthorized operators. Optionally, the parties may include control entities or such as governmental entities, flight control managers, etc that are directly or indirectly involved in operation of the UAV.

Components may be associated with UAVs, such as UAVs 101, 103. The components may be associated with a single UAV. Alternatively, the components may be associated with 2, 3, 4, 5, 6, 7, 8, 9, 10, 12, 15, 20, 30, 40, 50, 100 or more different UAVs. For example, the controller 105 may be registered for use with UAV 101. Alternatively or in addition, the controller 105 may be registered for use with UAV 103. Accordingly, a single remote controller (e.g. manual controller, mobile device, or both) may be utilized to operate two or more UAVs. In other instances, two or more controller may be utilized to operate a single UAV. Each of the different UAV components may comprise different users, or owners. Optionally, some, or all of the different UAV components utilized in operation of the UAV may comprise a single user, or owner.

A user 101a, 103a, 105a, 107a, 109a may be an individual associated with a UAV. The user may be a human operator. The user may be an adult or a child. In some instances, the user may have an authority level for a component. Differing authority levels may be provided for different users. Different authority levels may be provided for different users, for different components. As one example, two authority levels may be provided for users. For example, a user may be a high level user or a low level user. In some instances, a high level user may have unrestricted access or use of the component. Optionally, the high level user may have unrestricted access or use of the component subject to external factors such as restrictions imposed by relevant authorities, geofencing devices, flight control towers, etc.

In some instances, the high level user may designate a desired restriction or permission parameter for low level users, or for themselves. For example, the high level user may designate a desired restriction or permission parameter on him or herself, or on a low level user. The permission parameter relate to any restriction or flight regulation described throughout. For example, the permission parameter may relate to a flight time of a UAV, a flight area of a UAV, a flight altitude, a flight speed or acceleration, etc of a UAV that is permitted. In some instances, the permission parameter may relate to various other UAV components. For example, the permission parameter may relate to an operational parameter of a payload or sensor operably coupled to the UAV. Accordingly, the low level user may have an equal or more limited access or use of the given component as compared to the high level user. Optionally, the low level user may have greater access or use of the UAV component, e.g. if the first level user designates as such.

The low level user may be prevented from operating outside a scope of permission designated by the high level user. In some instances, a warning signal may be provided to a high level user if the low level user operates, or attempts to operate outside the scope of permission granted by the high level user. Optionally, a high level user may be permitted to monitor UAV component usage by the low level user(s). For example, a platform may be provided for recording UAV component usage, e.g. by the low level user that may be monitored by high level users.

In some instances, users of differing authority levels may comprise a hierarchy in operating a UAV. For example, the high level user may be able to takeover control from a low level user. A higher authority level may be indicative of a priority in which a user may operate a vehicle. For instance, a user at a higher operational level may have priority over a user at a lower operational level in operating a UAV. The user at the higher authority level may be able to take over control of the UAV from a user at a lower authority level. Operation of a UAV may be taken over by the second user from the first user, when the second user is authorized to operate the UV and is of a higher operational level than the first user.

In some instances, users of differing authority levels may comprise a hierarchy in being alerted of the operation of a UAV. For example, high level user may be alerted when low level users are operating a UAV. The high level user may be notified when the low level user takes over control. For instance, an alert or message may be provided to the high level user. The alert or message may be provided via a remote controller of the high level user. The alert may be visibly displayed, or may be audible or tactilely discernible. In some embodiments, a low level user may make a request to take over control of the UAV from the high level user. The high level user may choose to accept or deny the request. Alternatively, the low level user may be able to take over control without requiring acceptance or permission from the high level user. In some embodiments, there may be some lag time between when the high level user is alerted that the low level user is taking over control and when the low level user takes over control. Alternatively, little or no lag time is provided, so that the low level user may be able to take over instantaneously. A low level user may be able to take over control within less than 1 minute, 30 seconds, 15 seconds, 10 seconds, 5 seconds, 3 seconds, 2 seconds, 1 second, 0.5 seconds, 0.1 seconds, 0.05 seconds, or 0.01 seconds of making the attempt to take over control.

In some instances, multiple different authority levels may be provided. One, two, three, four, five, six, seven, right, nine, ten, or more different authority levels may be provided. For example, at least three different authority levels may be provided. The three different authority levels may comprise an owner of the component, a manager of the component (e.g. designated or registered manager), and an operator of the component (e.g. designated or registered operator).

The owner may be an owner of the component. For example, the owner may have purchased the component. In some instances, the owner may hold legal title to the component. In some instances, the owner may be registered as an owner of the component. For example, the owner may register ownership of the component at relevant databases via a platform as further described below. The owner may or may not be an operator of the component. The owner may comprise ability or authority to further designate or confirm managers or operators of the component. The owner may further comprise ability or authority to designate or confirm an operational parameter for the component for a given manager or operator. In some instances, the owner may comprise ability or authority to delegate or confirm managerial authority. For example, the owner may comprise ability to delegate or confirm managerial authority to managers such that the managers can further designate or verify operators of the component. Optionally, the owner may delegate authority to the managers such that the managers can designate or confirm a permission parameter for the component for an operator.

The manager may be a registered manager, e.g. for a UAV or UAV component(s). In some instances, the manager may be designated, or appointed by the owner of the component. Optionally, the manager may apply to manage the component and may be confirmed by the owner. The manager may or may not be an operator of the UAV component. The manager may comprise ability or authority to designate or confirm operators of the component. Alternatively or in addition, the manager may comprise ability or authority to designate or confirm an operational parameter for a component for a given operator.

The user may be an operator of a UAV component. The user may be an individual that is authorized to operate the component, such as a UAV. For example, the operator may be a registered operator of the component and optionally may be authorized to operate the UAV. The operator may provide input to control the UAV. An operator may provide input to control the component. In some instances, the operator may provide input to control the component with a remote controller. An operator may provide an input configured to control flight of the UAV, operation of a payload of a UAV, a state of a payload relative to the UAV, operation of one or more sensors of the UAV, operation of UAV communication, or other functions related to the UAV. The operator may or may not have line-of-sight with the component while operating the UAV. The operator may directly communicate with the component using the remote controller. Alternatively, the operator may indirectly communicate with the component (optionally, using the remote controller) over a network.

In some instances, different authority levels may exist in parallel and may not follow a hierarchy as described above. For example, a user may be an administrator. The administrator may be an administrator of identity registration, authentication and management for UAV components and/or users (e.g. other users). The administrator may include administrators designated by relevant jurisdictional authorities (e.g. nations, states, etc) and/or administrators from a UAV manufacturer. The administrators from may be able to configure requirements regarding identity registration, authentication, and/or management as described elsewhere. For example, the administrator may be capable of setting a format requirement of the identity information that is required, a process for authentication and/or registration, etc.

Differing authority levels may be provided for administrators and each administrator may comprise an identity. Accordingly, identities and permission levels of administrators may be managed (e.g. by higher level administrators). In some instances, the permission levels of administrators may relate to a control region of the administrators, validity period of the administrators, etc. In some instances, an administrator having higher level permissions may designate the permissions of those administrators having lower level permissions within his or her region. In some instances, communication in the identity registration, authentication and management system may be encrypted. Those administrators having higher level permissions may be subjected to a higher level of information security. Administrators having both authentication and identity management capacities may not have permission to fly a UAV.

A user may receive data from the UAV. Data acquired using one or more sensors of the UAV may be provided to the user, optionally via the remote controller. In some instances, the data may comprise flight data, or data related to an identity of the users or UAV components. Optionally, the data may be provided depending on an authority level. For example, the data may be provided to higher authority level users, e.g. when UAV components are operated by lower authority level users. In some instances, the data may be observable on remote controllers, or other forms of user interfaces (e.g. computers). In some instances, the data may be accessible via a platform as further described elsewhere.

Users

A user may have a user identifier (e.g., USER ID1, USER ID2, USER ID3, . . . ) that identifies the user. The user identifier may be unique to the user. Other users may have different identifiers from user. A user identifier may uniquely differentiate and/or distinguish the user from other individuals. In some instances, a user identifier may uniquely differentiate and/or distinguish the user from other individuals for specific UAV components. Each user may only be assigned a single user identifier. Alternatively, a user may be able to register multiple user identifiers. In some instances, a single user identifier may be assigned to only a single user. Alternatively, a single user identifier may be shared by multiple users.

Optionally, a user may be authenticated as being an authorized user for the user identifier. An authentication process may include a verification of the user's identity. An authentication process may include matching a registered information regarding the user to a user input. The authentication process may be utilized to impose a relevant operational parameter (e.g. restriction) for the user based on the user input. Examples of authentication processes are described in greater detail elsewhere herein.

UAV Components

A UAV system may comprise various UAV components. The UAV components may include, but are not limited to, UAVs, manual controllers, mobile devices, sensors, payloads, propulsion units, and/or any other components such as memory, battery, processing modules, user input modules, storage modules, etc. Exemplary UAV components are described below.

The UAV 101, 103 may be operable when powered on. The UAV may be in flight, or may be in a landed state. Various components may be utilized in operation of the UAV. For example, the UAV may collect data using one or more sensors (optionally, the payload may be a sensor). As another example, controllers may be utilized to affect operation of the UAV, and the UAV may operate in response to controls from the user (e.g., manually through a remote controller), autonomously (e.g., without requiring user input), or semi-autonomously (e.g., may include some user input but may also include aspects that do not rely on user input). As described above, any and all components involved in operation of the UAV may be referred to as a component, or UAV component. Components may include, but are not limited to, UAVs, sensors, flight controllers, payloads, remote controllers (e.g. manual controllers, mobile devices, etc), memory devices, batteries, propulsion mechanisms, modular add on units, etc.

The UAV may be capable of responding to commands from a remote controller including manual controllers 105, 107 and mobile devices 109, 111. The remote controller may be not connected to the UAV. In some instances, the remote controller may communicate with the UAV wirelessly from a distance. The remote controller may accept and/or detect user input. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters. The UAV may switch between being operated manually, autonomously, and/or semi-autonomously. In some instances, the activities of the UAV may be governed by one or more sets of flight regulations.

A remote controller may be any type of device. The device may comprise computers (e.g., personal computer, laptop computer, server), mobile devices (e.g., smartphone, cellular phone, tablet, personal digital assistant), manual controller (e.g. controller with control sticks), or any other type of device. The device may be a network device capable of communicating over a network. The device comprise one or more memory storage units which may include non-transitory computer readable medium which may store code, logic or instructions for performing one or more steps described elsewhere herein. The device may include one or more processors that may individually or collectively execute one or more steps in accordance with the code, logic, or instructions of the non-transitory computer readable medium as described herein. The remote controller may be handheld. The remote controller may accept inputs from a user via any user interactive mechanism. In one example, the device may have a touchscreen that may register a user input when the user touches the screen, or swipes the screen. The device may have any other type user interactive component, such as a button, mouse, joystick, trackball, touchpad, pen, inertial sensors, image capturing device, motion capture device, or microphone. The device may sense when the device is tilted, which may affect operation of the UAV. The remote controller may be a single piece configured to perform the various functions of the remote controller described elsewhere herein. Alternatively, the remote controller may be provided as multiple pieces or components that may individually or collectively perform the various functions of the remote controller as provided elsewhere herein. For example, the remote controller may comprise both a manual controller and a mobile device.

The remote controller may comprise a display device. The device may be a user terminal viewable by the user. The user terminal may also function as a remote controller that may send one or more operational commands to a UAV. Examples of operations of the UAV that may be controlled by the user may include flight, payload operation, payload positioning, carrier operation, sensor operation, wireless communication, navigation, power usage, item delivery, or any other operation of the UAV. Images from the camera may be provided to the user terminal, or data from any other sensor may be provided to the user terminal.

The display device may include a screen or other type of display. The screen may be an LCD screen, CRT screen, plasma screen, LED screen, touchscreen, and/or may use any other technique to display information known or displayed later in the art.

The UAV may utilize one or more sensors. In some instances, the sensors may be sensors integrated with the UAV. Alternatively or in addition, the UAV may comprise sensors that can be attached, detached, and/or reattached. The UAV may comprise one or more vision sensors such as an image sensor. For example, an image sensor may be a monocular camera, stereo vision camera, radar, sonar, or an infrared camera. The UAV may further comprise other sensors that may be used to determine a location of the UAV, such as global positioning system (GPS) sensors, Beidou sensors, Galileo sensors, inertial sensors which may be used as part of or separately from an inertial measurement unit (IMU) (e.g., accelerometers, gyroscopes, magnetometers), lidar, ultrasonic sensors, acoustic sensors, WiFi sensors. Various examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors.

Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). The sensors onboard or off board the UAV may collect information such as location of the UAV, location of other objects, orientation of the UAV, or environmental information. A single sensor may be able to collect a complete set of information in an environment or a group of sensors may work together to collect a complete set of information in an environment. Sensors may be used for mapping of a location, navigation between locations, detection of obstacles, or detection of a target. Sensors may be used for surveillance of an environment or a subject of interest. Sensors may be used to recognize a target object. The target object may be distinguished from other objects in the environment.

The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality or rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The UAV shown may have a plurality of rotors. The rotors may connect to the body of the UAV which may comprise a control unit, one or more sensors, processor, and a power source. The sensors may include vision sensors and/or other sensors that may collect information about the UAV environment. The information from the sensors may be used to determine a location of the UAV. The rotors may be connected to the body via one or more arms or extensions that may branch from a central portion of the body. For example, one or more arms may extend radially from a central body of the UAV, and may have rotors at or near the ends of the arms. In another example, the UAV may include one or more arms that may include one or more additional support members, which may have one, two, three or more rotors attached thereon. For example, T-bar configurations may be used to support rotors.

A vertical position and/or velocity of the UAV may be controlled by maintaining and/or adjusting output to one or more propulsion units of the UAV. For example, increasing the speed of rotation of one or more rotors of the UAV may aid in causing the UAV to increase in altitude or increase in altitude at a faster rate. Increasing the speed of rotation of the one or more rotors may increase the thrust of the rotors. Decreasing the speed of rotation of one or more rotors of the UAV may aid in causing the UAV to decrease in altitude or decrease in altitude at a faster rate. Decreasing the speed of rotation of the one or more rotors may decrease the thrust of the one or more rotors. When a UAV is taking off, the output may be provided to the propulsion units may be increased from its previous landed state. When the UAV is landing, the output provided to the propulsion units may be decreased from its previous flight state. The UAV may be configured to take off and/or land in a substantially vertical manner.

A lateral position and/or velocity of the UAV may be controlled by maintaining and/or adjusting output to one or more propulsion units of the UAV. The altitude of the UAV and the speed of rotation of one or more rotors of the UAV may affect the lateral movement of the UAV. For example, the UAV may be tilted in a particular direction to move in that direction and the speed of the rotors of the UAV may affect the speed of the lateral movement and/or trajectory of movement. Lateral position and/or velocity of the UAV may be controlled by varying or maintaining the speed of rotation of one or more rotors of the UAV.

The UAV may be of small dimensions. The UAV may be capable of being lifted and/or carried by a human. The UAV may be capable of being carried by a human in one hand.

The UAV may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein.

The UAV may be lightweight. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 g, 80 g, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

Other various UAV components are further described elsewhere. Each UAV component may have a corresponding identifier. For example, a UAV may comprise a UAV identifier (e.g., UAV ID1, UAV ID2, UAV ID3, . . . ) that identifies the UAV. The UAV identifier may be unique to the UAV. Other UAVs may have different identifiers from the UAV. A UAV identifier may uniquely differentiate and/or distinguish the UAV from other UAVs. Each UAV only be assigned a single UAV identifier. Alternatively, multiple UAV identifiers may be registered for a single UAV. In some instances, a single UAV identifier may be assigned to only a single UAV. Alternatively, a single UAV identifier may be shared by multiple UAVs. In preferable embodiments a one-to-one correspondence may be provided between a UAV and a corresponding UAV identifier.

In some embodiments, a remote controller may have a remote controller identifier that identifies the remote controller. The remote controller identifier may be unique to the remote controller. Other remote controllers may have different identifiers from the remote controller. In some instances, manual controllers and mobile devices may have different identifiers. A remote controller identifier may uniquely differentiate and/or distinguish the remote controller from other remote controllers. Each remote controller may only be assigned a single remote controller identifier. Alternatively, multiple remote controller identifiers may be registered for a single remote controller. In some instances, a single remote controller identifier may be assigned to only a single remote controller. Alternatively, a single remote controller identifier may be shared by multiple remote controllers. In preferable embodiments a one-to-one correspondence may be provided between a remote controller and a corresponding remote controller identifier. Remote controller identifiers may or may not be associated with a corresponding user identifier.

While UAV identifiers, remote controller identifiers are primarily described above, it is to be understood that the description with respect to UAV identifiers and remote controller identifiers may be applicable to any component referred to herein. Optionally, a component may be authenticated as being an authorized for use with other components or with a UAV, e.g. via the component identifier. An authentication process may include a verification of the component's identity. An authentication process may include matching a registered information regarding the component to a user input. The authentication process may impose a relevant operational parameter on the component according to the user input. Examples of authentication processes are described in greater detail elsewhere herein.

Relationship between UAV Components and Users

In some instances, a relationship between the various components may exist. For example, payload 117 may be configured to be operable with UAV 101 but not with UAV 103. Alternatively, payload 117 may be configured to be operable with both UAVs 101 and 103. As another example, UAV 103 may be configured to be operable with both manual controllers 105 and 107. In some instances, a relationship between the components may be verified (e.g. identities matched) before operation is permitted. The relationship between the different components may be registered, e.g. on a database as further described herein.

In some instances, a user may be an operator of a specific component utilized in operation of the UAV. For example, user 101*a* may be an operator of payload 117 but not UAV 101. As another example, user 101*a* may be an operator of manual controller 105 that can be utilized to control UAV 101 but may not be an operator of mobile device 109 associated with the UAV. In some instances, a component may have a plurality of different operators. For example, UAV 103 may be configured to be operated by operators 101*a*, 103*a*, 105*a*. Optionally, the component may comprise different operational parameters, or permissions parameters, for different operators. For instance, a first operator 101*a* may have no restriction on operation of UAV 103. A second operator 103*a* may have a temporal restriction (e.g. how long they can fly the UAV) on operation of UAV 103. A third operator 105*a* may have an altitude and speed restriction on operation of UAV 103. The operational parameters of the components may be designated by a relevant party or user.

Each user may operate a UAV component. The users may be registered (e.g. pre-registered) with the component so that only an authorized, or registered user can control a corresponding component. The component may be registered (e.g. pre-registered) so users can only control the authorized or registered components. The relationship and/or association between the user and UAV components may be registered (e.g. in a database) in some instances. Optionally, the relationship and/or association between components and/or user mays be stored in database. The user identifier may be associated with the corresponding component identifier. Optionally, operational parameters or permission parameters for the component specific to the user may be stored in the database.

The identities of the device or parties involved in the operation of the UAV may be authenticated. For example an identity of the user may be authenticated. The user may be verified as the user associated with the user identifier. The identity of the component may be authenticated. The component may be verified as the component associated with the component identifier. The component may be verified as a component associated with the user identifier. The user may be verified as the user associated with the component identifier.

Database

Figure 2:
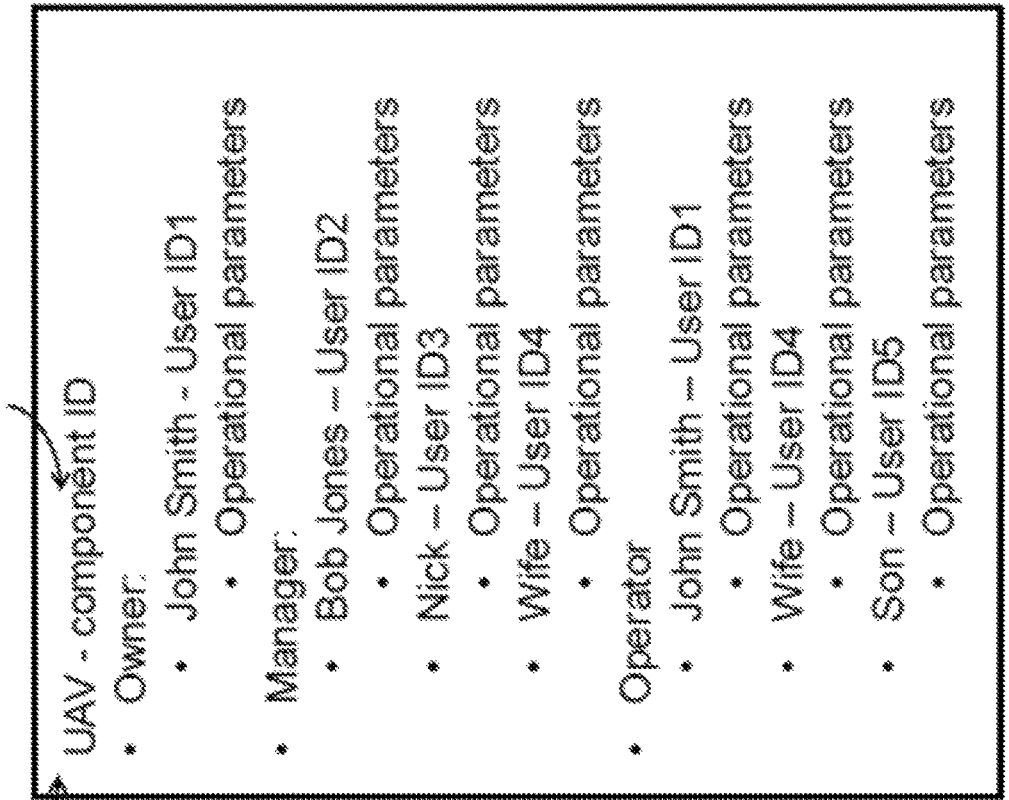
FIG. 2 shows an example of information contained in a database regarding a component, in accordance with embodiments.

As described above, a variety of information regarding UAV components and or users, including identity information and/or permission information (e.g. operational parameters) are utilized in the present disclosure. In some instances, the aforementioned information may be registered or recorded. In some instances, the information may be stored in a database. FIG. 2 shows an example of information contained in a database regarding a component, in accordance with embodiments. While the component illustrated shows a UAV, it is to be understood that the figure may be illustrative of information contained in a database regarding any other component described herein.

The database may be an online database. In some instances, the database may be provided as a cloud based database. Optionally, the database may be provided through a cloud based server. The database may be provided by a manufacturer of a UAV. Alternatively or in addition, databases may be provided by a relevant jurisdictional authority, e.g. countries, states, cities, precincts, etc. Optionally, the database may be provided by an involved third party, e.g. service provider. The database may be managed by a relevant authority, such as a UAV manufacturer, jurisdictional authority, etc. The database may be accessed via browser that may permit a user to access the database, or relevant components of the database. In some instances, the database may be accessed via application that may permit a user to access the database, or relevant parts of the database. In some instances, a platform may be provided for accessing or managing information contained within the database.

The database may maintain identity information for users and UAV components. In some instances, the database may assign an identifier to each user, also referred to as a user ID. The database may assign an identity to each UAV component, also referred to as a component ID, or UAV component ID. Each identifier may or may not be unique. The identifiers may optionally be a randomly generated alphanumeric string. The identifier may be generated in some instances via any other process that may identify a user from other users, or a component from other components. The identifier may be generated by the database or may be selected from a list of possible identifiers that remain unassigned. The identifiers may be used to authenticate the user, or components. The identifiers may be used to verify a relationship between UAV components and/or users. The database may or may not interact with one or more users, or one or more components.

The database may comprise information regarding the component 201. For example, the database may comprise information regarding the component's ID 203. In some instances, the component ID may be pre-existing within the database. Optionally, the component ID may be registered in the database. The database may comprise information regarding users. In some instances, the database may comprise information regarding relevant users of the component. For example, the database may comprise information regarding user IDs of the users. The database may comprise information regarding users and their authority levels. For example, the database may comprise information regarding the users and their corresponding authority levels. While users are designated into three different authority levels (e.g. owner, manager, and operator) in FIG. 2, it is to be understood that any number of different authority levels may be provided.

Optionally, the database may comprise information regarding permission levels. In some instances, the database may comprise operational parameters for the component, for a user. The designated operational parameter may restrict use of the component. The designated operational parameter may restrict use of the component's full capabilities. In some instances, the operational parameter may be binary. For example, the operational parameter for a given component may be "operable" or "inoperable." Accordingly, a component may be configured to be operable by a user or inoperable by the user. Alternatively, the designated operational parameter may comprise a plurality, or even infinite number of possible states. For example, for a UAV, the operational parameter may comprise any restriction or flight regulation that may be imposed on the UAV which are substantially described elsewhere.

For example, an operational parameter for "Wife—User ID4" may be to fly at an altitude below the altitude the UAV is capable of flying at. As another example, an operational parameter for "Son—User ID5" may be to only operate the UAV for a certain amount of time within a given time period. In some instances, the amount of time may be less than or equal to about 5 minutes, 10 minutes, 20 minutes, 30 minutes, 45 minutes, 1 hour, 2 hours, 3 hours, 6 hours, 12 hours, 1 day, 1 week, 2 weeks, or 1 month. In some instances, the given time period may be less than or equal to about 30 minutes, 1 hour, 2 hours, 3 hours, 6 hours, 12 hours, 1 day, 1 week, 2 weeks, 1 month, 3 months, 6 months, or 1 year. Multiple operational parameters may be associated with a given component, for a given user. For example, "John Smith—User IDU" may comprise operational parameters that require the UAV to fly below certain speeds below its capabilities and which requires the UAV to be flown within certain designated areas.

Figure 3:
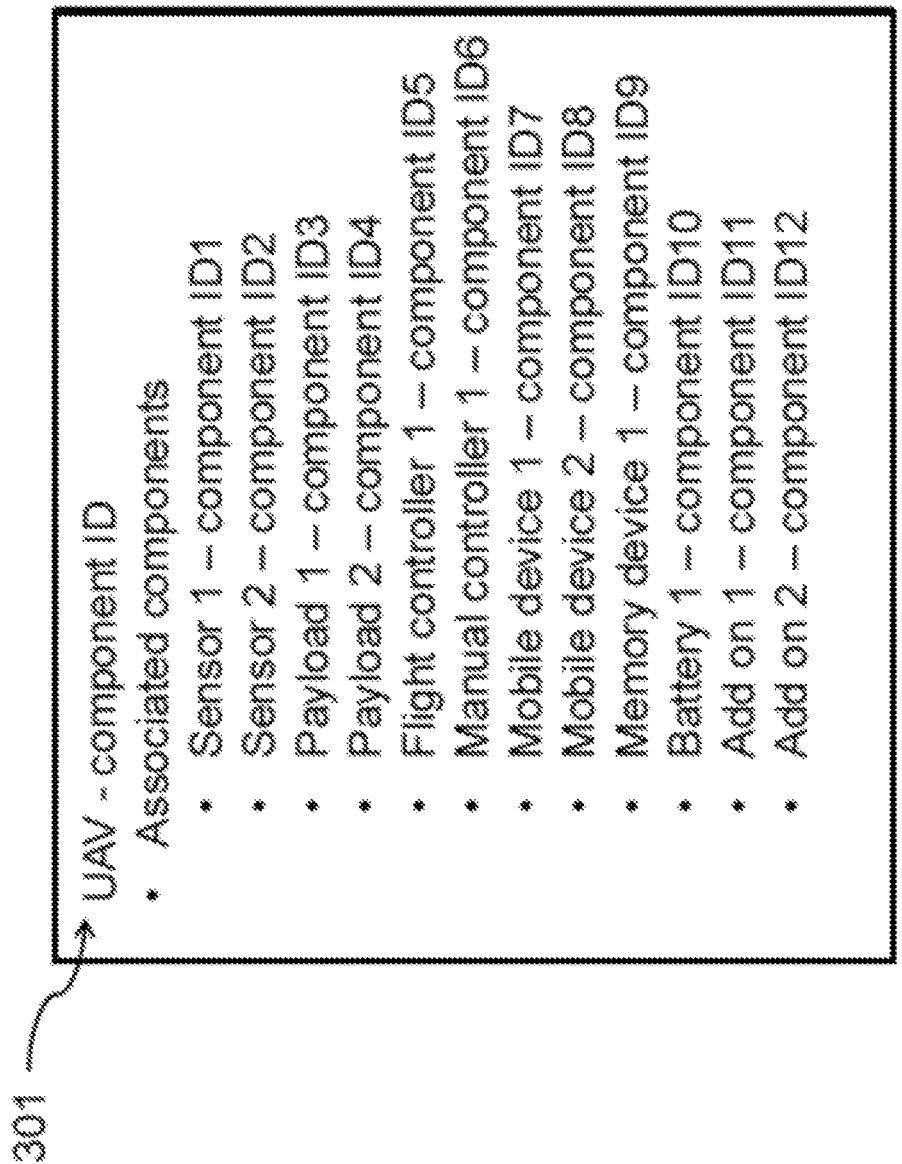
FIG. 3 shows an example of other information contained in a database regarding a component, in accordance with embodiments.

FIG. 3 shows an example of other information contained in a database regarding a component, in accordance with embodiments. The information may be contained alternatively, or in addition to information described with respect to FIG. 2. Accordingly, while the component illustrated shows a UAV, it is to be understood that the figure may be illustrative of information contained in the database regarding any other component previously described herein. Additionally, it is to be understood that FIGS. 2 and 3 lists exemplary information that may be contained within a database and that the actual data may be organized in any format.

The database may comprise information regarding the component (e.g. UAV name, UAV ID, etc). In some instances, the database may comprise information regarding other components associated with the given component. The association may be any type of association. In some instances, the association may designate or imply that the other components may be configured to be utilized with the given component. In some instances, the association may designate or imply that the other components may be configured to transfer data or conduct signals (e.g. electronic signals) with the given component. For example, for UAV 301, the database may comprise information regarding sensors, payloads, flight controllers, manual controllers, mobile devices, batteries, or other components that may be utilized in association with the UAV. Optionally, the database may comprise information regarding a type of relationship between the given component (e.g. UAV) and the other component. For example, the type of relationship may indicate whether the other component must be utilized with the UAV (e.g. to allow operation). For example, it may be mandatory to utilize the UAV with the "Battery 1—component ID 10" and otherwise, flight of the UAV may be grounded. As another example, the type of relationship may indicate whether the other component may be utilized with the UAV. For example, "Payload 1—component ID3" and "Payload 2—component ID4" may be utilized by the UAV but other payloads may not be allowed to operate together with the UAV. It is to be understood that the types of relationships described are for illustration purposes only and various other types of relationships may be envisioned.

The aforementioned information may be pre-registered. In some instances, the information may be registered by a user. In some instances, a platform may be provided for registering and/or managing information of the database. The platform may provide a convenient avenue by which users (e.g. owners, managers, etc) can manage information, associate users and/or components and designate relevant operational parameters. As previously described herein, users may comprise, or may be of various authority levels. In some instances, higher authority level users (e.g. owner) may be able to designate or confirm an operational parameter for a component for a given manager or operator. In some instances, the owner may be able to delegate or confirm managerial authority. For example, the owner may appoint one or more managers who can manage information, associate users and/or components and designate relevant operational parameters. In some instances, the owner may delegate absolute authority. Alternatively, the owner may limit designation of authority as desired. As one example, the owner may designate authority such that a manager may not register new operators but may manage operational parameters for existing operators. Owners and/or managers (e.g. depending on delegated authority) may also register or define a relationship between various components utilized in operation of a UAV.

Authentication System

Figure 4:
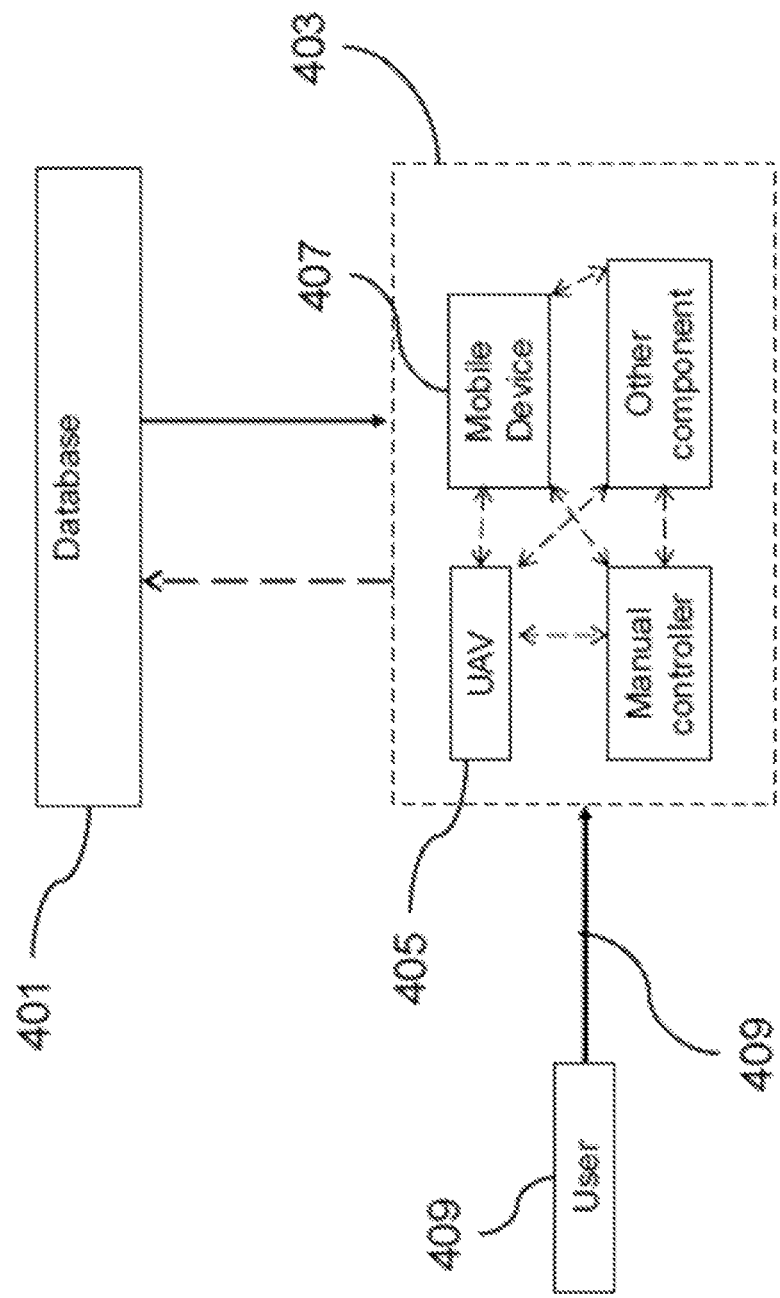
FIG. 4 illustrates an exemplary authentication system, in accordance with embodiments.

Information in the database may be utilized in an authentication system or process. The authentication system may be provided alternatively, or in addition to various other authentication systems known in the art. The authentication system may ensure authenticity of UAV components and/or users associated with operation of a UAV. FIG. 4 illustrates an exemplary authentication system, in accordance with embodiments. The authentication system may be a UAV safety system or may operate as part of a UAV safety system. The authentication system may provide improved UAV safety. The authentication system may authenticate a user, a UAV, a remote controller, and/or other components utilized in operation of the UAV. The authentication system may be utilized in some instances to impose appropriate operational parameters for the components.

The authentication system may include a database 401, substantially as described above. The database may in communication with components 403. In some instances, the database may be in communication with each component utilized in operation of a UAV 405. Alternatively, the database may be in communication with a subset of the components. For example, the database may be in communication with the mobile device 407, but may not be in communication with the UAV, manual controller, and/or other components. Optionally, the database may be in communication with the mobile device and may be in indirect communication with the UAV, manual controller, and/or other components. In some instances, the database may passively be in communication with the components 403. For example, the database may be in communication with the components in real time, or may be configured to transmit and/or receive data at predetermined intervals. Alternatively, the database may be configured to be in communication with the components in response to a stimulus. For example, the database may be configured to transmit data to one or more components in response to receiving data, e.g. from the components or from elsewhere.

The authentication system may provide authentication of an identity of a user or components involved in operation of a UAV. The authentication system may obtain information about the user and/or the components from the database 401. Further details about the authentication process are provided elsewhere herein.

Input Module

The authentication system may comprise a user input module. In some instances, the user input module may be provided as a separate or stand-alone device, and may be a component utilized in operation of a UAV. Alternatively, the user input module may be provided as a part of, or may be integrated with, any of the other components 403. The user input module may be configured to receive an input 409 from a user 411. The user may be an individual associated with the components 403 and/or UAV 405, such as a person operating the UAV. Examples of users are described elsewhere herein. Controlling operation of the UAV may include controlling flight of the UAV, or any other portions of the UAV as described elsewhere herein.

The input module may be used to receive information from the user. In some instances, the information may be known only by the user and not widely known by other users. For example, the information may be a username and a corresponding password. An input may be a password, passphrase, typing or swiping movement, signature, or any other type of information by the user. The user input may be received by the user responding to one or more query by the system correctly. In some embodiments, a user may apply for a login name and/or password to use for the authentication system. The user may be able to login in with said login name and password.

Optionally, the information may comprise a physical characteristic of the user. Biological information about the UAV may be received by the input module. For example, the input module may be configured to receive biometric information. For instance, the user may provide a fingerprint scan, a palm print scan, an iris scan, a retinal scan, or a scan of any other portion of the user's body to the user input module. The user may provide a physical sample, such as saliva, blood, fingernail clippings, or hair clippings that may be analyzed by the user input module. In some instances, DNA analysis of a sample from a user may occur. The user input module may in some instances be configured receive information that can provide facial recognition or gait recognition. The user may provide a voiceprint. A user may submit the user's height and/or weight for analysis.

In some instances, the user input module may be configured to receive information on a device or item that may be in the possession of a user. For example, the user input module may receive a card such as a credit card that may be in possession of the user. In some instances, the user input module may be configured to receive other types of identity cards. For example, social security cards, Medicare cards, driver's licenses, bank cards and other types of devices or items that provide an identity of the user may be provided. As another example, the user input module may receive a memory unit and/or information on the memory unit that may be in the possession of the user. For example, a user may have a memory device issued in relation to the authentication system, e.g. by a relevant manufacture, jurisdictional authority, or any other source. A memory device may be an external memory device such as a U disk (e.g., USB drive), external hard drive, or any other type of memory device. In some embodiments, the external device may be coupled to a user remote controller. For example, the external device, such as a U disk may be physically connected to the remote controller (e.g., inserted/plugged into the remote controller), or may be in communication with the remote controller (e.g., transmitting a signal that may be picked up by the remote controller). The device may be a physical memory storage device.

Matching Module

The authentication system may include a matching module. In some instances, the matching module may be provided as a separate or stand-alone device, and may be a component utilized in operation of a UAV. Alternatively, the matching module may be provided as a part of, or may be integrated with, any of the other components 403. Optionally, a matching module may be provided on each of the components. In one example, a matching module may be provided on the mobile device 407. The matching module may interact with the database. The matching module may obtain information, about the user and/or the components from the database. The information may include any of the information substantially discussed above. The matching module may interact with the user input module. The matching module may obtain information, about the user from the user input module. The information may include any of the information substantially discussed above. The matching module may be configured to process information received from the user input module and/or the information received from the database. In some instances, the matching module may be configured to match information received from the user input module and the database. For example, the matching module may be configured to verify consistency of information between the information received from the user input module and the information received from the database. In some instances, the matching module may be configured to determine relevant parameters (e.g. operational parameters or permission parameters) for UAV components and/or users based on a matching process. For example, utilizing information received from a user input module, the matching module may search for a corresponding user and associated permission parameters for the user. Based on a matching process (e.g. at the matching module), the user and/or components may get authenticated and appropriate operational parameter(s) may be imposed on the components.

Figure 19:
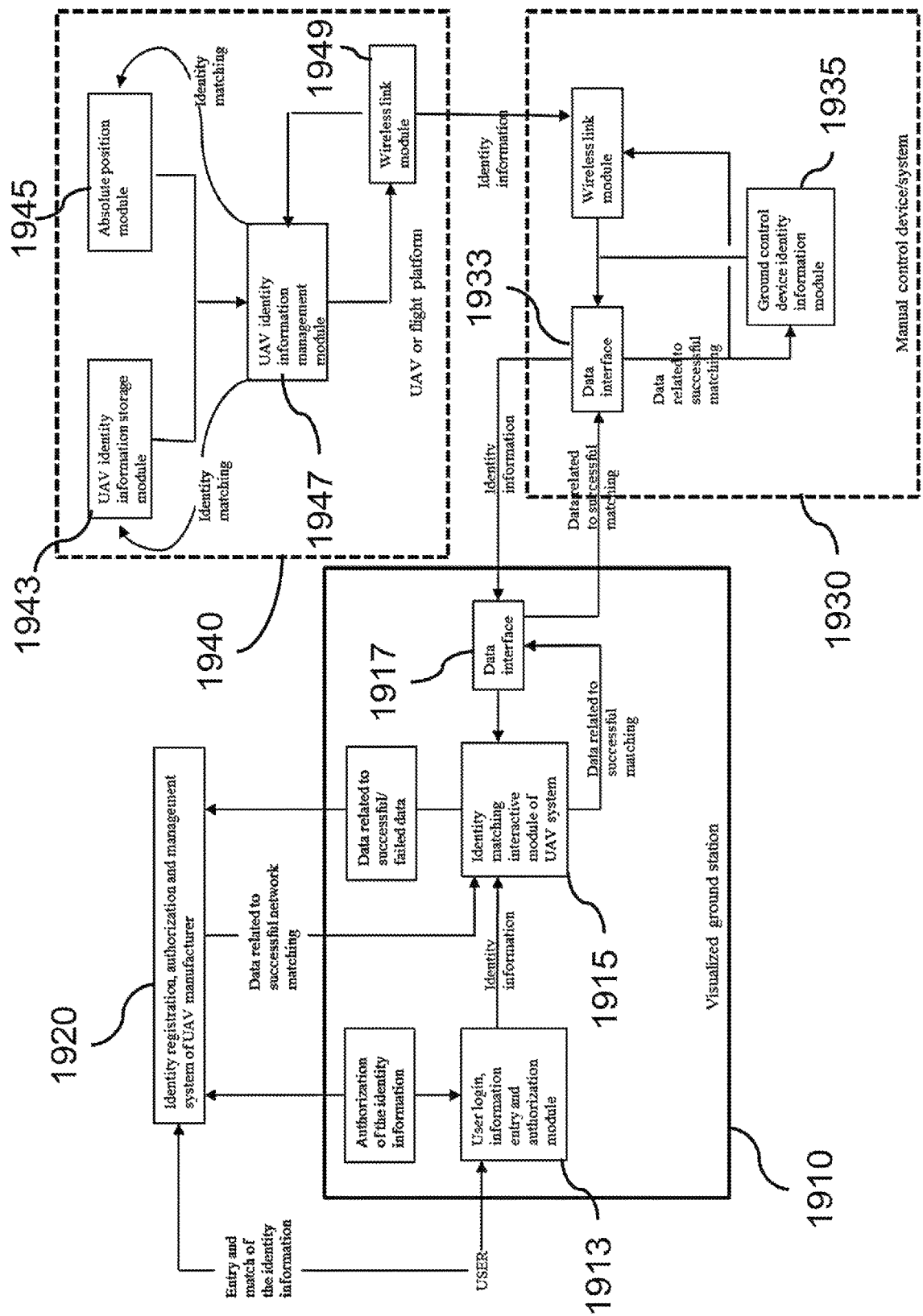
FIG. 19, illustrates other exemplary authentication systems in detail, in accordance with embodiments
Figure 20:
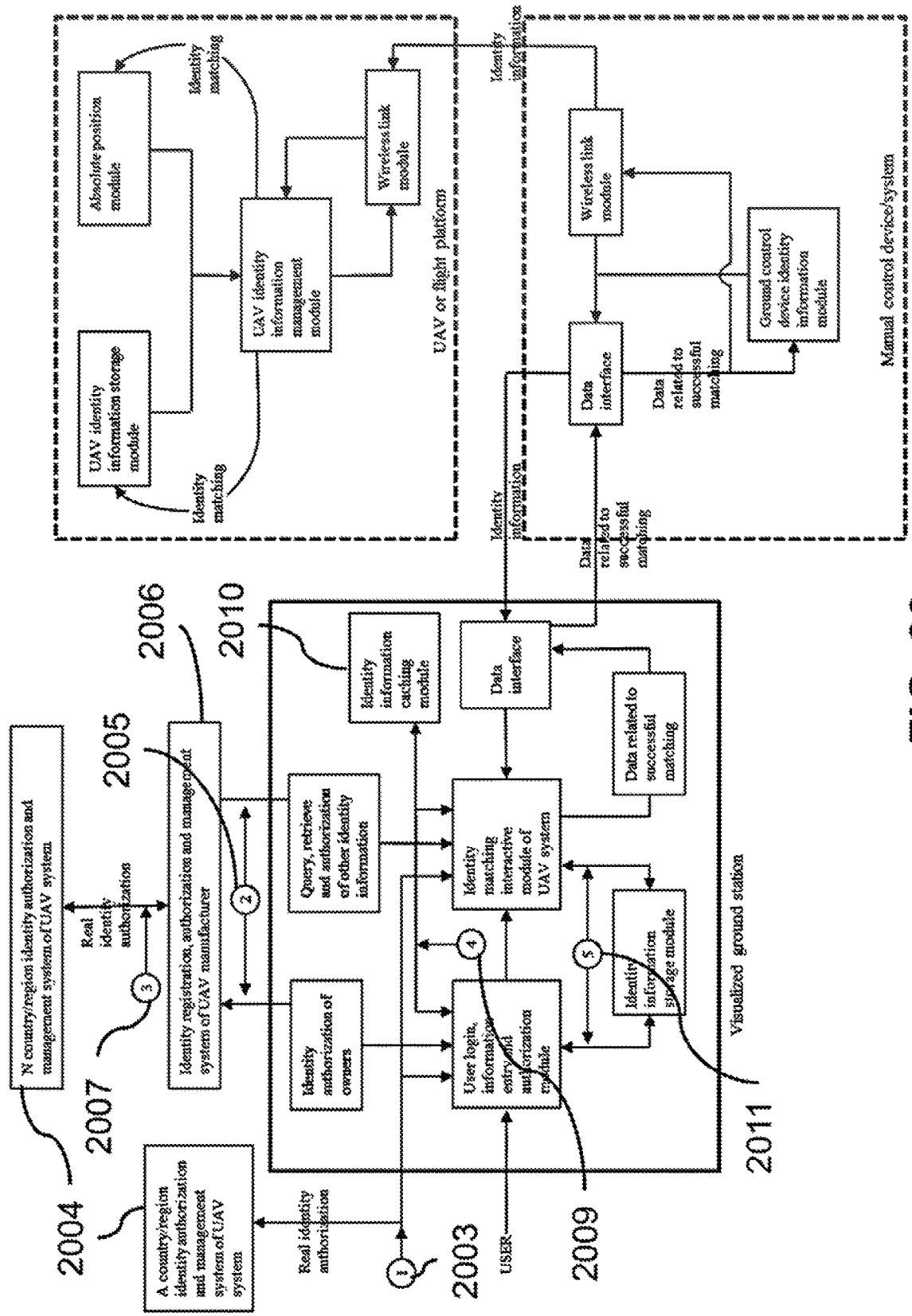
FIG. 20 illustrates other exemplary authentication systems in detail, in accordance with embodiments
Figure 21:
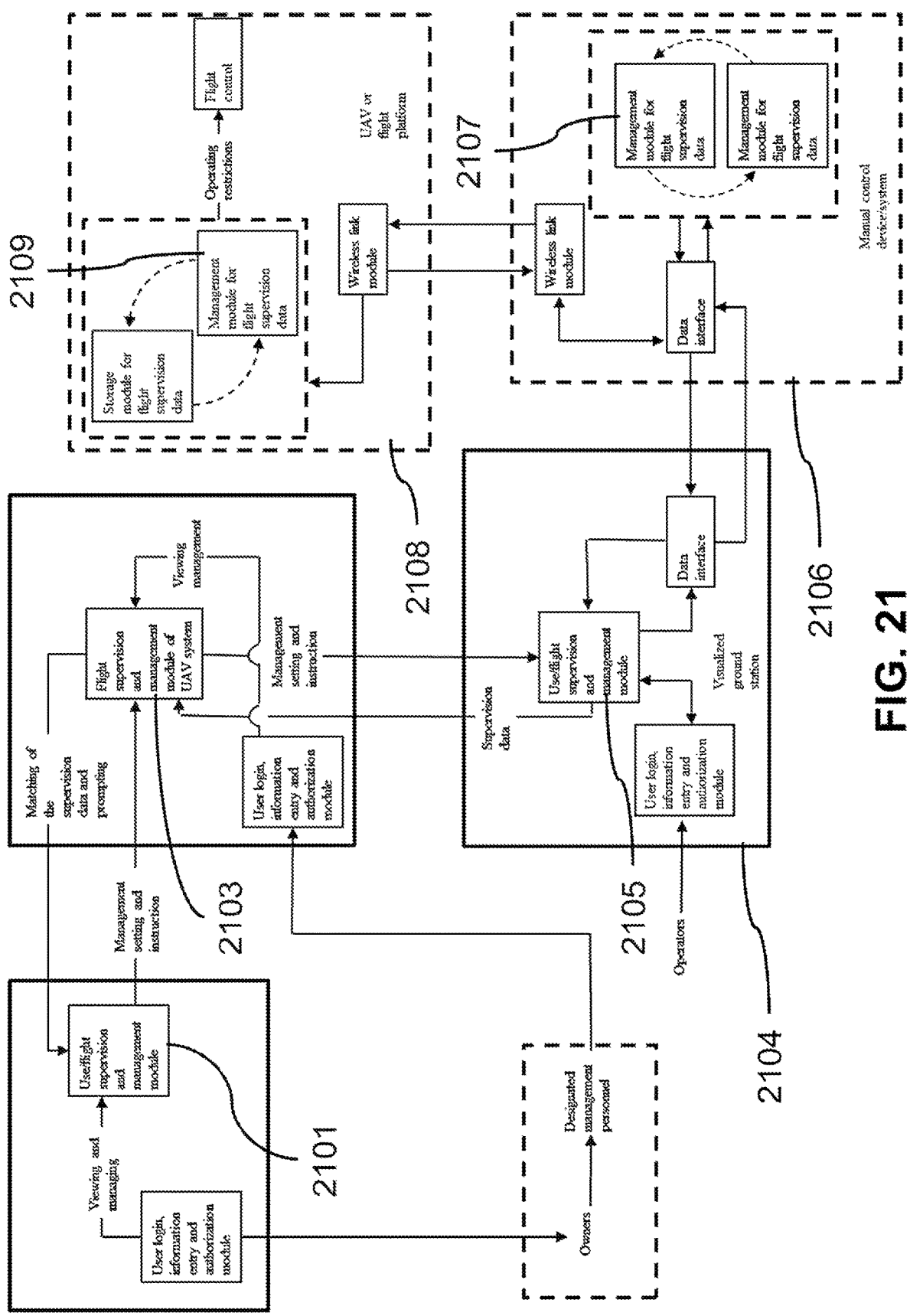
FIG. 21 illustrates other exemplary authentication systems in detail, in accordance with embodiments FIG. 22 describes an exemplary system utilized for granting and managing use permission for operators, in accordance with embodiments.

In one example, a user may provide an input at the user input module. Based on the received input, data may be transmitted to the database 401, e.g. utilizing individually or collectively the components 403. The data may comprise information regarding the user and/or the components. In response to receiving the data, the database may further transmit relevant data, individually or collectively, to the components. The relevant data may comprise information regarding the user 409, components 403, relationship between the components, and/or associated permission parameters. In some instances, the relevant data may comprise up-to date information. Optionally, the relevant data may comprise registered or verified information. Information received from the user and information received from the database may be compared, verified, authenticated, or matched. In some instances, appropriate operational parameters may be imposed based on the matching process. FIGS. 19, 20, and 21 illustrate other exemplary authentication systems in detail and related uses, in accordance with embodiments.

For example, FIG. 19 illustrates an identity entry and matching process of a UAV system in detail. The mobile device, or visualized ground station 1910, may comprise a user login, information entry, and authorization module 1913, an identity matching interactive module 1915, and data interface 1917. A user may also enter or input information to a database, such as an identity registration, authorization and management system of a UAV manufacturer 1920. A user may also input information to the user login, information entry, and authorization module 1913. In some instances, the input received at the module 1913 may communicate with the database 1920 for authorization of the identity information. Based on successful network matching, information may be received from the database 1920 to the module 1915. The identity information received from the user at the module 1913 may also further be transmitted to the matching module 1915 for identity matching. The matching may be successful or unsuccessful, and the data related to the successful or failed matching may further be transmitted to the database 1920. Data related to successful matching may be transmitted to the data interface 1917 and further be transmitted to a data interface at another component utilized in operation of the UAV. For example, the data related to the successful matching may be transmitted to a data interface 1933 of a manual control device 1930. In some instances, the data related to the successful matching may further be transmitted to an identity module of the manual control device, such as a ground control device identity information module 1935. Optionally, based on the data related to the matching, relevant information, such as an identity information of the manual control device may be transmitted to the data interface, which may further be transmitted to the module 1915 of the visualized ground station for identity matching between various UAV components. Alternatively or in addition, identity matching between various UAV components may happen independently, e.g. without association to information received from the database and/or user. The UAV or flight platform 1940 may comprise various modules, e.g. identity modules such as UAV identity information storage module 1943, sensor modules such as absolute position module 1945, identity matching module, or UAV identity information management module 1947, and wireless link module 1949. Some, or each of the modules of the UAV may be configured to undergo identity matching, e.g. for flight of the UAV. For example, identity information of the UAV identity module 1943 and/or sensor module 1945 may be received at the identity management module 1947 for identity matching. In some instances, the wireless link module 1949 may be used to receive and/or transmit information or data with other various UAV components, e.g. to provide or receive identity information, data related to matching of user, etc.

FIG. 20 illustrates various methods for implementing identity information entry and matching. The methods may be utilized as part of an identity entry and matching process of a UAV system described in FIG. 19. It is to be understood that each of the methods described below may be utilized individually, or in conjunction with each other or with any other method described throughout.

In method 2003, an authenticity of an identity of the owners, the operators of the UAV and UAV system or components may be authenticated by a platform or database provided by a relevant jurisdictional authority. In some instances, the platform may be a country or region UAV system identity authentication and management system 2004. According to practical requirements of each country or region, mandatorily or user-selectively, the matching or setting information of relevant operators and UAV system or components may be uploaded to the country or region UAV system identity authentication and management system.

In method 2005, the identity authenticity of the owners, operators of the UAV and UAV system or components may be authenticated through a platform or database provided by a UAV system manufacturer. In some instances, the platform may be a UAV system manufacturer identity registration, authentication and management system 2006. According to practical requirements of each country or region, mandatorily or user-selectively, the information such as the matching or setting information of the operators and the UAV system or components, the usage information of the operators, flight permission information and constraints may be uploaded to the UAV system manufacturer identity registration, authentication and management system or other UAV system or component management platforms.

In method 2007, the UAV system manufacturer identity registration, authentication and management system may be utilized in conjunction with a country/region UAV system identity authentication and management systems described in method 2003.

In method 2009, a successfully-set relevant identity information of the operators and UAV system or components information may be stored in an identity information caching module 2010 in a mobile device, such as a visualized ground station. A cached identity information and authentication information in the identity information storage module in the ground station may be used for authentication of all relevant identity and operation permissions each time the flight operator logs in for operation.

In method 2011, identity information storage module may be added in the ground station and store relevant identity information and permissions for successful registration and/or authentication and settings. The relevant identities and permissions may be authenticated by using the identity information and the operation permissions stored in the identity information storage module in the ground station each time the logging in by the user occurs.

FIG. 21 illustrates real-time flight supervision and management methods for a UAV system. For example, an owner may use a flight supervision and management module 2101 to view or manage the users (e.g. operators), designated management personnel, UAV components, etc. Optionally, an owner may utilize a user login, information entry and authorization module to access the flight supervision and management module.

In some instances, owners and/or designated management personnel may manage a setting and instruction for the users via a flight supervision and management module of a UAV system 2103. Optionally, designated management personnel may utilize a user login, information entry and authorization module to access the flight supervision and management module of the UAV system. The users or operators may be permitted to operate UAV components based on designated parameters or as permitted by the owners or designated management personnel, and may be further supervised by them. The relevant parameters, instructions, or supervision may in some instances additionally be stored in relevant modules of the various UAV components.

In some instances, the management setting and instructions may be transmitted to a visual ground station 2104 utilized by an operator of a UAV. For example, the management setting and instruction may be transmitted to a use or flight supervision and management module 2105 of the visualized ground station. The operator may input relevant information at a user login, information entry, and authorization module, which may be utilized to verify or confirm the use or flight settings for the user. The flight settings, or supervision data of the operator may further be transmitted to the flight supervision and management module of the UAV system.

In some instances, data or information of the visualized ground station may further be transmitted to other UAV components such as a manual control device 2106, e.g. utilizing data interfaces. For example, management setting and instructions from the visualized ground station may be transmitted to the manual control device which may be stored in a management module for flight supervision data 2107. A storage module may further store flight supervision data which may be transmitted to the visualized ground station and further uploaded to the flight supervision and management module 2103. In some instances, data or information of the manual control device may further be transmitted to other UAV components such as a UAV or flight platform 2108, e.g. utilizing data interfaces or wireless link modules. For example, management setting and instructions from the manual control device may be transmitted to the UAV and be stored in a management module for flight supervision data 2109. The settings may be utilized to impose operational parameters or restrictions which the flight control of the UAV takes into account. Flight data of the UAV may also be stored in a storage module for flight supervision data and compared with information in the management module.

Flight Regulation Module

The authentication system may further include, or operate in concert with, a flight regulation module/subsystem. The flight regulation module may be configured to generate and store one or more sets of flight regulations. Flight regulation as described herein may refer to imposition of operational parameters on any of components. Generation of the flight regulations may include the creation of flight regulations from scratch, or may include selecting one or more sets of flight regulations from a plurality of sets of flight regulations. The generation of flight regulations may include combining selected sets of flight regulations.

A UAV may operate in accordance with one or more sets of imposed flight regulations. The flight regulations may regulate any aspect of operation of the UAV (e.g., flight, sensors, communications, payload, navigation, power usage, items carried, remote controller usage, data storage, etc) and are substantially described further below. For instance, the flight regulations may dictate where the UAV may or may not fly. The flight regulations may dictate when the UAVs may or may not fly in particular regions. The flight regulations may dictate when data may be collected, transmitted and/or recorded by one or more sensors on-board the UAV. The flight regulations may dictate when a payload may be operational. For example, a payload may be an image capturing device, and the flight regulations may dictate when and when the image capturing device may be capturing images, transmitting the images, and/or storing the images. The flight regulations may dictate how communications may occur (e.g., channels or methods that may be used) or what types of communications may occur.

The flight regulation module may include one or more databases storing information pertaining to the flight regulations. For example the one or more databases may store one or more locations where flight of a UAV is restricted. The flight regulation module may store sets of flight regulations, and the sets of flight regulations may be associated with particular UAVs. The flight regulation module may store sets of flight regulations, and the sets of flight regulations may be associated with particular users. The flight regulation module may store sets of flight regulations, and the sets of flight regulations may be associated with particular components. The flight regulation module may store sets of flight regulations, and the sets of flight regulations may be associated with particular users and components.

The flight regulation module may approve or reject one or more flight plans of a UAV. In some instances, a flight plan including a proposed flight path for a UAV may be designated. The flight path may be provided in relation to the UAV and/or the environment. The flight path may be entirely defined (all points along the path are defined), semi-defined (e.g., may include one or more waypoints but the paths to get to the waypoints may be variable), or not very defined (e.g., may include an end destination or other parameter, but the path to get there may not be defined). The flight regulation module may receive the flight plans and may approve or reject the flight plans. The flight regulation module may reject the flight plans if they are in contradiction to a set of flight regulations for the UAV. The flight regulation module may suggest modifications to the flight plans that may put them in compliance with the set of flight regulations. The flight regulation module may generate or suggest a set of flight plans for the UAV that may comply with the set of flight regulations. A user may enter one or more parameters or goals for a UAV mission, and the flight regulation modules may generate or suggest a set of flight plans that may meet the one or more parameters while complying with the set of flight regulations. Examples of parameters or goals for a UAV mission may include a destination, one or more waypoints, timing requirements (e.g., overall time limit, time to be at certain locations), maximum speeds, maximum accelerations, type of data to be collected, type of image to be captured, any other parameter or goal.

In some instances, the flight regulation module may be configured to provide a warning if operation of UAV component(s) is not in accordance with flight regulations. The alert, or warning may be provided in any manner. The alert may be provided visually, audibly, and/or tactilely. For example, the alert may be provided on a display screen of a user remote controller. For example, text or images may be provided indicative of the unauthorized communication. Text or images may be provided indicative that an interference with user commands occurred. In another example, the alert may be provided audibly via a user remote controller. The user remote controller may have a speaker that may produce sound. The alert may be provided tactilely via the remote controller. The user remote controller may vibrate or pulse. Alternatively, the user remote controller may jerk, turn warmer or colder, deliver a mild electric shock or provide any other tactile indication. An alert may be provided to a user of the UAV. The alert may be provided via a user terminal, such as a remote controller. A user may be presented with an opportunity to change the UAV behavior to cause the UAV to comply with the flight regulations. For example, if the UAV is approaching restricted airspace, the user may have some time to alter the path of the UAV to avoid the restricted airspace. Alternatively, the user may not be presented with an opportunity to change the UAV behavior.

Authentication Implementation

The authentication system may be implemented using any hardware configuration or set up known or later developed in the art. For instance, the database may be operated using one or more servers. Any description of servers may apply to any other type of device. The device may be a computer (e.g., personal computer, laptop computer, server), mobile device (e.g., smartphone, cellular phone, tablet, personal digital assistant), or any other type of device. The device may be a network device capable of communicating over a network. The device comprise one or more memory storage units which may include non-transitory computer readable medium which may store code, logic or instructions for performing one or more steps described elsewhere herein. The device may include one or more processors that may individually or collectively execute one or more steps in accordance with the code, logic, or instructions of the non-transitory computer readable medium as described herein.

The various parts, such as the database, the matching module, user input module, components, etc may be implemented on hardware at the same location or may be implemented at different locations. The authentication system components may be implemented using the same device or multiple devices. In some instances, a cloud-computing infrastructure may be implemented in providing the authentication system. Optionally, peer-to-peer (P2P) relationships may be utilized by the authentication system.

The parts may be provided off-board the UAV, on-board the UAV, or some combination thereof. The parts may be provided off-board a UAV component, on-board a UAV component, or some combination thereof. In some preferable embodiments, parts may be provided off-board the UAV components, and may communicate with the UAV components. The UAV components may communicate directly or indirectly with the UAV. In some instances, the communications may be relayed via another device. The other device may be a remote controller, or another UAV.

Flight Regulations

Activity of a UAV may be governed in accordance with a set of flight regulations. A set of flight regulations may include one or more flight regulations. Various types and examples of flight regulations are described herein.

Flight regulations may govern physical disposition of the UAV. For instance, the flight regulation may govern flight of the UAV, take-off of the UAV, and/or landing of the UAV. The flight regulation may indicate areas of the surface over which the UAV may or may not fly, or volumes in space where the UAV may or may not fly. The flight regulations may relate to position of the UAV (e.g., where the UAV is located in space or over the underlying surface) and/or orientation of the UAV. In some examples, the flight regulations may prevent the UAV from flying within an allocated volume (e.g., airspace) and/or over an allocated region (e.g., underlying ground or water). The flight regulations may comprise one or boundaries within which the UAV is not permitted to fly. In other examples, the flight regulations may only permit the UAV the fly within an allocated volume and/or over an allocated region. The flight regulations may comprise one or more boundaries within which the UAV is permitted to fly. Optionally, the flight regulations may prevent the UAV from flying above an altitude ceiling that may be fixed or variable. In another instance, the flight regulations may prevent the UAV from flying beneath an altitude floor that may be fixed or variable. The UAV may be required to fly at an altitude between the altitude floor and the altitude ceiling. In another example, the UAV may not be able to fly within one or more ranges of altitude. For instance, the flight regulations may permit only a certain range of orientations of the UAV, or may not permit certain range of orientations of the UAV. The range of orientations of the UAV may be with respect to one, two, or three axes. The axes may be orthogonal axes, such as yaw, pitch, or roll axes.

The flight regulations may govern a flight time of the UAV. For instance, the flight regulations may govern how long the UAV may be flown. The flight regulation may govern an amount of time the UAV may be flown within a given time period. In some instances, the amount of time may be less than or equal to about 5 minutes, 10 minutes, 20 minutes, 30 minutes, 45 minutes, 1 hour, 2 hours, 3 hours, 6 hours, 12 hours, 1 day, 1 week, 2 weeks, or 1 month. In some instances, the given time period may be less than or equal to about 30 minutes, 1 hour, 2 hours, 3 hours, 6 hours, 12 hours, 1 day, 1 week, 2 weeks, 1 month, 3 months, 6 months, or 1 year.

The flight regulations may govern movement of the UAV. For instance, the flight regulations may govern translational speed of the UAV, translational acceleration of the UAV, angular speed of the UAV (e.g., about one, two, or three axes), or angular acceleration of the UAV (e.g., about one, two, or three axes). The flight regulations may set a maximum limit for the UAV translational speed, UAV translational acceleration, UAV angular speed, or UAV angular acceleration. Thus, the set of flight regulations may comprise limiting flight speed and/or flight acceleration of the UAV. The flight regulations may set a minimum threshold for UAV translational speed, UAV translational acceleration, UAV angular speed, or UAV angular acceleration. The flight regulations may require that the UAV move between the minimum threshold and the maximum limit. Alternatively, the flight regulations may prevent the UAV from moving within one or more translational speed ranges, translational acceleration ranges, angular speed ranges, or angular acceleration ranges. In one example, a UAV may not be permitted to hover within a designated airspace. The UAV may be required to fly above a minimum translational speed of 0 mph. In another example, a UAV may not be permitted to fly too quickly (e.g., fly beneath a maximum speed limit of 40 mph). The movement of the UAV may be governed with respect to an allocated volume and/or over an allocated region.

The flight regulations may govern take-off and/or landing procedures for the UAV. For instance, the UAV may be permitted to fly, but not land in an allocated region. In another example, a UAV may only be able to take-off in a certain manner or at a certain speed from an allocated region. In another example, manual take-off or landing may not be permitted, and an autonomous landing or take-off process must be used within an allocated region. The flight regulations may govern whether take-off is allowed, whether landing is allowed, any rules that the take-off or landing must comply with (e.g., speed, acceleration, direction, orientation, flight modes). In some embodiments, only automated sequences for taking off and/or landing are permitted without permitting manual landing or take-off, or vice versa. The take-off and/or landing procedures of the UAV may be governed with respect to an allocated volume and/or over an allocated region.

In some instances, the flight regulations may govern operation of a payload of a UAV. The payload of the UAV may be a sensor, emitter, or any other object that may be carried by the UAV. The payload may be powered on or off. The payload may be rendered operational (e.g., powered on) or inoperational (e.g., powered off). Flight regulations may comprise conditions under which the UAV is not permitted to operate a payload. For example, in an allocated airspace, the flight regulations may require that the payload be powered off. The payload may emit a signal and the flight regulations may govern the nature of the signal, a magnitude of the signal, a range of the signal, a direction of signal, or any mode of operation. For example, if the payload is a light source, the flight regulations may require that the light not be brighter than a threshold intensity within an allocated airspace. In another example, if the payload is a speaker for projecting sound, the flight regulations may require that the speaker not transmit any noise outside an allocated airspace. The payload may be a sensor that collects information, and the flight regulations may govern a mode in which the information is collected, a mode about how information is pre-processed or processed, a resolution at which the information is collected, a frequency or sampling rate at which the information is collected, a range from which the information is collected, or a direction from which the information is collected. For example, the payload may be an image capturing device. The image capturing device may be capable of capturing static images (e.g., still images) or dynamic images (e.g., video). The flight regulations may govern a zoom of the image capturing device, a resolution of images captured by the image capturing device, a sampling rate of the image capturing device, a shutter speed of the image capturing device, an aperture of the image capturing device, whether a flash is used, a mode (e.g., lighting mode, color mode, still vs. video mode) of the image capturing device, or a focus of the image capturing device. In one example, a camera may not be permitted to capture images in over an allocated region. In another example, a camera may be permitted to capture images, but not capture sound over an allocated region. In another example, a camera may only be permitted to capture high-resolution photos within an allocated region and only be permitted to take low-resolution photos outside the allocated region. In another example, the payload may be an audio capturing device. The flight regulations may govern whether the audio capture device is permitted to be powered on, sensitivity of the audio capture device, decibel ranges the audio capture device is able to pick up, directionality of the audio capture device (e.g., for a parabolic microphone), or any other quality of the audio capture device. In one example, the audio capture device may or may not be permitted to capture sound within an allocated region. In another example, the audio capture device may only be permitted to capture sounds within a particular frequency range while within an allocated region. The operation of the payload may be governed with respect to an allocated volume and/or over an allocated region.

The flight regulations may govern whether a payload can transmit or store information. For instance, if the payload is an image capturing device, the flight regulations may govern whether images (still or dynamic) may be recorded. The flight regulations may govern whether the images can be recorded into an on-board memory of the image capture device or a memory on-board the UAV. For instance, an image capturing device may be permitted to be powered on and showing captured images on a local display, but may not be permitted to record any of the images. The flight regulations may govern whether images can be streamed off-board the image capture device or off-board the UAV. For instance, flight regulations may dictate that an image capture device on-board the UAV may be permitted to stream video down to a terminal off-board the UAV while the UAV is within an allocated airspace, and may not be able to stream video down when outside the allocated airspace. Similarly, if the payload is an audio capture device, the flight regulations may govern whether sounds may be recorded into an on-board memory of the audio capture device or a memory on-board the UAV. For instance, the audio capture device may be permitted to be powered on and play back captured sound on a local speaker, but may not be permitted to record any of the sounds. The flight regulations may govern whether the images can be streamed off-board the audio capture device, or any other payload. The storage and/or transmission of collected data may be governed with respect to an allocated volume and/or over an allocated region.

In some instances, the payload may be an item carried by the UAV, and the flight regulations may dictate the characteristics of the payload. Examples of characteristics of the payload may include dimensions of the payload (e.g., height, width, length, diameter, diagonal), weight of the payload, stability of the payload, materials of the payload, fragility of the payload, or type of payload. For instance, the flight regulations may dictate that the UAV may carry the package of no more than 3 lbs while flying over an allocated region. In another example, the flight regulations may permit the UAV to carry a package having a dimension greater than 1 foot only within an allocated volume. Another flight regulation may permit a UAV to only fly for 5 minutes when carrying a package of 1 lb or greater within an allocated volume, and may cause the UAV to automatically land if the UAV has not left the allocated volume within the 5 minutes. Restrictions may be provided on the type of payloads themselves. For example, unstable or potentially explosive payloads may not be carried by the UAV. Flight restrictions may prevent the carrying of fragile objects by the UAV. The characteristics of the payload may be regulated with respect to an allocated volume and/or over an allocated region.

Flight regulations may also dictate activities that may be performed with respect to the item carried by the UAV. For instance, flight regulations may dictate whether an item may be dropped off within an allocated region. Similarly flight regulations may dictate whether an item may be picked up from an allocated region. A UAV may have a robotic arm or other mechanical structure that may aid in dropping off or picking up an item. The UAV may have a carrying compartment that may permit the UAV to carry the item. Activities relating to the payload may be regulated with respect to an allocated volume and/or allocated region.

Positioning of a payload relative to the UAV may be governed by flight regulations. The position of a payload relative to the UAV may be adjustable. Translational position of the payload relative to the UAV and/or orientation of the payload relative to the UAV may be adjustable. Translational position may be adjustable with respect to one, two, or three orthogonal axes. Orientation of the payload may be adjustable with respect to one, two, or three orthogonal axes (e.g., pitch axis, yaw axis, or roll axis). In some embodiments, the payload may be connected to the UAV with a carrier that may control positioning of the payload relative to the UAV. The carrier may support the weight of the payload on the UAV. The carrier may optionally be a gimbaled platform that may permit rotation of the payload with respect to one, two, or three axes relative to the UAV. One or more frame components and one or more actuators may be provided that may effect adjustment of the positioning of the payload. The flight regulations may control the carrier or any other mechanism that adjusts the position of the payload relative to the UAV. In one example, flight regulations may not permit a payload to be oriented facing downward while flying over an allocated region. For instance, the region may have sensitive data that it may not be desirable for the payload to capture. In another example, the flight regulations may cause the payload to move translationally downward relative to the UAV while within an allocated airspace, which may permit a wider field of view, such as panoramic image capture. The positioning of the payload may be governed with respect to an allocated volume and/or over an allocated region.

The flight regulations may govern the operation of one or more sensors of an unmanned aerial vehicle. For instance, the flight regulations may govern whether the sensors are turned on or off (or which sensors are turned on or off), a mode in which information is collected, a mode about how information is pre-processed or processed, a resolution at which the information is collected, a frequency or sampling rate at which the information is collected, a range from which the information is collected, or a direction from which the information is collected. The flight regulations may govern whether the sensors can store or transmit information. In one example, a GPS sensor may be turned off while a UAV is within an allocated volume while vision sensors or inertial sensors are turned on for navigation purposes. In another example, audio sensors of the UAV may be turned off while flying over an allocated region. The operation of the one or more sensors may be governed with respect to an allocated volume and/or over an allocated region.

Communications of the UAV may be controlled in accordance with one or more flight regulations. For instance, the UAV may be capable of remote communication with one or more remote devices. Examples of remote devices may include a remote controller that may control operation of the UAV, payload, carrier, sensors, or any other component of the UAV, a display terminal that may show information received by the UAV, a database that may collect information from the UAV, or any other external device. The remote communications may be wireless communications. The communications may be direct communications between the UAV and the remote device. Examples of direct communications may include WiFi, WiMax, radiofrequency, infrared, visual, or other types of direct communications. The communications may be indirect communications between the UAV and the remote device which may include one or more intermediary device or network. Examples of indirect communications may include 3G, 4G, LTE, satellite, or other types of communications. The flight regulations may dictate whether remote communications are turned on or off. Flight regulations may comprise conditions under which the UAV is not permitted to communicate under one or more wireless conditions. For example, communications may not be permitted while the UAV is within an allocated airspace volume. The flight regulations may dictate a communication mode that may or may not be permitted. For instance, the flight regulations may dictate whether a direct communication mode is permitted, whether an indirect communication mode is permitted, or whether a preference is established between the direct communication mode and the indirect communication mode. In one example, only direct communications are permitted within an allocated volume. In another example, over an allocated region, a preference for direct communications may be established as long as it is available, otherwise indirect communications may be used, while outside the allocated region, no communications are permitted. The flight regulations may dictate characteristics of the communications, such as bandwidth used, frequencies used, protocols used, encryptions used, devices that aid in the communication that may be used. For example, the flight regulations may only permit existing networks to be utilized for communications when the UAV is within a predetermined volume. The flight regulations may govern communications of the UAV with respect to an allocated volume and/or over an allocated region.

Other functions of the UAV, such as navigation, power usage and monitoring, may be governed in accordance with flight regulations. Examples of power usage and monitoring may include the amount of flight time remaining based on the battery and power usage information, the state of charge of the battery, or the remaining amount of estimated distance based on the battery and power usage information. For instance, the flight regulations may require that a UAV in operation within an allocated volume have a remaining battery life of at least 3 hours. In another example, the flight regulations may require that the UAV be at least at a 50% state of charge when outside an allocated region. Such additional functions may be governed by flight regulations with respect to an allocated volume and/or over an allocated region.

The allocated volume and/or allocated region may be static for a set of flight regulations. For instance, boundaries for the allocated volume and/or allocated region may remain the same over time for the set of flight regulations. Alternatively, the boundaries may change over time. For instance, an allocated region may be a school, and the boundaries for the allocated region may encompass the school during school hours. After school hours, the boundaries may shrink or the allocated region may be removed. An allocated region at a nearby park where children participate in after-school activities may be created during the hours after school. The rules with respect to the allocated volume and/or allocated region may remain the same over time, or may change over time for the set of flight regulations. Changes may be dictated by time of day, day of the week, week of the month, month, quarter, season, year, or any other time-related factor. Information from a clock which may provide time of day, date, or other time-related information may be used in effecting the changes in the boundaries or the rules. A set of flight regulations may have dynamic components in response to other factors, in addition to time. Examples of other factors may include climate, temperature, detected light level, detected presence of individuals or machines, environmental complexity, physical traffic (e.g., land-bound traffic, pedestrian traffic, aerial vehicle traffic), wireless or network traffic, detected degree of noise, detected movements, detected heat signatures, or any other factor.

The flight regulations may elicit any type of flight response measure by the UAV. For instance, the UAV may change course. The UAV may automatically enter an autonomous or semi-autonomous flight control mode from a manual mode, or may not respond to certain user inputs. The UAV may permit another user to take over control of the UAV. The UAV may automatically land or take-off. The UAV may send an alert to a user. The UAV may automatically slow down or speed up. The UAV may adjust operation (which may include ceasing operation, or changing parameter of operation of) of a payload, carrier, sensor, communication unit, navigation unit, power regulation unit. The flight response measure may happen instantaneously, or may occur after a period of time (e.g., 1 minute, 3 minutes, 5 minutes, 10 minutes, 15 minutes, 30 minutes). The period of time may be a grace period for the user to react and exercise some control over the UAV before the flight response measures kick in instance, if the user is approaching a flight restricted zone, the user may be alerted and may change course of the UAV to exit the flight restricted zone. If the user does not respond within the grace period, the UAV may be automatically landed within the flight restricted zone. A UAV may normally operate in accordance with one or more flight commands from a remote controller operated by a remote user. The flight response measures may override the one or more flight commands when the set of flight regulations and the one or more flight commands conflict. For example, if the user instructs the UAV to enter a no-fly zone, the UAV may automatically alter course avoid the no-fly zone.

The set of flight regulations may include information about one or more of the following: (1) an allocated volume and/or region over which the set of flight regulations may apply, (2) one or more rules (e.g., UAV, payload, carrier, sensor, communication module, navigation unit, power unit operation) (3) one or more flight response measures (e.g., response by the UAV, payload, carrier, sensor, communication module, navigation unit, power unit) to cause the UAV to conform with the rules, or (4) time or any other factor that may affect the allocated volume and/or region, the rule, or the flight response measure. The set of flight regulations may include a single flight regulation, which may include information about (1), (2), (3), and/or (4). The set of flight regulations may include multiple flight regulations which may each include information about (1), (2), (3), and/or (4). Any types of flight regulations may be combined, and any combination of flight response measures may occur in accordance with the flight regulations. One or more allocated volumes and/or regions may be provided for a set of flight regulations. For example, a set of flight regulations may be provided for a UAV, where the set of flight regulations does not permit the UAV to fly within a first allocated volume, does permit the UAV to fly within the second allocated volume under an altitude ceiling but does not permit operation of a camera on-board the UAV, and only permits the UAV to record audio data within a third allocated volume. The UAV may have flight response measures that may cause the UAV to comply with the flight regulations. Manual operation of the UAV may be overridden to cause the UAV to comply with rules of the flight regulations. One or more flight response measures may automatically occur to override manual input by the user.

A set of flight regulations may be generated for a UAV. Generation of the set of flight regulations may include creating the flight regulations from scratch. Generation of the set of flight regulations may include selecting a set of flight regulations from a plurality of available sets of flight regulations. Generation of the set of flight regulations may include combining features of one or more sets of flight regulations. For instance, generation of a set of flight regulations may include determining elements, such as determining an allocated volume and/or region, determining one or more rules, determining one or more flight response measures, and/or determining any factors that may cause any of the elements to be dynamic. These elements may be generated from scratch or may be selected from one or more pre-existing element options. In some instances, flight regulations may be manually selected by a user. Alternatively, the flight regulations may be selected automatically with aid of one or more processors, without requiring human intervention. In some instances, some user input may be provided, but one or more processors may make the final determination of the flight regulations in compliance with the user input.

Designation of Permission Parameters

Figure 5:
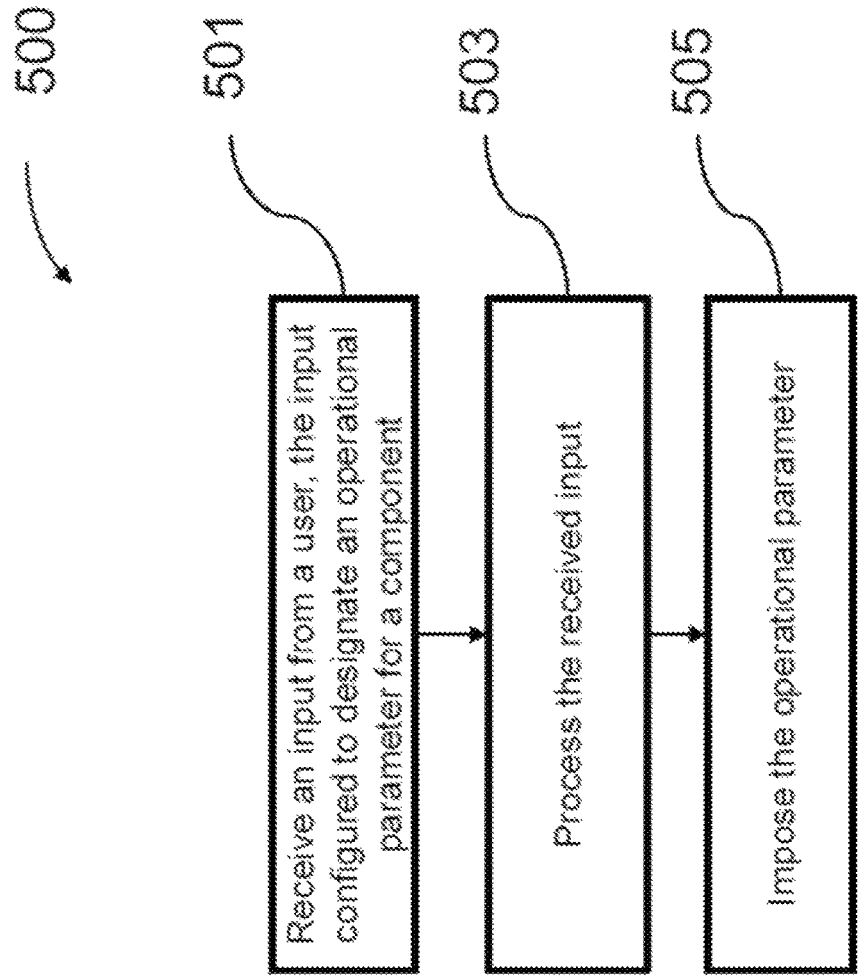
FIG. 5 illustrates a method for managing a component utilized in operation of an unmanned aerial vehicle (UAV), in accordance with embodiments.

FIG. 5 illustrates a method 500 for managing a component utilized in operation of an unmanned aerial vehicle (UAV), in accordance with embodiments. The method may illustrate an example of a higher level authority user (e.g. owner, manager) designating an operational parameter for an operator of the component. In some instances, the method may be implemented with aid of one or more processors. The one or more processors may be integrated at a single location or may be distributed at a plurality of different locations and may individually or collectively implement any of the below mentioned steps. The component may be any component as previously described herein, e.g. used in association with a UAV. For example, the component may be a sensor located on board a UAV. In some instances, the component may be a payload on board a UAV. The payload may be an imaging device. The component may be a flight controller of a UAV, or may be a remote controller of the UAV. In some instances, the component may be a UAV.

In step 501, data regarding an input may be received. The input may be received from a user at a user interface (UI). The user may be any user involved in operation of the UAV as previously described herein. For example, the user may be an owner or a manager of the UAV. Optionally, the user may be an operator of the UAV. In some instances, receiving data regarding the input may comprise receiving a confirmation from an owner or a manager of the UAV confirming the operational parameter for the component.

The user interface may be any type of UI, e.g. GUI, which may be accessible by any means. In some instances, the input may be received at a computer or a mobile device. The user interface may be operably coupled to a computer. The input may be configured to designate an operational parameter for the component for a registered operator of the UAV. In some instances, the input may be configured to designate an operational parameter for the component specifically for a registered operator of the UAV, e.g. out of a plurality of different registered operators of the UAV. In some instances, the component may be configured to be utilized by a plurality of different operators. In such instances, the user interface may further be utilized to designate the plurality of different operators.

For example, the input may modify information contained in a database, substantially described above. For example, the component may be a UAV, and the input may be configured to register and/or associate an operational parameter such as a maximum velocity of the UAV, a maximum altitude of the UAV, a maximum acceleration of the UAV, a maximum allowed flight distance of the UAV, a maximum allowed flight time of the UAV, and/or a requirement of supervision of the UAV during flight for the registered operator of the UAV. As another example, the component may be sensor on board the UAV, and the input may be configured to register and/or associate an operational parameter of the sensor for the registered operator. As another example, the component may be a payload on board the UAV and the input may be configured to register and/or associate an operational parameter of the payload for the registered operator.

In step 503, the received data may be processed. In some instances, the data may be processed at a database (e.g. cloud based database) so as to properly associate the operational parameters only for the registered operator in question, and not for additional registered operators. Optionally, the input may be processed so as to determine whether the designated operational parameters are proper operational parameters for the component. In some instances, processing the data may comprise determining a current operator of the UAV of a plurality of different operators for the UAV.

In step 505, the operational parameter for the component may be imposed. In some instances, the operational parameter for the component may be imposed specifically to the registered operator of the component. Optionally, steps 501-505 may be repeated for a different operator of the UAV. For example, the user interface may be configured to receive a second input from the user, wherein the second input designates an operational parameter for the component specifically for a second designated operator of the UAV.

In some instances, a non-transitory computer readable medium may be provided for implementing the method 500. The non-transitory computer readable medium may comprise code, logic, or instructions to: with aid of one or more processors, individually or collectively, receive data regarding an input received from a user at a user interface, wherein the input designates an operational parameter for the component specifically for a registered operator of the UAV; process the data; and impose the operational parameter for the component specifically to the registered operator of the UAV.

Figure 22:
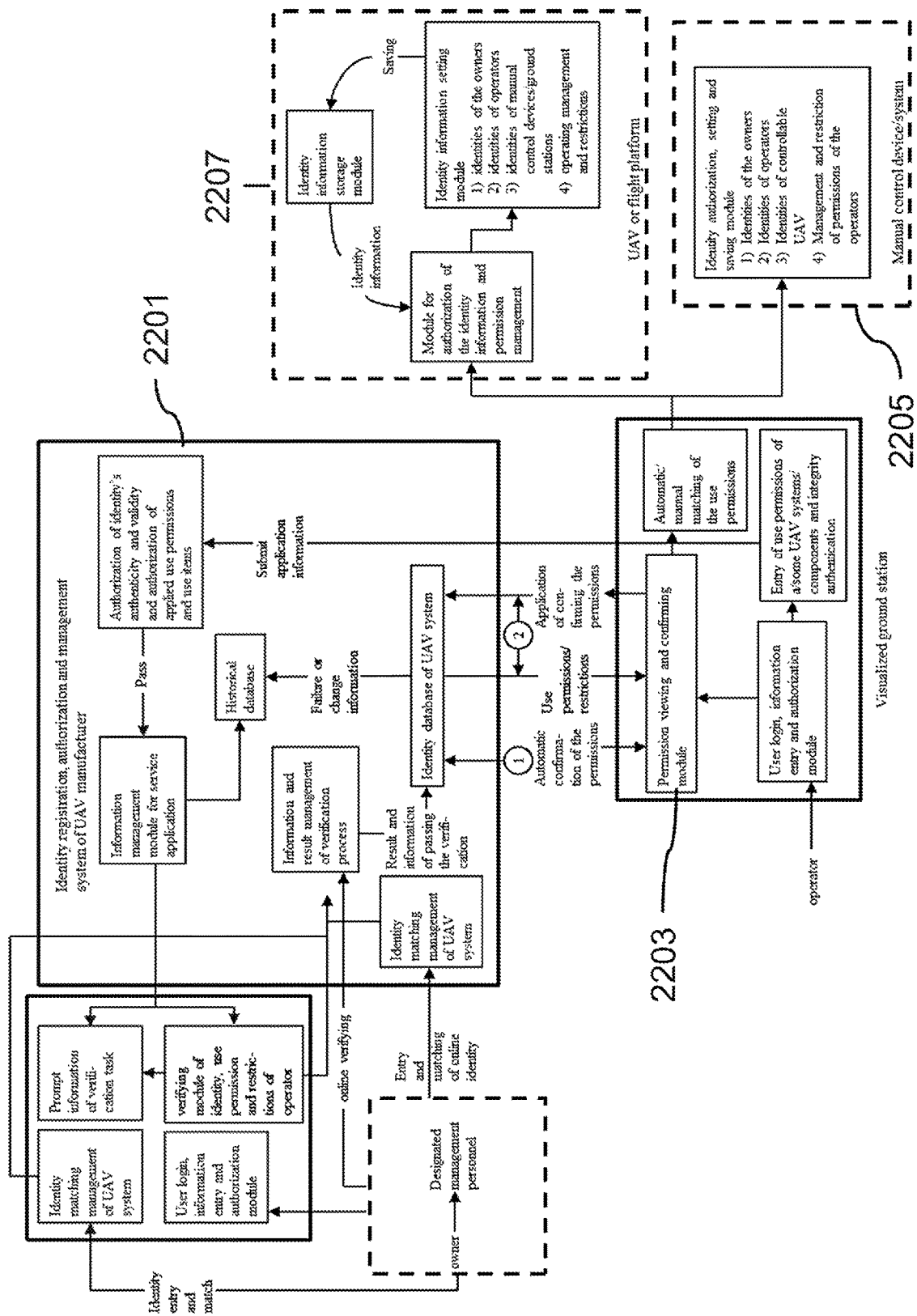

In some instances, a system may be provided for implementing the method 500. The system may comprise: one or more processors, individually or collectively configured to: receive data regarding an input received from a user at a user interface, wherein the input designates an operational parameter for the component for a registered operator of the UAV; process the data; and impose the operational parameter for the component specifically to the registered operator of the UAV. FIG. 22 describes an exemplary system utilized for granting and managing use permission for operators, in accordance with embodiments. For example, an owner or a designated management personnel may use a platform 2201 to manage the users (e.g. operators), designated management personnel, UAV components, etc. In some instances, the platform may be of an identity registration, authorization and management system of a UAV manufacturer or relevant authority. The platform may receive an application information from a visualized ground station by an operator who desires to operate a UAV. The operator may input information in a user login, information entry and authorization module which may form a basis of the application. The information may be passed to an information management module for service application which is further transmitted to a verifying module which relevant owners or designated management personnel may interact with and confirm for use. In some instances, a historical database may exist (e.g. stored information regarding past, verified, or confirmed operators) and automatic confirmation of the permission may be granted to the operators. Relevant use permissions or restrictions may be imposed depending on permission levels for the operators.

In some instances, users and/or designated management personnel may be required for identity entry and matching before being permitted to management UAV components and/or operators, substantially as described throughout. The platform may comprise a database, which may confirm permission automatically for an operator, or alternatively, in response to receiving a request from the user. In some instances, the operator may be able to view the permission parameters (e.g. operational parameters) for example, at a permission viewing and confirming module 2203. Optionally, the confirmed permissions may be transmitted to various other UAV components such as manual control device or UAV which may or may not comprise a module for authorization of the identity information and permission management. In some instances, an identity information setting module of the UAV components may further store or manage an identity of owners, identity of operators, identities of UAV components, and/or operational parameters such as restrictions associated with the UAV.

Based on confirmation of permissions and designation of relevant use permissions or restrictions, relevant information may be transmitted to various other UAV components such as manual control device systems 2205 and flight platforms 2207, e.g. UAVs. At the manual control device, identity authorization, setting, and saving module may set or confirm an identity of the owner, identity of operators, identity of controllable UAVs or UAV components, and management and restriction of permissions of the operators. At the UAV or flight platform, a module for authorization of the identity information and permission management may receive the relevant information and further transmit it to an identity information setting module which may set or confirm an identity of the owners, identity of operators, identities of manual control devices/visualized ground stations, and/or operating management and restrictions. This information may be saved in an identity information storage module in some instances.

Factors Governing Flight Regulations

Figure 6:
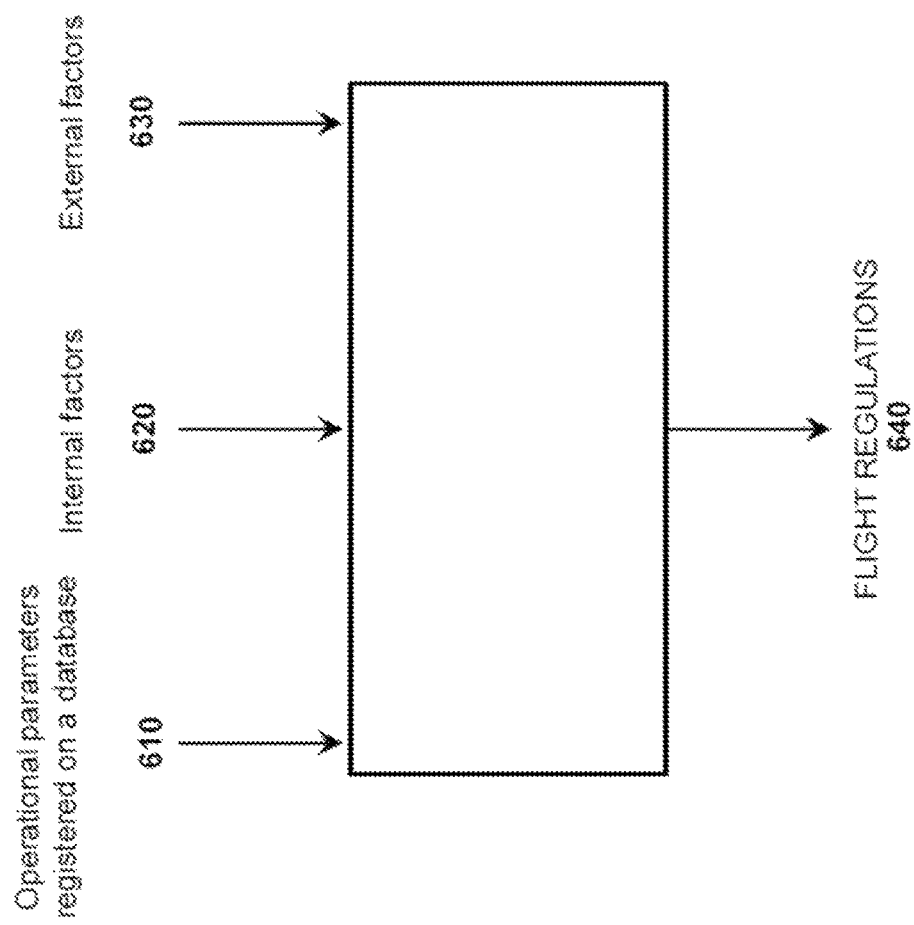
FIG. 6 shows an example of various factors that may go into generation of a set of flight regulations, in accordance with embodiments.

In some instances, additional factors may be taken into consideration for imposing operational parameters, or flight regulations, on operation of the UAV. FIG. 6 shows an example of various factors that may go into generation of a set of flight regulations, in accordance with embodiments. For instance, operational parameters (e.g. registered or input with a database) 610, internal factors 620, and/or external factors 630 may go into generation of a set of flight regulations 640. In some instances, only user operational parameters is considered, only internal factors are considered, only external factors are considered, or any number or combination of these factors are considered in generating the set of flight regulations. While headings of operational parameters registered on a database, internal factors, and external factors are shown for purposes of describing various factors, it is to be understood that the various factors are not necessarily partitioned into the three headings and that any of the factors described herein may be subsumed in any of the other headings 610, 620, 630.

Operational parameters registered on a database may be as substantially described above. For example, these parameters may be designated on a database by a user, e.g. owner, manager, or operator of a UAV component.

Internal factors may include factors internal to the UAV components. Internal factors may be taken into consideration for generation of a set of flight regulations. In some instances, the internal factors may include predetermined factors, or user imposed factors. For example, a UAV component (e.g. UAV) may comprise various rules, or requirements. In some instances, the UAV component may comprise a requirement for authentication, e.g. as described above. Alternatively or in addition, a UAV component may comprise a requirement for verification. Optionally, a UAV component may comprise a requirement for connecting to a database, or having online connectivity. In some instances, a UAV component may comprise a requirement for transmitting data to a database and/or receiving data from the database. In some instances, compliance with the requirement may be checked for. In some instances, compliance with the requirement may be checked for in accordance with a predetermined criterion. The predetermined criterion may also be referred to as a triggering condition. For example, the triggering condition may elicit the requirement for authentication. The requirement and/or the predetermined criterion may be preset, e.g. by a UAV component manufacturer. Alternatively or in addition, the predetermined criteria may be user configured, e.g. set according to a user input such as an owner, manager, and/or operator input.

The predetermined criterion, or triggering condition, may be of any type. For example, the criterion may be a temporal condition, a geo-spatial condition, electrical condition, etc. In some instances, a plurality of different criterions must be met for the requirement to be fulfilled. As one example, a UAV component may comprise a requirement for authentication at a set time interval. The set time interval may be equal to or less than about 3 days, 2 weeks, 7 days, 5 days, 3 days, 2 days, 24 hours, 18 hours, 12 hours, 6 hours, 3 hours, or 1 hour. In some instances, a UAV component may comprise a requirement for authentication according to a change in distance. The change in distance may be measured according to any available means, e.g. GPS signal. The change in distance may be measured from a previous location where the requirement (e.g. authentication for the UAV component) was met. As another example, a UAV component may comprise a requirement for authentication according to a location. For example, if an operator of a UAV is attempting to operate the UAV in an area not recognized by the system or previously designated (e.g. by a user such as an owner, manager, or operator or by a relevant authority such as a jurisdictional authority or UAV manufacturer), a requirement for authentication may be imposed. As another example, a UAV component may comprise a requirement for authentication according to turning on of the UAV or a UAV component. For example, if a UAV is turned on after being turned off, a requirement for authentication may be imposed. While select examples are given above, it is to be understood that the UAV may comprise various additional requirements and triggering conditions for the checking compliance with the requirements. Additionally, the requirements described with respect to authentication requirements may be equally applicable to connectivity requirements, e.g. to the database.

In some instances, compliance with the requirements referred to above may be configured to impose no additional flight regulations, e.g. in addition to operational parameters registered on a database and/or flight regulations imposed by external factors. In some instances, non-compliance with the requirements may be configured to impose additional flight regulations. For example, non-compliance with the requirements may disable a UAV component (e.g. UAV, payload, sensor, etc). For example, non-compliance with the requirements may ground a flight of a UAV. For example, non-compliance with the requirements may report a suspicious activity to a user (e.g. owner, manager, operator, etc) of a UAV component or report a suspicious activity to a relevant authority such as jurisdictional authority or UAV component manufacturer. Optionally, non-compliance with the requirements may act to supply a warning message to a current operator of a UAV component. Various additional flight regulations substantially described elsewhere may additionally be imposed.

In some instances, a degree of flight regulation that is imposed may depend on failure to comply with the requirement and/or correspond with a degree of deviation from the predetermined criterion, or triggering condition. Degree of flight regulation referred herein may refer to a strictness and/or severity of flight restriction. For example, if the predetermined criterion is a time interval (e.g. 24 hours), a warning signal may be provided the first time a requirement (e.g. authentication) is not complied with. If another 24 hours have passed and the requirement is still not complied with, flight of a UAV may be restricted (e.g. altitude restriction, speed restriction, acceleration restriction, distance restriction, time restriction, etc). Subsequently, for continued non-compliance, a UAV component may become inoperational (e.g. locked) and/or a report may be submitted to a relevant authority.

In some instances, external factors may be taken into consideration for imposing, or generating, flight regulations. External factors may include factors external to the UAV components. In some instances, the external factors may include predetermined factors. In some instances, external factors may include, information originating from external sources, e.g. air traffic control or geofencing devices. In some instances, information about a local environment (e.g., environmental complexity, urban vs. rural, traffic information, climate information), information from one or more third party sources (e.g., government sources, such as the FAA), or any other factors may be taken into consideration for generation of a set of flight regulations.

In some instances, a most restrictive flight regulation may be imposed, taking into consideration the various factors. For example, external factors may require that a UAV fly beneath 400 feet and that the payload be turned off. Operational parameters registered on a database may require that the UAV fly beneath 200 feet and have no payload restrictions. If so, the actual flight regulation that is imposed may require that the UAV fly beneath 200 feet and that the payload be turned off. Alternative in some instances, a hierarchy may be provided to the different factors that affect flight regulation. The rules from the factors higher up in the hierarchy may prevail. The rules from the factors higher up in the hierarchy may prevail regardless of whether they are more or less restrictive than the factors lower in the hierarchy.

Increasing Flight Regulation with Non-Compliance

Figure 7:
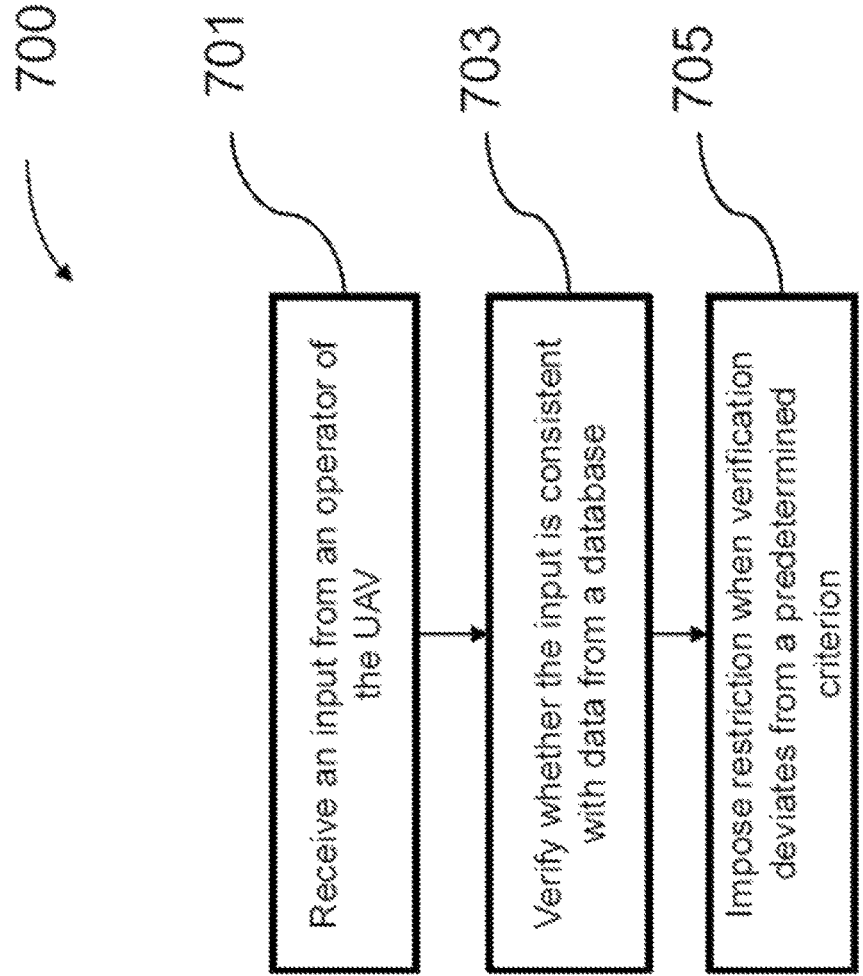
FIG. 7 illustrates a method for restricting a flight of an unmanned aerial vehicle (UAV) for a user, in accordance with embodiments.

FIG. 7 illustrates a method 700 for restricting a flight of an unmanned aerial vehicle (UAV) for a user, in accordance with embodiments. The method may be utilized to generate a flight regulation taking into consideration various factors as referred to above. In step 701, an input from an operator of a UAV may be received. Optionally, the input module may recognize and/or identify the operator. In some instances, the input module may comprise a fingerprint sensor and may receive the operator's fingerprint. In some instances, the input module may comprise imaging device, or image capture means. A captured image may be operably coupled to an image recognition means such as an image recognition algorithm which may be able to recognize and/or identify the operator. In some instances, the input module may be configured to receive a user ID and/or password from the operator. Alternatively or in addition, the input module may be configured to receive a credit card or other items from the operator. Various other input modules and types of input they may accept are described elsewhere in this application.

Steps 703-705 may be implemented individually or collectively with aid of one or more processors. The one or more processors may be located on board a mobile device, on board the UAV, and/or on board a controller. In step 703, whether the input is consistent with data received from a database may be processed or verified according to a predetermined criterion. In some instances, processing a consistency of the data with the input may comprise authenticating the operator. The database may be as substantially described elsewhere. For example, the database may be a cloud based database. The database may provide a means to configure operational parameters for various UAV components specifically for individual users or operators. In some instances, the data may comprise verified information associated with a user of the UAV. Optionally, the data may comprise a registered information associated with a user of the UAV. The verified information and/or registered information may comprise a verified identity of a user, and/or a verified permission level of the UAV for the user.

As used herein, not receiving data from a database may run afoul of the predetermined criterion, as it may not allow processing to check whether the input is consistent with data from a database. In some instances, the predetermined criterion may be verifying consistency at a predetermined time interval. Optionally, the time interval is equal to or less than 24 hours. Alternatively or in addition, the predetermined criterion may be processing consistency within a predetermined change in distance of the UAV. The predetermined change in distance may be measured from a previous location where data from the database had been received. In some instances, the predetermined criterion may be processing a consistency before a taking off of the UAV. Alternatively or in addition, the predetermined criterion may be processing the consistency before turning off of the UAV. The predetermined criterion may be configurable by the user and/or may be configured according to a relevant jurisdictional authority or a manufacturer of the UAV.

In step 705, a restriction on flight of the UAV may be imposed. In some instances, if processing is successful, the restriction may be imposed according to operational parameters, e.g. designated by owners or manager. In some instances, if processing is successful, the restriction may be imposed according external factors. If processing is unsuccessful to verify the consistency, restrictions on flight of the UAV may be imposed. In some instances, a degree of restriction on the flight that is imposed may be correlated with a degree of deviation from the predetermined criterion.

The restriction may comprise any restriction or flight regulation described throughout. In some instances, the restriction imposed on the UAV comprises a warning signal. Optionally, the warning signal is a visual, sensory, and/or auditory signal. In some instances, the restriction imposed on the UAV may comprise a restriction on a speed, altitude, or acceleration of the UAV. Alternatively or in addition, the restriction imposed on the UAV may comprise a restriction on an operational mode of the UAV. The operational mode of the UAV may comprise an autonomous mode of the UAV. In some instances, the restriction imposed on the UAV may prevent a taking off of the UAV. Optionally, the restriction imposed on the UAV may force a landing of the UAV. In some instances, the restriction imposed on the UAV may comprise a restriction on a component utilized in operation of the UAV. The component may be a payload of the UAV, such as an imaging device.

In some instances, a system may be provided for restricting a flight of an unmanned aerial vehicle (UAV) for a user. The system may be capable of implementing the method 700. In some instances, the system may comprise: one or more receivers configured to receive data from a database comprising verified information associated with a user of the UAV; an input module configured to receive an input from an operator of the UAV; and one or more processors, individually or collectively, configured to: verify, according to a predetermined criterion, whether the input is consistent with the data; and impose a restriction on the flight of the UAV when the verified input is determined to be inconsistent with the data, wherein a degree of restriction on the flight is correlated with a degree of deviation from the predetermined criterion.

In some instances, a non-transitory computer readable medium may be provided for restricting a flight of an unmanned aerial vehicle (UAV). The non-transitory computer readable medium may be capable of implementing the method of 700. The computer readable medium may comprise code, logic, or instructions to: receive, at an input module, an input from an operator of the UAV; with aid of one or more processors, individual or collectively, verify, according to a predetermined criterion, whether the input is consistent with data from a database received at one or more receivers, wherein the data comprises verified information associated with a user of the UAV; and impose a restriction on the flight of the UAV when the verification is determined to deviate from said predetermined criterion, wherein a degree of restriction on the flight is correlated with a degree of deviation from the predetermined criterion Offline Authentication As described above, UAV components may comprise various requirements or may operate according to various rules, e.g. online connectivity, communication with a database, authentication according to predetermined criteria, etc. For example, logging in by an operator and/or authentication of the operator may be required for taking off of a UAV. As another example, connection to a database, or online connectivity, may be required for configuring management authority for individuals, configuring operational parameters for various users and/or UAV components. In some instances, it may be desired to have full functionality of managing various users, UAV components, and allowing UAV components' operations where online connectivity may be limited, or unavailable. In areas where online connectivity is limited, it may still be desired to provide an avenue to authenticate and/or manage UAV component(s) appropriately according to registered identities and/or operational parameters. Accordingly, ability to store and/or manage identity information (e.g. of UAV components or users) and operational parameters in an offline manner may be beneficial.

In some instances, one or more storage modules for storing data from the database may be utilized by the authentication system. The one or more storage modules may store information about the users, remote controllers, and/or the UAV component(s). Alternatively or in addition, the one or more storage modules may store information regarding an operation of the UAV component(s). For example, the one or more storage modules may store information regarding a flight of a UAV. The one or more storage modules may include one or more memory storage units. Optionally, the one or more storage modules may comprise a cache memory and/or independent flight recording modules.

In some instances, the one or more storage modules may be configured to store information according to a predetermined criterion. The predetermined criterion may be based on time, a location, memory capacity, etc. For example, the one or more storage modules may be configured to store information for a time equal to or less than about 6 months, 3 months, 2 months, 1 month, 2 weeks, 7 days, 5 days, 3 days, 2 days, 24 hours, 18 hours, 12 hours, 6 hours, 3 hours, 2 hours, 1 hour, or 30 minutes. Alternatively or in addition, the one or more storage modules may be configured to store information within a preconfigured location, or for a predetermined change in distance. Alternatively or in addition, the one or more storage modules may be configured to store information until a data capacity of the one or more storage modules is reached. The one or more storage modules may be provided as a UAV component. In some instances, the one or more storage modules may be provided on-board, or may be integrated with, any of the previously described UAV components. For example, the one or more storage modules may be provided on a UAV, on a manual controller, on a mobile device, etc. In some instances, the one or more memory storage units may be provided together or may distributed over a network and/or at different locations. In some instances, the memory storage may be a cloud storage system. The memory storage may include one or more databases storing the information.

Utilizing the one or more storage modules may provide ability to authenticate, and/or manage operation of UAV components without real time connectivity to a database, which has been substantially described as being utilized in managing identity information (e.g. of UAV components or users) and operational parameters for the UAV components, for various users. Utilizing the one or more storage modules may provide ability to manage various users or designate various authority levels or operators without real time connectivity to a database, e.g. while substantially maintaining functionality of the overall system having online connectivity. In some instances, the one or more storage modules may maximize a region in which UAV component(s) can operate in, as well as maximize an operating capacity of UAV component(s). Beneficially, the one or more storage modules may enable operation of a UAV with accountability and according to a user set operational parameters in areas where connectivity to a database is limited. In some instances, the one or more storage modules may ensure a reliability and integrality of flight data.

Online Identity and Permission Management

Figure 8:
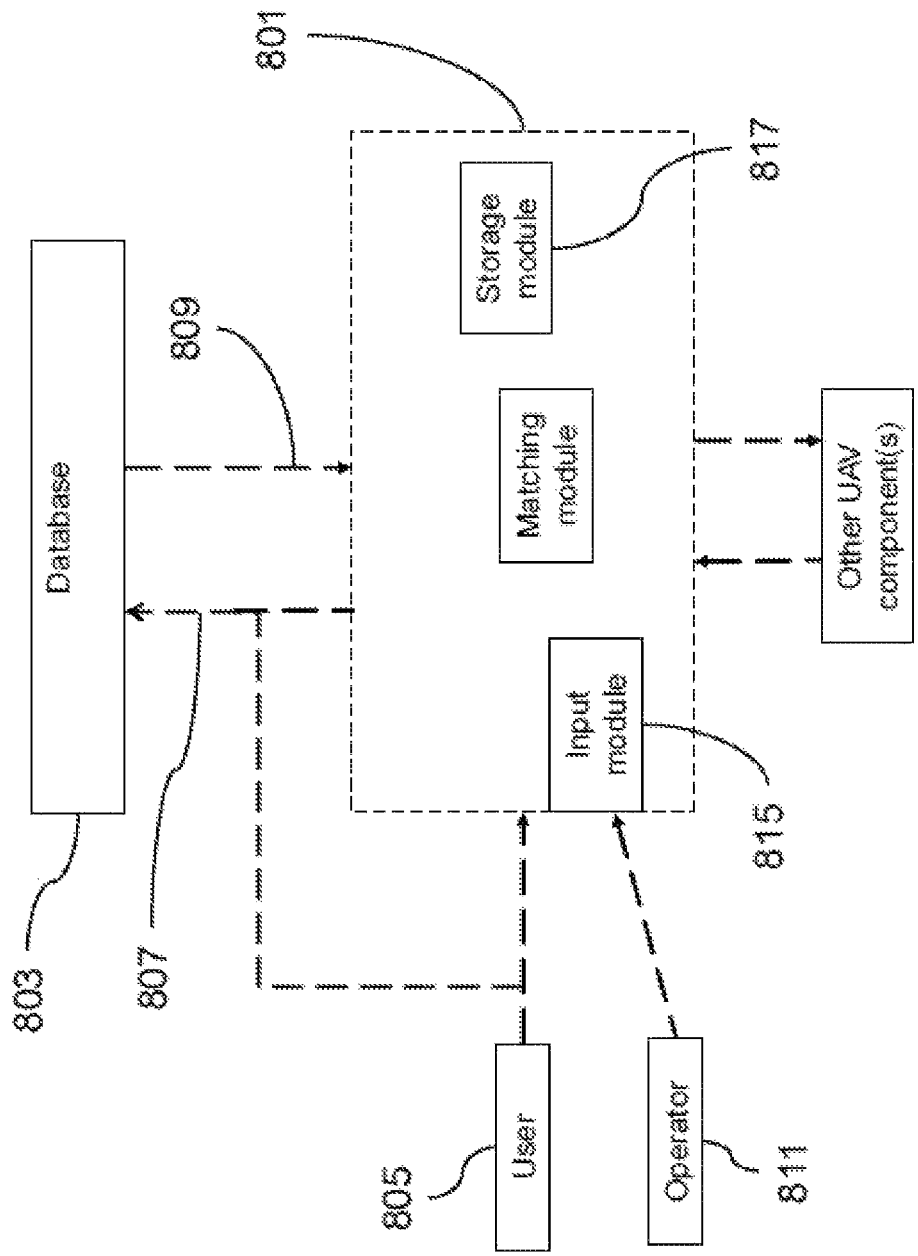
FIG. 8 illustrates a system for managing offline identity and permission management for a UAV with network connectivity, in accordance with embodiments.

FIG. 8 illustrates a system for managing offline identity and permission management for a UAV with network connectivity, in accordance with embodiments. As illustrated, UAV component(s) 801 may communicate with a database 803, e.g. online database. The online database may be accessible for example, through a platform that enables users to manage and/or configure various identity related information (e.g. UAV component identity, user identity, etc) as well as operational parameters for UAV components for users. In some instances, the platform may be provided by various relevant authorities such as UAV manufacturers or jurisdictional authorities such as governmental authorities.

A user 805 may manage various other users (e.g. lower authority level users), UAV components, and/or operational parameters for the UAV components for desired users substantially as described elsewhere. For example, using a remote controller (e.g. mobile device) or computer, the user may provide an input 807 to affect information contained within the database. In some instances, the input may be associate identities of various components such that they are registered to be utilized with one another. Alternatively or in addition, the input may register identities of various components for use. As another example, the user may associate specific user IDs to UAV components and/or may register operational parameters for the specific users. As another example, the user may designate managers or operators for UAV components. Once the configuration is completed, identity information and/or operational parameters that are input may be transmitted to the database or platform. In some instances, the transmitted identity information and/or operational parameters may be confirmed by the platform, e.g. registered in the database.

Subsequently, the confirmed information may be transmitted 809 to a UAV component(s) 801, such as a mobile device. In some instances, the confirmed information may be transmitted to the UAV component in real time, or according to a predetermined criterion such as a temporal or spatial condition. For example, the confirmed information may be configured to be transmitted to, or received by, one or more UAV components at a predetermined time interval. Alternatively or in addition, the confirmed information may be configured to be transmitted to, or received by, one or more UAV components in response to a stimulus. For example, an operator (e.g. current operator) 811 of the UAV component may provide an input at input module 813. As one example, the operator may provide a user ID and a password. Based on the input, data may be transmitted to the database 803 to request relevant information to be transmitted to UAV component(s) 801. For example, based on input, a request for the confirmed information to be transmitted to the UAV components may be transmitted.

The confirmed information may be received by the UAV component(s) as described above. Optionally, the received confirmed information may be stored in one or more storage modules 817. Once the above configuration and confirmation is completed, a user or operator may be capable of being authenticated and operating the UAV reliability and according to user defined operational parameters without real time connection to the database, e.g. in an offline manner.

Figure 9:
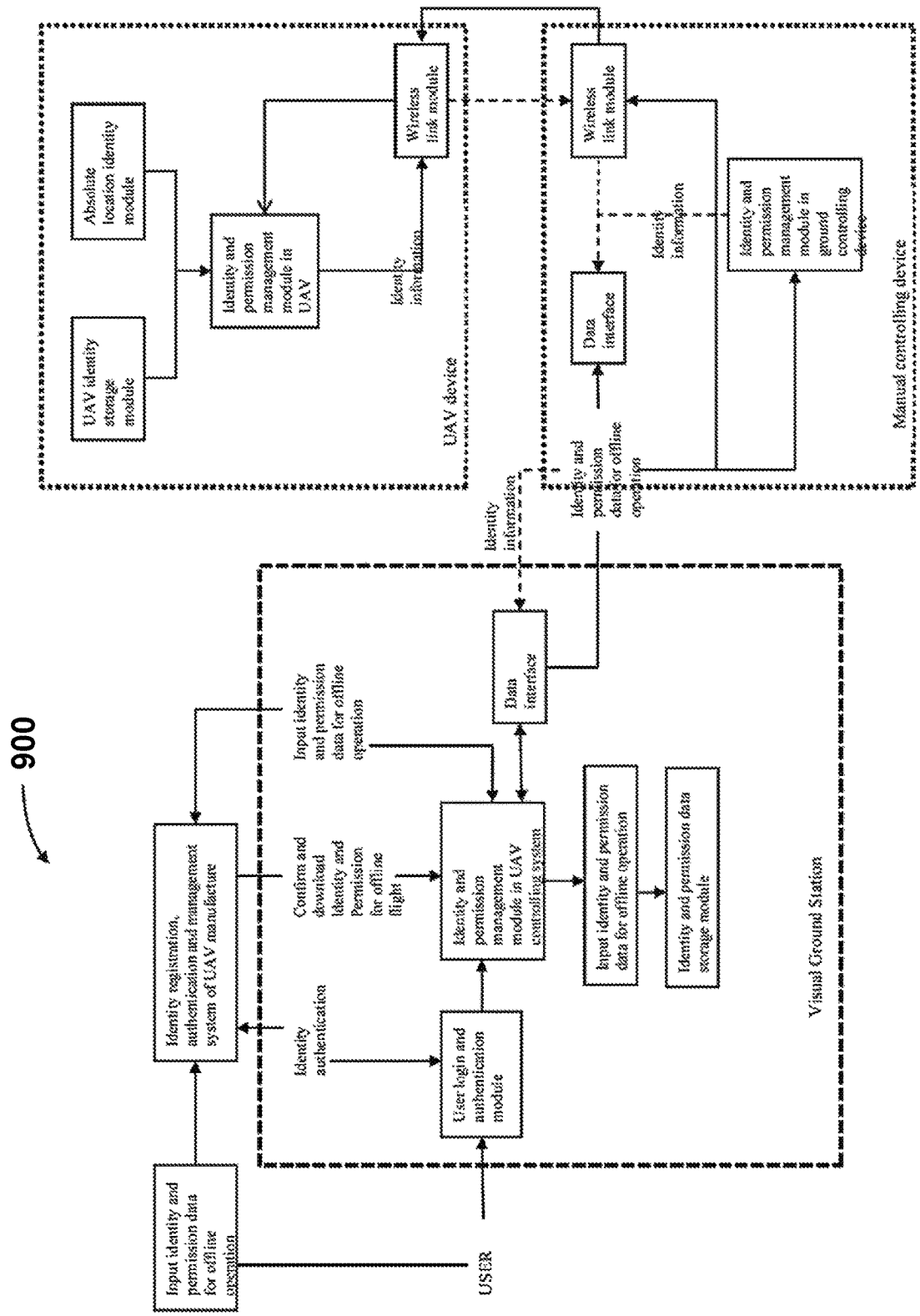
FIG. 9 illustrates a more detailed view of a system for managing offline identity and permission management for a UAV with network connectivity, in accordance with embodiments.

FIG. 9 illustrates a more detailed view of a system 900 for managing offline identity and permission management for a UAV with network connectivity, in accordance with embodiments disclosed herein. For example, a user may input identity and/or permission data at a platform described above. The platform may in some instances comprise a database for storing the information, e.g. identity and permission data for offline operation. The platform may be provided as an identity registration, authentication and management system. The platform may be offered by a manufacturer of UAV component(s) and/or by relevant authorities such as jurisdictional authorities.

The platform and/or user may interact with various UAV components. As an example, a user may input a user login at a visual ground station of the UAV. The information at a database (or platform) may be transmitted to a user login and authentication module to authenticate the user login. In some instances, the information at a database may additionally transmit an identity and permission data to an identity and permission management module of the UAV component such as a visual ground station. Optionally, the modules of the UAV components may communicate (e.g. receive and/or transmit) data with the platform. In some instances, the communication capability between the UAV components and the platform may enable the most up to date information to be contained in the various components. Optionally, the various information described herein may be stored in an identity and permission data storage module, e.g. for offline operation.

The information described herein may further be transmitted through a data interface. The data interface may utilize wired and/or wireless means. The data interface may transmit and/or receive data with various other UAV components. As an example, the identity and permission data received at a visual ground station may be transmitted via a data interface to a manual controlling device's data interface. The data may further be authenticated or verified for the manual controlling device. Optionally, the data may be stored at a relevant module of the manual controlling device, e.g. identity and permission management module.

The information referred to above may further be transmitted through a data interface. The data interface may utilize wired and/or wireless means. In some instances, the information may be transmitted via a wireless link module to another UAV component. For example, a manual controlling device's wireless link module may be utilized to transmit and/or receive data with a wireless link module of a UAV. In some instances, information such as the identity and permission data may be transmitted from the manual controlling device to the UAV. In some instances, the identity and permission data may be stored in an identity and permission management module of the UAV. Optionally, the identity and permission data may be utilized in to verify or authenticate a UAV identity. For example, a UAV identity may be located at a UAV identity storage module. The UAV identity may be compared against an identity and permission data transmitted by other UAV components, e.g. the manual controlling device. Alternatively or in addition, the identity and permission data may be utilized to verify or validate an operational parameter (e.g., permission parameter) of the UAV. For example, sensors located on board the UAV may compare sensor data to permission data transmitted by other UAV components. For example, an absolute location identity module may compare internal data to permission data received by the UAV.

Offline Identity and Permission Management

Figure 10:
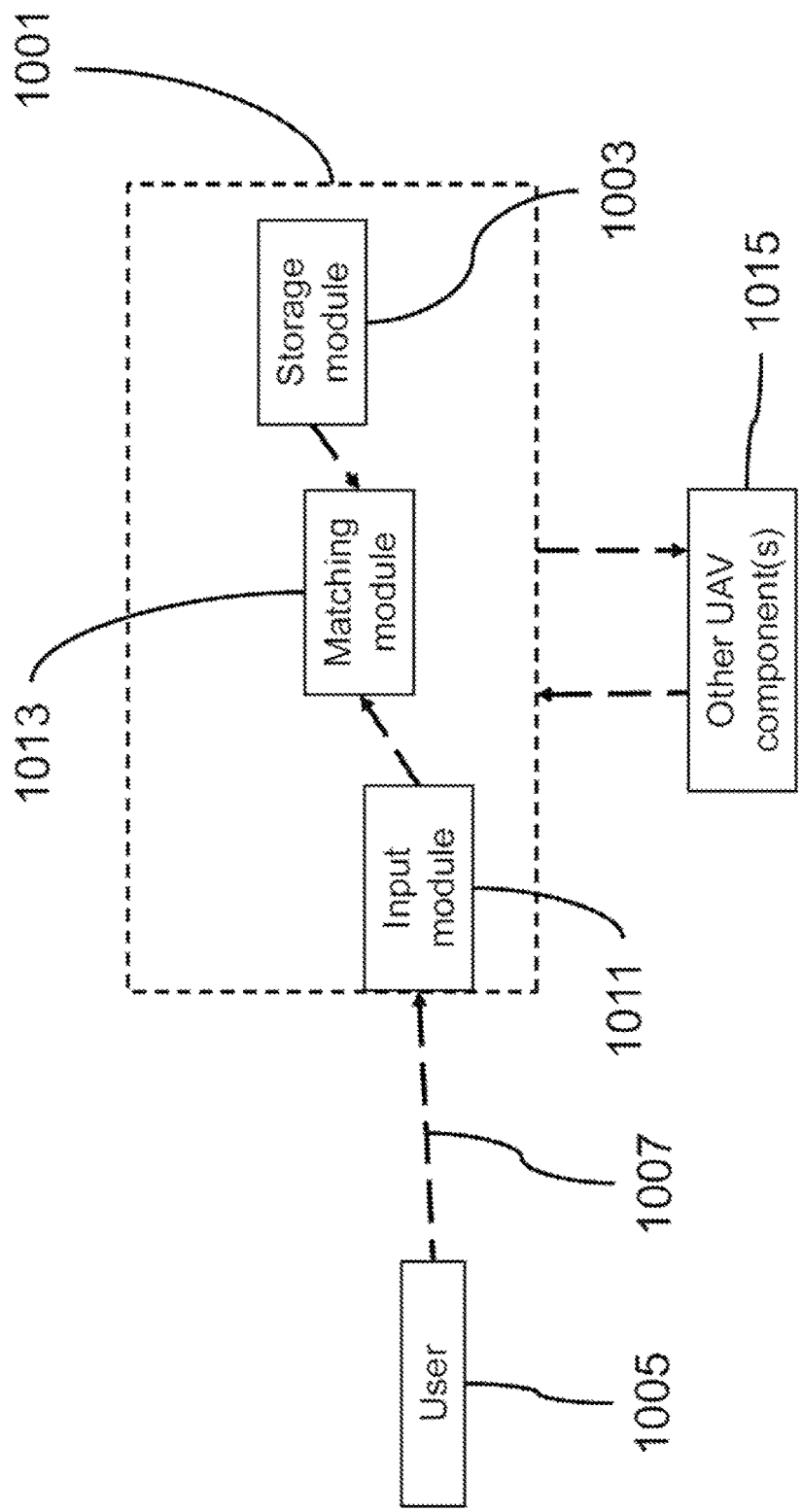
FIG. 10 illustrates a system for managing offline identity and permission management for a UAV not having network connectivity, in accordance with embodiments.

FIG. 10 illustrates a system for managing offline identity and permission management for a UAV not having network connectivity, in accordance with embodiments. FIG. 10 may illustrate an example of configuration shown in FIG. 8 that has lost connection with the database. The component(s) 1001 may comprise the one or more storage modules 1003. The one or more storage modules may comprise confirmed information regarding identity information and/or operational parameters as referred to above. In some instances, an input 1007 may be received from a user 1005. The user may in some instances be a user that provided an input to affect information of the database, e.g. when there was connectivity to the database. Alternatively, the user may be a different user. The user may or may not be registered to operate UAV component(s) 1001.

The input of the user may be received at an input module 1011. The input module and type of information received by the input module are substantially described above. As one example, the operator may provide a user ID and a password at the input module. The input received at the input module and confirmed information in the database may in some instances be processed. For example, data regarding the input received at the input module and registered information may be processed to check a consistency of information and/or authenticate the user. In some instances, the processing, verifying, or checking for consistency may take place at a matching module 1013 that checks for a consistency between the different data or information. As one example, if the input received at the input module comprises information regarding an operator that is not registered in the database, a consistency of information in the one or more storage modules may be not verified. As another example, if the input received at the input module comprises information regarding a user that is registered with the database, the one or more storage modules may additionally process additional information, e.g. operational parameters associated with the user, authority level of the user, etc. As described above, this process may take place without connectivity to the database (e.g. online connectivity) while a validity of the user's identity and associated authority level and/or operational parameters can still be processed and appropriately imposed.

If the user is an operator of a UAV, upon completeness of the identity and permission authentication, a matching between various other components 1015 of the UAV may be checked as further described below. In some instances, a matching process with other UAV components may take place when the UAV, UAV components are powered on. If the matching check is successful, the operator may fly the UAV in an offline mode. In some instances, if a relevant UAV component is not accessible or detached for performing the above referenced process, an operator identity authentication request or a login information may be transmitted to other (e.g. remote, temporary, etc) authentication systems to perform the authentication. Upon completing an authentication process, a matching between various components of the UAV may be performed, as discussed above.

In some instances, during offline operation or operation without connectivity to the database, a user (e.g. authorized user) may reconfigure the identity and permission within the UAV system. For example, upon completeness of the identity and permission authentication, a user, depending on his authority level, may enable another user to operate UAV components. In some instances, the ability to operate the UAV components may be temporarily given. A user having a higher authority level may define and/or restrict another user's operation permission while there is no connectivity to the database. For example, the owner of the UAV component may set a valid time, region and/or operational parameters for an operator. If the operator operates UAV components outside the scope of the previous settings, the operator may not be able to operate the UAV components. Advantageously, this approach may enable the designated operator to operate the UAV components only in accordance with settings as configured by the owner.

The identity data and/or flight data during offline flight may be saved in the one or more storage modules 1003. The saved data may be transmitted to the database, e.g. when there is online connectivity. The saved data may be encrypted. The saved data in some instances may be stored in a read only mode. Optionally, unless the saved data is submitted to the database and a confirmation of successful and complete data submission is received from the database, the operator may not delete or amend the data.

In some instances, the saved data may be required to be uploaded to the database according to a predetermined criterion. The predetermined criterion may be based on time, a location, memory capacity, etc. For example, the one or more storage modules may be configured to upload the saved data at a time interval equal to or less than about every 6 months, 3 months, 2 months, 1 month, 2 weeks, 7 days, 5 days, 3 days, 2 days, 24 hours, 18 hours, 12 hours, 6 hours, 3 hours, 2 hours, 1 hour, or 30 minutes. Alternatively or in addition, the one or more storage modules may be configured to upload the saved data within a preconfigured location, or for a predetermined change in distance. Alternatively or in addition, the one or more storage modules may be configured to upload the saved data if a data capacity of the one or more storage modules is reached. Alternatively or in addition, the one or more storage modules may be configured to upload the saved data according to a condition of a UAV. For example, the upload may be required to take place before a UAV is turned off. Optionally, subsequent offline flight (e.g. flight without connectivity to the database) may be prevented if the saved data is not uploaded or insufficiently uploaded according to the predetermined criterion. In some instances, the upload requirement and/or the predetermined criterion may be user configurable. Alternatively, the upload requirement and/or the predetermined criterion may be compulsory and/or may be determined by relevant authorities, e.g. jurisdictional authorities or UAV component manufacturers.

Figure 11:
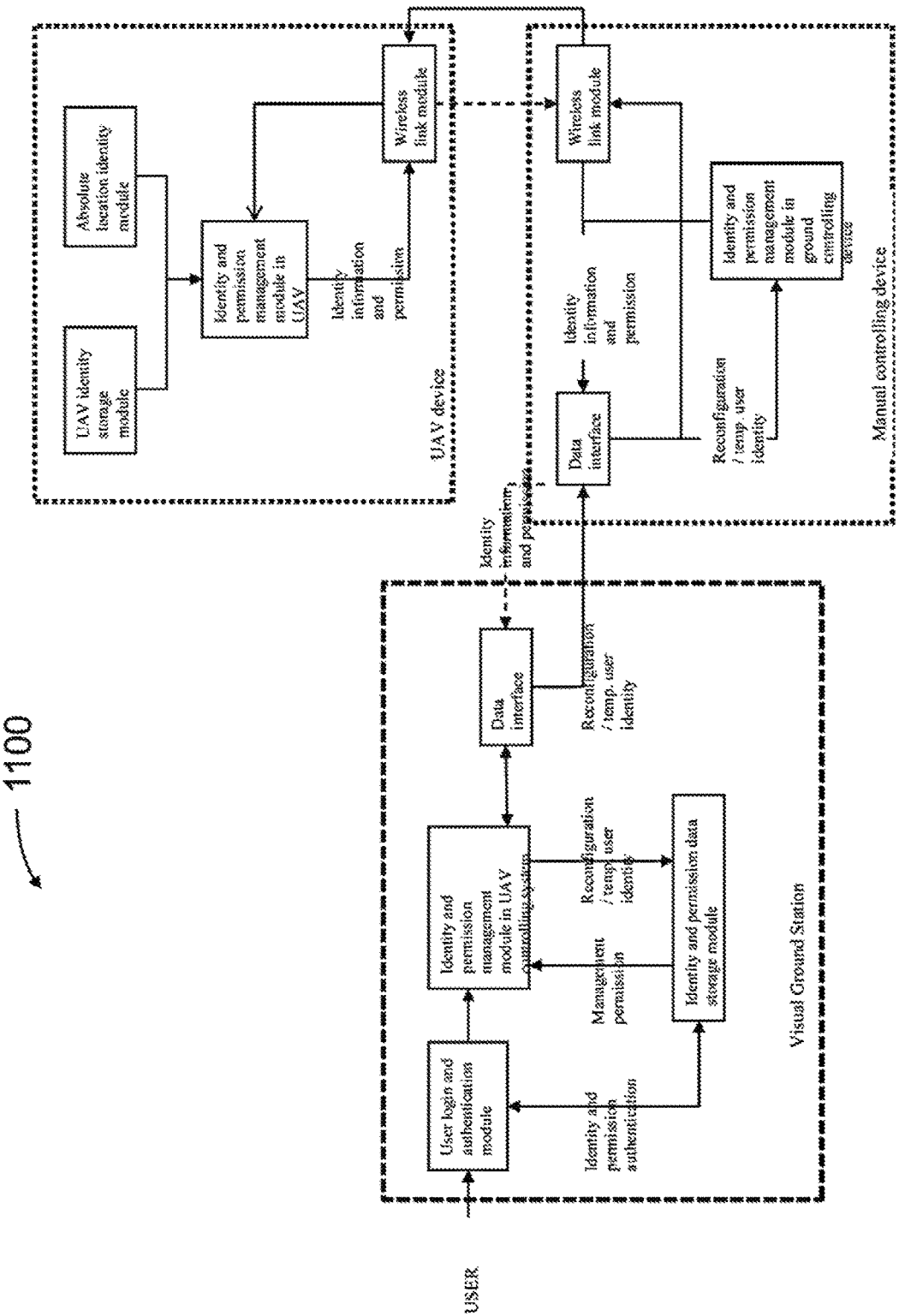
FIG. 11 illustrates a more detailed view of a system for managing offline identity and permission management for a UAV without network connectivity, in accordance with embodiments.

FIG. 11 illustrates a more detailed view of a system for managing offline identity and permission management for a UAV without network connectivity, in accordance with embodiments. In some instances, FIG. 11 illustrates a system of FIG. 9 when no network connectivity with a platform or online database described throughout can be established. For example, a user may have input identity and/or permission data previously at a platform described above which had been stored in an identity and permission data storage module.

A user may input a user login at a visual ground station of the UAV. The user may be the same, or a different user than the one who had input the identity and/or permission data at the platform. The information stored at the identity and permission data storage module may be transmitted to the user login and authentication module to authenticate the user login. For example, the information may be compared against what had been input by the user. In some instances, the information stored at the identity and permission data storage module may additionally transmit an identity and permission data to an identity and permission management module of the UAV component such as a visual ground station. This may operate to define permitted operations of the UAV, or configure an operational parameter of the UAV. In some instances, the identity and permission management module of the UAV controlling system may enable a reconfiguration of permission parameters, e.g. depending on a user authority level.

The information described herein may further be transmitted through a data interface. The data interface may utilize wired and/or wireless means. The data interface may transmit and/or receive data with various other UAV components. As an example, the identity and permission data received at a visual ground station may be transmitted via a data interface to a manual controlling device's data interface. The data may further be authenticated or verified for the manual controlling device. Optionally, the data may be stored at a relevant module of the manual controlling device, e.g. identity and permission management module.

The information referred to above may further be transmitted through a data interface. The data interface may utilize wired and/or wireless means. In some instances, the information may be transmitted via a wireless link module to another UAV component. For example, a manual controlling device's wireless link module may be utilized to transmit and/or receive data with a wireless link module of a UAV. In some instances, information such as the identity and permission data may be transmitted from the manual controlling device to the UAV. In some instances, the identity and permission data may be stored in an identity and permission management module of the UAV. Optionally, the identity and permission data may be utilized in to verify or authenticate a UAV identity. For example, a UAV identity may be located at a UAV identity storage module. The UAV identity may be compared against an identity and permission data transmitted by other UAV components, e.g. the manual controlling device. Alternatively or in addition, the identity and permission data may be utilized to verify or validate an operational parameter (e.g., permission parameter) of the UAV. For example, sensors located on board the UAV may compare sensor data to permission data transmitted by other UAV components. For example, an absolute location identity module may compare internal data to permission data received by the UAV.

Offline Flight Management

Figure 12:
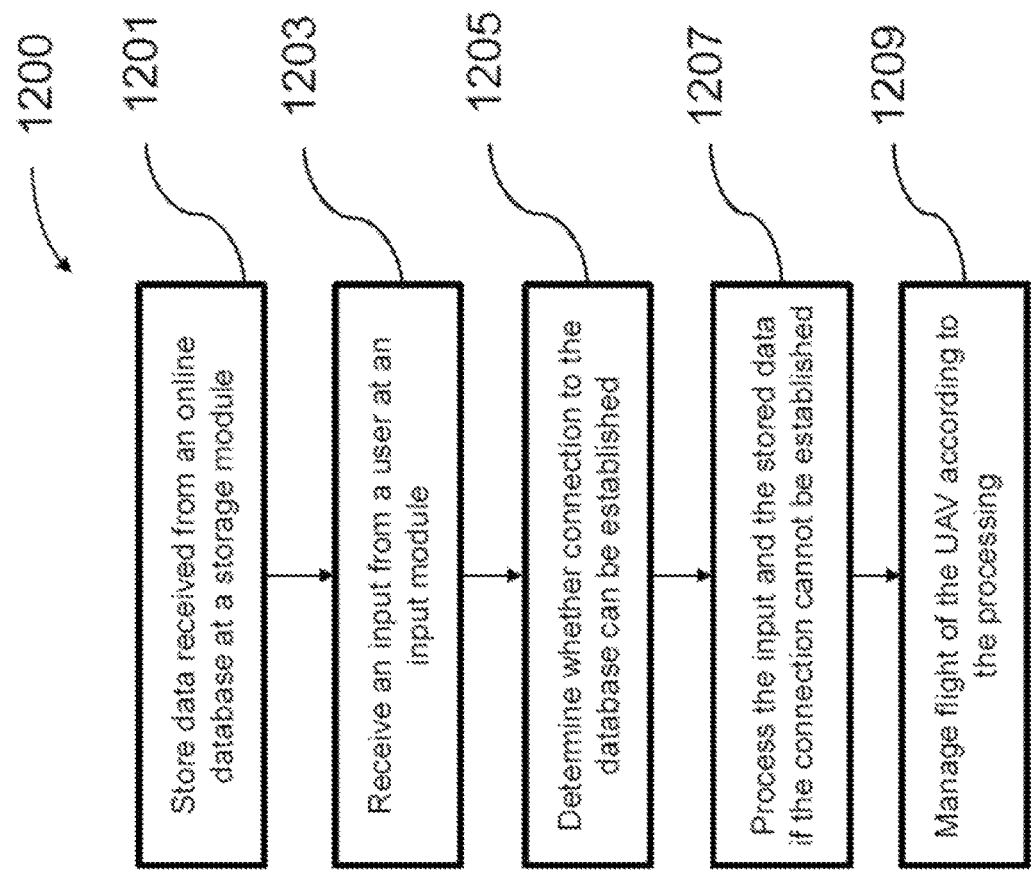
FIG. 12 illustrates a method for managing a flight of an unmanned aerial vehicle (UAV), in accordance with embodiments.

FIG. 12 illustrates a method 1200 for managing a flight of an unmanned aerial vehicle (UAV), in accordance with embodiments. In step 1201, data received from an online database may be stored at one or more storage modules. The database may be a cloud based database. In some instances, the data may comprise verified information associated with a user. The verified information may comprise verified, and/or registered information regarding an identity of the user and/or a permission level of the user. The permission level used throughout may refer to an authority level of the user. In some instances, the permission level may refer to an operational parameter of a UAV component for the user. In some instances, the data may be received with aid of one or more receivers configured to receive the data from the online database. The one or more receivers may be provided on any UAV component provided herein.

The one or more storage modules may comprise a cache memory. Furthermore, the one or more storage modules may be located on any UAV component described herein. For example, the one or more storage modules may be located on board a mobile device, on board the UAV, and/or on board a manual controller. The one or more storage modules may be configured to store the data for a predetermined period of time. In some instances, the predetermined period time may be equal to or less than 24 hours. Alternatively or in addition, the one or more storage modules may be configured to store the data at a predetermined location, or within a predetermined distance from the predetermined location. Optionally, the one or more storage modules may be configured to store the data for up to a predetermined data capacity of the one or more storage modules. In some instances, the one or more storage modules may be configured to store the data for a predetermined operating session. For example, the one or more storage modules may be configured to store the data while the UAV is running.

In step 1203, an input from a user may be received at an input module. The input module is substantially described elsewhere. For example, the input module may comprise a fingerprint sensor and/or an image recognition means. In some instances, the input module may be configured to receive a user ID and a password from the user. Optionally, the input module may be configured to receive a credit card of the user.

One or more processors may be provided for implementing steps 1205-1209. In step 1205, whether a connection to the database can be established may be determined. In some instances, the connection to the database may be via wireless communication. The wireless communications may comprise radiofrequency communications, WiFi communications, Bluetooth communications, or infrared communications. The wireless communications may be indirect communications. The wireless communications may comprise 3G, 4G, or LTE communications.

In step 1207, the input from the user and the stored data may be processed if the connection to the database cannot be established. Optionally, if connection to the database can be established, data received from the database and the input from the user may be processed. In some instances, the one or more processors may be configured to process the input and the stored data to check for a consistency between the input and the verified information. For example, processing the user input and the data (e.g. received from the database or saved in the storage module) may comprise checking for a consistency between information contained in the input and the data as substantially described elsewhere. Processing the user input and the data may comprise authenticating the identities (e.g. user identity, UAV component identity), permission levels (e.g. user authority level, operational parameters for UAV components), etc.

In step 1209, the flight of the UAV may be managed according to the processing of the input and the stored data. In some instances, the one or more processors may be configured to generate a signal to restrict a flight of the UAV, thereby managing the flight of the UAV. The restriction may be a flight regulation of the UAV. In some instances, the one or more processors may be configured to generate a signal to prevent the flight of the UAV if the input and the verified information are inconsistent.

Optionally, the one or more storage modules may be further configured to store flight data of the UAV. The stored flight data may further be transmitted to the database, e.g. with aid of a communication module for transmitting the stored flight data. In some instances, the communication module may be configured to upload the flight data of the UAV to the database according to predetermined criteria. The predetermined criterion may include, but are not limited to, a change in time, change in location, a change in data capacity of the one or more storage modules, a beginning of an operating session, or ending of the operating session. Optionally, the method described above may be repeated for additional users. For example, the method may be utilized to manage the flight of an unmanned aerial vehicle (UAV) for a second user, wherein the data comprises verified information associated with a second user, and wherein the input module is configured to receive an input from the second user.

In some instances, a system for managing a flight of an unmanned aerial vehicle (UAV) may be provided. The system may be capable of implementing the method 1200 and may comprise: one or more storage modules configured to store data received from an online database, wherein the data comprises verified information associated with a user; an input module configured to receive an input from the user; and one or more processors, individually or collectively configured to: determine whether a connection to the database can be established; process the input and the stored data if the connection to the database cannot be established; and manage the flight of the UAV according to the processing of the input and the stored data.

In some instances, a non-transitory computer readable medium for managing a flight of an unmanned aerial vehicle (UAV) may be provided. The computer readable medium may be capable of implementing the method 1200 and may comprise code, logic, or instructions to: store, at one or more storage modules, data received from an online database, wherein the data comprises verified information associated with a user; receive, at an input module, an input from the user; with aid of one or more processors, individual or collectively, determine whether a connection to the database can be established; process the input and the stored data if the connection to the database cannot be established; and manage the flight of the UAV according to the processing of the input and the stored data.

UAV Components

Various components may be utilized in operation of a UAV, as previously described herein. For example, a UAV may include one or more propulsion units that may propel the UAV. In some instances, the propulsion units may include rotor assemblies, which may include one or more motors driving rotation of one or more rotor blades. A UAV may be multi-rotor UAV which may include a plurality of rotor assemblies. The rotor blades, when rotating, may provide a propulsive force, such as lift, to the UAV. Various rotor blades of the UAV may rotate at the same speed or at different speeds. Operation of the rotor blades may be used to control flight of the UAV. Operation of the rotor blades may be used to control take-off and/or landing of the UAV. Operation of the rotor blades may be used to control maneuvering of the UAV in an airspace.

As another example, a UAV may include a flight control unit. The flight control unit may generate one or more signals that may control operation of the rotor assemblies. The flight control unit may generate one or more signals that control operation of one or more motors of the rotor assemblies, which may in turn affect the speed of rotation of the rotor blades. The flight control unit may receive data from one or more sensors. The data from the sensors may be used to generate the one or more flight control signals to the rotor assemblies. Examples of sensors may include, but are not limit to, GPS units, inertial sensors, vision sensors, ultrasonic sensors, heat sensors, magnetometers, or other types of sensors. The flight control unit may receive data from a communication unit. The data from the communication unit may include commands from a user. The commands from the user may be inputted via a remote controller that may be transmitted to the UAV. The data from the communication unit and/or sensors may include detection of a geo-fencing device or information transmitted from a geo-fencing device. The data from the communication unit may be used to generate the one or more flight control signals to the rotor assemblies.

In some embodiments, a flight control unit may control other functions of the UAV instead of, or in addition to, flight. The flight control unit may control operation of the payload on-board the UAV. For example, the payload may be an image capturing device, and the flight control unit may control operation of the image capturing device. The flight control unit may control positioning of a payload on-board the UAV. For example, a carrier may support a payload, such as an image capturing device. The flight control unit may control operation of the carrier to control positioning of the payload. The flight control unit may control operation of one or more sensors on-board the UAV. This may include any of the sensors described elsewhere herein. The flight control unit may control communications of the UAV, navigation of the UAV, power usage of the UAV, or any other function on-board the UAV.

As another example, a UAV may operate with aid of one or more storage modules, communication modules, sensors, controllers, etc which have been substantially described above. In some instances, each of the UAV components may comprise an identity module. The identity module may be unique to the UAV component. The identity module may be able to uniquely identify and differentiate the UAV component from other UAV components. The UAV component identifier stored in the identity module may not be altered. The UAV component identifier may be stored in the identification module in an unalterable state. The identity module may be a hardware component that stores a unique UAV component identifier for the component in a manner that prevents a user from altering the unique identifier.

The UAV component identifier may be issued by a database, as described elsewhere herein. The database may be off-board the UAV. The identity module may be configured to receive the UAV component identifier once, and not alter either after the initial receipt. In other instances, the UAV component identifier and the key may be fixed upon receipt, and may never be written. Alternatively, the UAV identifier may only be modified by an authorized party. A regular operator of the UAV may not be able to alter or modify the UAV component identifier in the identity module.

The identity module may be implemented as a Universal Subscriber Identity Module (USIM). The identity module may be a write-once memory. The identity module may optionally not be externally readable.

The identification module may be inseparable from a corresponding UAV component. The identity module may not be removed from the rest of the corresponding UAV component without damaging a function of the UAV component. An individually may not manually remove the identity module from the flight control unit.

In some embodiments, the identity module may be issued by a control entity. A control entity may be any entity that exercises some form of authority for identifying the UAVs or over the UAVs. In some instances, the control entity may be a relevant jurisdictional authority such as a government agency or an operator authorized by the government. The government may be a national government, state/province government, city government, or any form of regional government. The control entity may be a government agency, such as the Federal Aviation Administration (FAA), Federal Trade Commission (FTC), Federal Communications Commission (FCC), National Telecommunications and Information Administration (NTIA), Department of Transportation (DoT), or Department of Defense (DoD). The control entity may be a regulator. The control entity may be a national or an international organization or corporation. The control entity may be a manufacturer of the UAV or a distributor of the UAV.

In some instances, different UAV components may be utilized in combination depending on circumstances. For example, a single flight crew may utilize different manual controllers to control a UAV and/or may be allowed to control different UAVs to carry out different flight tasks. In some instances, to allow UAV components to be utilized as provided herein, it may be beneficial to impose certain conditions for their operations. While exemplary principles and conditions are outlined below, it is to be understood that the conditions are not absolute, and that various other conditions may be contemplated by a person of skill in the art.

Exemplary Conditions for a Manual Controller

Before a user of the manual controller obtains the manual controller or uses it for the first time, it may be required for an identity of the remote controller to be registered and to be associated with a mobile device for control authority to be acquired. Before acquiring the control authority, the manual control device may be unable to communicate with the mobile device and/or the UAV except in limited circumstances. Before acquiring the control authority, the manual controller may be unable to instruct the UAV or establish a data link with the mobile device.

The control authority of the manual controller may be classified as owner authority, manager authority, and/or operator authority. The operator authority may be specified and established by the owner or designated manager of the remote controller. In some instances, the owner or manager of the remote controller may set a service time and service areas for the operator.

Identity information of the manual controller and personnel having control authority should be consistent with the information stored in the database. The owner may cancel the control authority of the manual control device, e.g. via the mobile device, computer, etc. After cancelling the control authority, other authorized personnel may set and acquire the control authority of the owner. Before the owner cancels the control authority of the owner, other personnel may not change the control authority of the owner. The owner may have the priority for managing the authority and may add, change or delete the authority of others.

Exemplary Conditions for a UAV

Before a user of the UAV obtains or flies the UAV for the first time, it may be required for an identity of the UAV to be registered for control authority to be acquired. Before obtaining the control authority, the UAV may be unable to communicate with a remote controller (e.g. mobile device or manual controller) or perform instructions.

The control authority of the UAV may be classified as owner authority and operator authority. The operator authority may be specified and established by the owner of the UAV. Alternatively, the operator authority may be applied for (e.g. by a potential operator) and may be confirmed by the owner. The operator may control the operations of the UAV via the operator authority. In some instances, the owner of the UAV may set a service time and areas for the operator.

Identity information of the UAV and personnel having control authority should be consistent with the information stored in the database. The owner may cancel the control authority of the UAV, e.g. via the mobile device, computer, etc. After cancelling the control authority, other authorized personnel may set and acquire the control authority of the owner. Before the owner cancels the control authority of the owner, other personnel may not change the control authority of the owner. The owner may have the priority for managing the authority and may add, change or delete the authority of others.

Identity authorization (e.g. identity matching) may be conducted each time the mobile device and the manual controller are connected, or initially when communication is established. If the identities are not consistent or not within the use authority, the connection may not be established and a warning message may be prompted.

Other Conditions

When adding, changing or deleting relevant authority in the manual controller or the UAV, it may be required for a network connection to be established in real time and the confirmation and authorization should be conducted with the database. Furthermore, the identity information of the operator may be recorded and saved in real time during each flight of the UAV. In some instances, it may be required for the UAV components to have one sufficient network connection during a predetermined time interval, or according to other criteria. For example, it may be required for the UAV components to have a network connection during a predetermined number of flights. If this condition is not met, a UAV may be configured to not perform its mission or fly and may provide an alarm. The UAV component(s) in operation may collect and record the identity information or flight data in real time or at predetermined intervals. The identity information and/or flight data may be transmitted to the database in real time or at regular time intervals.

The UAV components, individually or in combination, may be configured to confirm an authenticity of the identity information during a predetermined time interval, or according to other criteria. For example, it may be required for the UAV components to confirm the authenticity during a predetermined number of flights. This may help in avoiding others using the UAV and/or remote controller without authorization. Optionally, when setting and changing the identities of the operators, UAVs, on-board devices, manual control devices, etc and authorizing the use permissions of the UAV system and its components, real time connection to the database may be required. If an operator makes continuous errors in logging in, or if the identity authorization has failed a set number of times, the system may become in a locked state and resetting and reauthorization of the identity may be required with the database.

UAV Component Identity Matching

Prior to flight of a UAV, mutual confirmation of identities between each component utilized in operation of the UAV may ensure reliability and maximize safety of flight. Any and/or all UAV components may require a mutual confirmation of identities, also referred as identity matching. For example, the components of the UAV system that need to be subject to identity matching may include the UAV, positional sensors, one or more storage modules, manual controller, mobile devices, etc. Optionally, an identity of the users (e.g. owner, manager, operator, etc) may be checked for a consistency with the UAV components.

Figure 13:
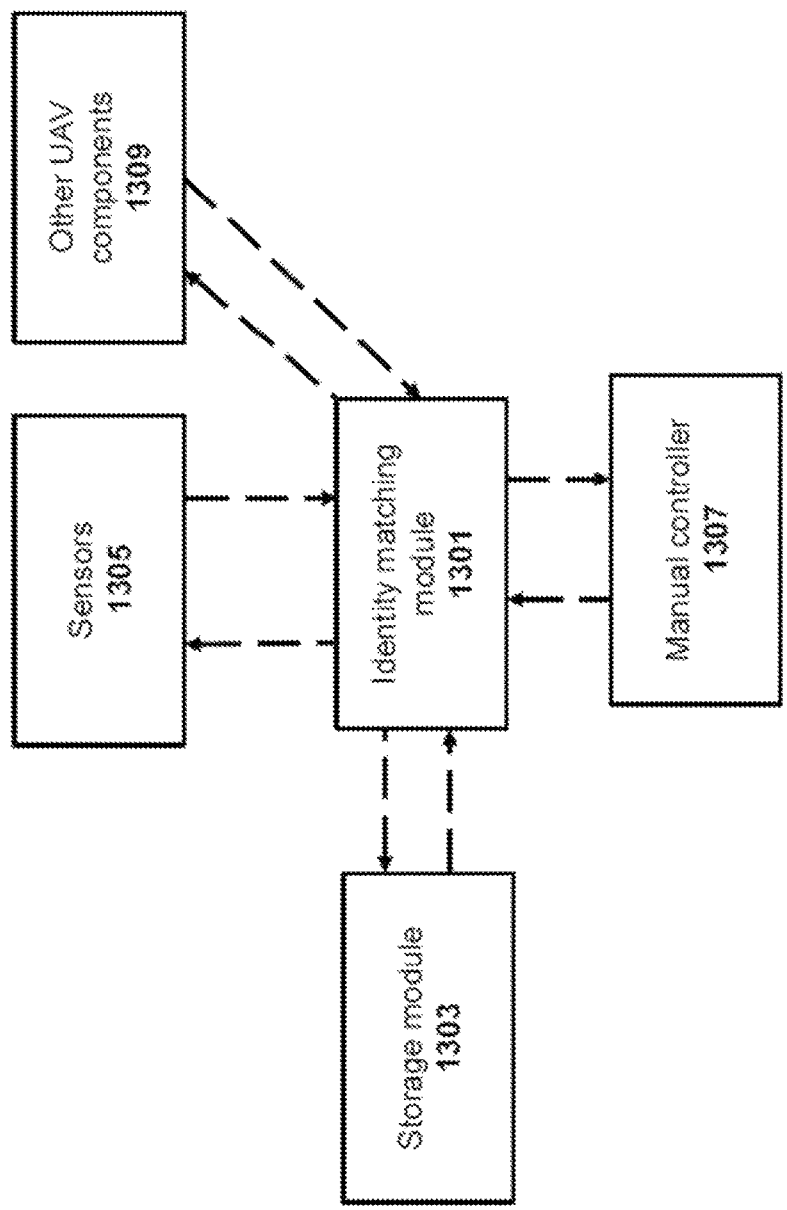
FIG. 13 illustrates an identity matching system, in accordance with embodiments.

FIG. 13 illustrates an identity matching system, in accordance with embodiments. The various UAV components 1301, 1303, 1305, 1307, 1309 may each comprise an identity information. Alternatively, some UAV components may have no identity information. In some instances, some UAV components may require addition of identity information and/or may share an identity information with other UAV components. In some instances, when a UAV is started, the UAV components may be configured to check consistency of identity information with one another. Checking for consistency may automatically occur without any user input. The checking for consistency procedure may be automatically initiated when the UAV is powered on. For instance, once the UAV is turned on, the checking for consistency procedure may take place. The checking for consistency procedure may be automatically initiated when the UAV starts flight. The checking for consistency procedure may be automatically initiated when the UAV is powering down. The checking for consistency procedure may be automatically initiated periodically during operation of the UAV (e.g., at regular or irregular time intervals). The checking for consistency procedure may also occur in response to a detected event, or in response to user input.

In some embodiments, push communications may be provided between any of the components. The push communications may include communications that are sent from a first component to a second component, where the first component initiates the communication. The communication may be sent from the first component to the second component without any request for the communication from the second component.

Optionally, pull communications may be provided between any of the components. The pull communication may include communications that are sent from a first component to a second component, where the second component initiates the communication. The communication may be sent from the first component to the second component in response to a request for the communication from the second component The communications between any of the components may be automatic. The communications may occur without requiring any instructions or input from a user. The communications may occur automatically in response to a schedule, or detected event or condition. One or more processors may receive data, and may automatically generate an instruction for the communication based on the received data. Alternatively, one or more communications between any two components may be manual. The communications may occur upon instructions or input from a user. A user may initiate the communication.

The communications may occur in continuously in real-time, may occur in accordance with a routine (e.g., on a periodic basis with regular or irregular time intervals, or in accordance with a schedule), or in a non-routine manner (e.g., in response to a detected event or condition). A first component may send communications to a second component in a continuous manner, in accordance with a routine, or in a non-routine manner.

Communications between any of the components may be direct or indirect. A communication may be provided directly from a first component to a second component without requiring any intermediary. A communication may be provided indirectly from a first component to a second component by being relayed through an intermediary. The intermediary may be one or more intermediary devices or networks. Any type of communications between any of the components may be provided in various manners, such as those described herein.

Each of the UAV components may be configured to provide an identity information. In some instances, the UAV components may provide its identity information to the identity matching module 1301. The identity matching may substantially similar to the matching module described throughout. In some instances, the identity matching module may be the matching module described in the context of authentication systems and offline management of UAV identities and permission parameters. The identity matching module may further process the identity information. Processing the identity information may comprise checking for a consistency between the identity information provided by the UAV component and a registered, or verified identity information. For example, the matching module may check for whether the UAV component is configured to be utilized for the UAV, or with various other UAV components of the UAV system. The identity matching module may verify or confirm the identity information that is provided, and provide back a matching result to the UAV component. In some instances, providing back the matching result may allow use of the UAV component. In some instances, the identity matching module may confirm the identity information and provide control authority to the manual controller 1307.

Optionally, various flight regulations may be imposed if a consistency of identities cannot be verified. For example, a UAV flight may be grounded if UAV component identities cannot be matched. In some instances, UAV components whose identities cannot be verified or matched may be rendered inoperable or may be disabled. Various other flight regulations may be imposed, which are substantially described elsewhere, if the consistency of identities cannot be verified.

Figure 14:
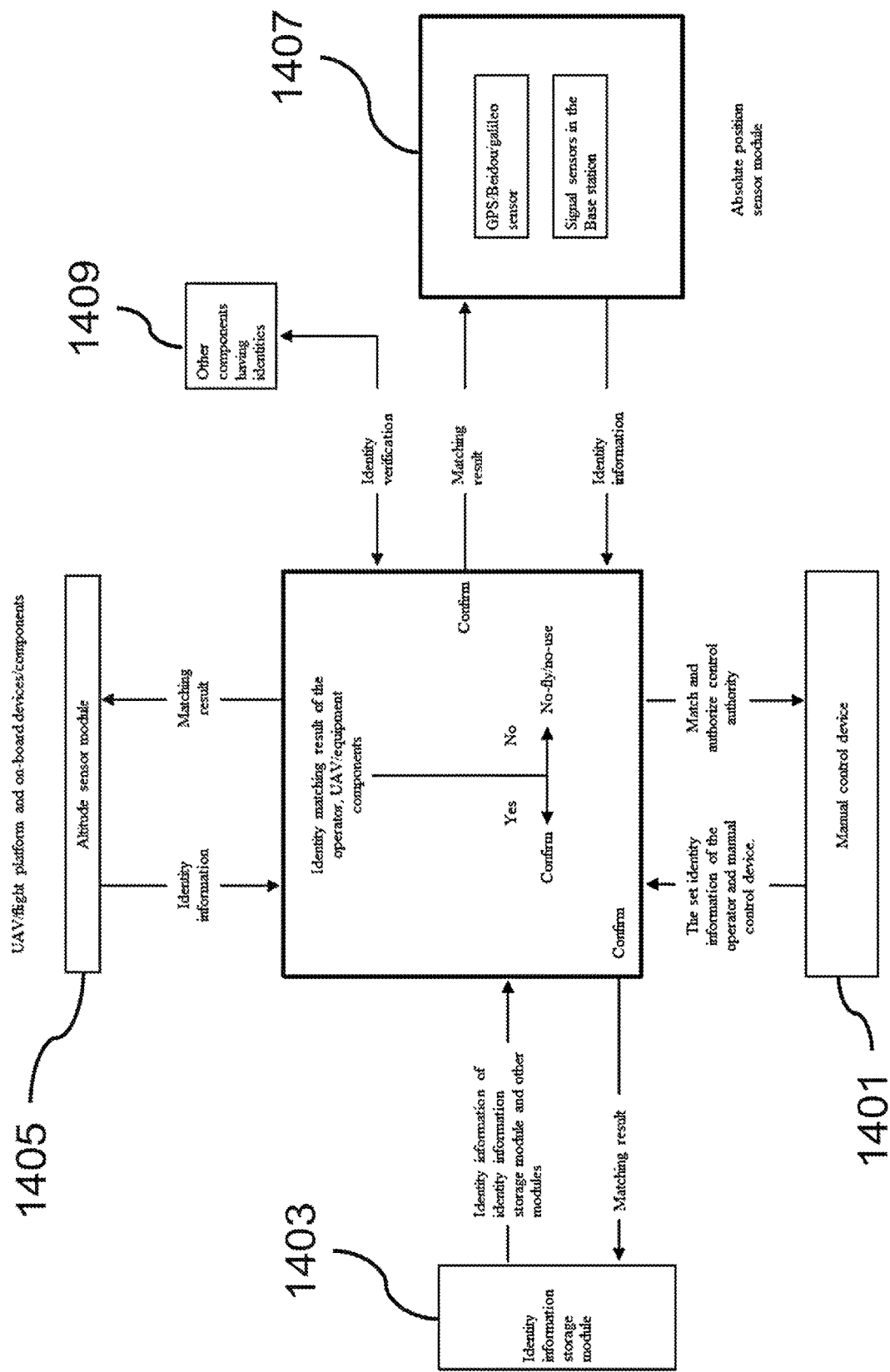
FIG. 14 illustrates a more detailed view of an identity matching system, in accordance with embodiments.

FIG. 14 illustrates a more detailed view of an identity matching system, in accordance with embodiments. Optionally, FIG. 14 may illustrate an identity system utilized while operating a UAV in a pure manual control mode. For example, no online connectivity may be available, and the storage module may or may not comprise verified information. In some instances, an identity of an operator may be unable to be verified in real time. In such instances, various flight regulations may be imposed. In some instances, the flight regulations may depend on regulations of the jurisdictions the UAV is operating in. In some instances, the flight regulations may be in accordance with user (e.g. owner or manager) designated flight regulations. For example, operation of UAV components may be allowed, e.g. for a predetermined time interval but may be prohibited without subsequent identity authorization. If an identity authorization is not finished or fails, the UAV components may be prohibited from being utilized, or the UAV may be prohibited from flying.

As an example, a manual control device 1401 may comprise a set identity information of the operator and manual control device. In some instances, an identity information storage module 1403 may comprise an identity information itself, or for other UAV components and/or modules. Optionally, various sensors may comprise identity information. For example, altitude sensor modules 1405 may comprise identity information. As another example, absolute position sensor modules 1407 (e.g. GPS/Beidou/Gallileo sensors and/or signal sensors in the base station) may comprise identity information. Various other components 1409 may comprise identity information as well. Each of the components referred above may transmit the identity information, e.g. to one another or to a central identity matching module. Optionally, a matching result may be transmitted back. In some instances, a matching result may be transmitted back after a successful matching of identities if the components are authorized or verified to be used in conjunction with one another. In some instances, if no matching is accomplished, use of the component may be prevented and/or restrictions on use may be imposed.

In some instances, the user input module may be utilized to reduce flight regulations and/or ensure safe flight and accountability. The user input module may be configured to obtain identity information (e.g. of users), and may guarantee an authenticity of the identity information of the user, or operator, before operation of a UAV component. In such situations, flight regulations may be relaxed or cancelled. For example, time limits for authorization of the authenticity of the identity information may be relaxed or cancelled.

As described elsewhere, various sensors may be utilized in operation of a UAV and may be considered a part of the UAV system. The sensors may include absolute position sensors or signal data sources. The sensors may be located on controllers, handsets, mobile devices, PCs, base stations, and the like. In some instances, the sensors may be configured to communicate with satellite positioning systems such as global positioning systems (GPS), Beidou satellite navigation systems, and Galileo systems, etc. One sensor, or several sensors with a same type may be used as part of the UAV system. Alternatively, multiple types of sensors may be used as part of the UAV system.

The sensors may include altitude sensors. Altitude sensors may be configured to measure information including a height of the UAV. The height may be measured using a variety of means. For example, the height may be measured by a radio signal or radio measurement, by positioning satellites, with aid of a barometer, with aid of an ultrasonic device, with aid of a visual imaging system, etc. The altitude sensor utilized in the UAV system may comprise one sensor, or several sensors with a same type. Alternatively, multiple types of sensors may be used as part of the UAV system for altitude measurement.

Figure 15:
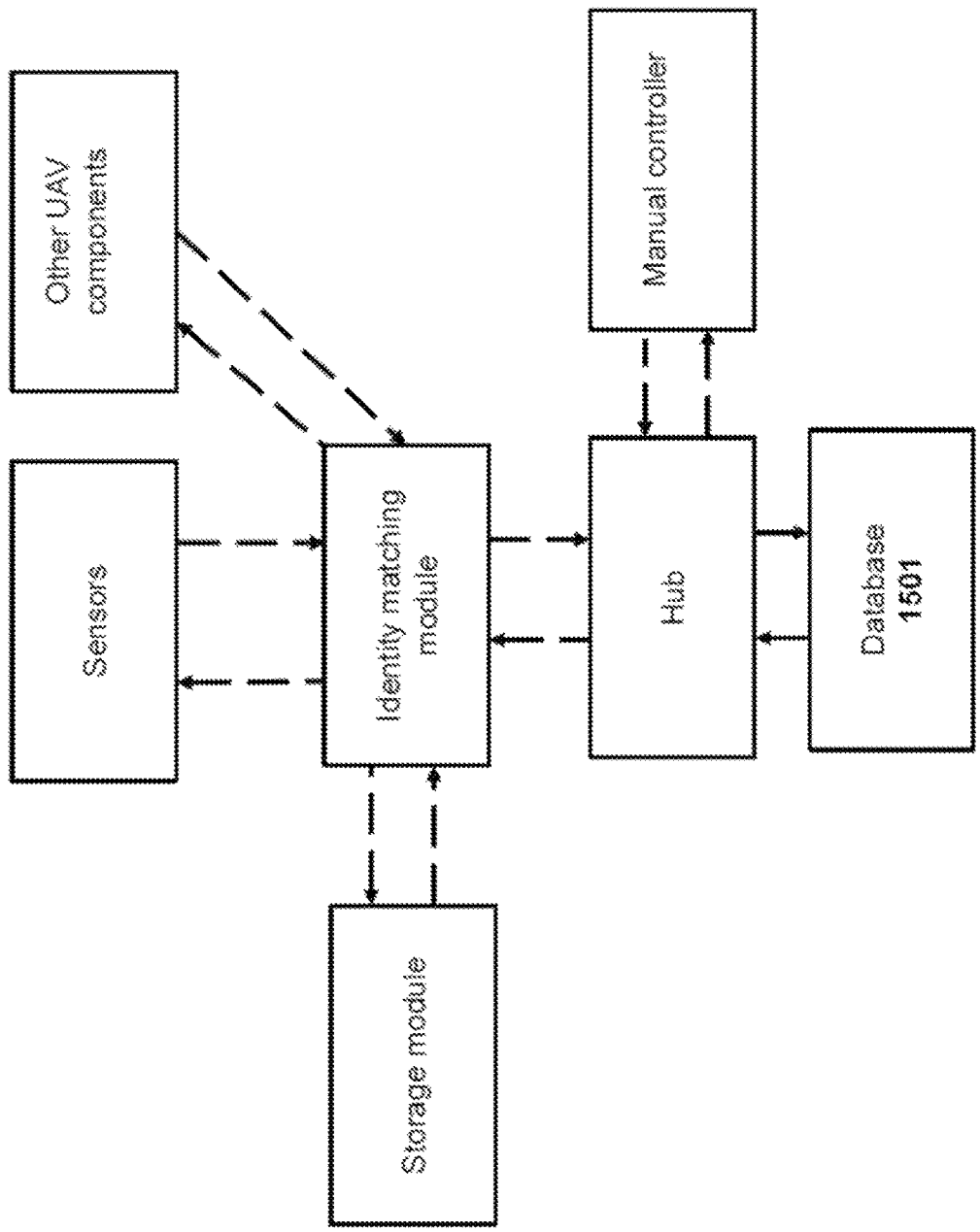
FIG. 15 illustrates an identity matching system connected to a database, in accordance with embodiments.

FIG. 15 illustrates an identity matching system connected to a database, in accordance with embodiments. As illustrated, the UAV component(s) may be connected to a database, e.g. have network connectivity. In such instances, identities of the UAV component(s) may be verified with the database 1501, e.g. via the platform. In some instances, the identities of the UAV component(s) may be matched prior to, simultaneously, or subsequent to verifying or authenticating with the database. In some instances, when a UAV is started, the UAV components may be configured to check consistency of identity information with one another. Alternatively or in addition, the UAV components may be configured to communicate with the database to check consistency of the identity information.

Optionally, various flight regulations may be imposed if a consistency of identities cannot be verified. For example, a UAV flight may be grounded if UAV component identities cannot be matched. In some instances, UAV components whose identities cannot be verified or matched may be rendered inoperable or may be disabled. Various other flight regulations may be imposed, which are substantially described elsewhere, if the consistency of identities cannot be verified.

Figure 16:
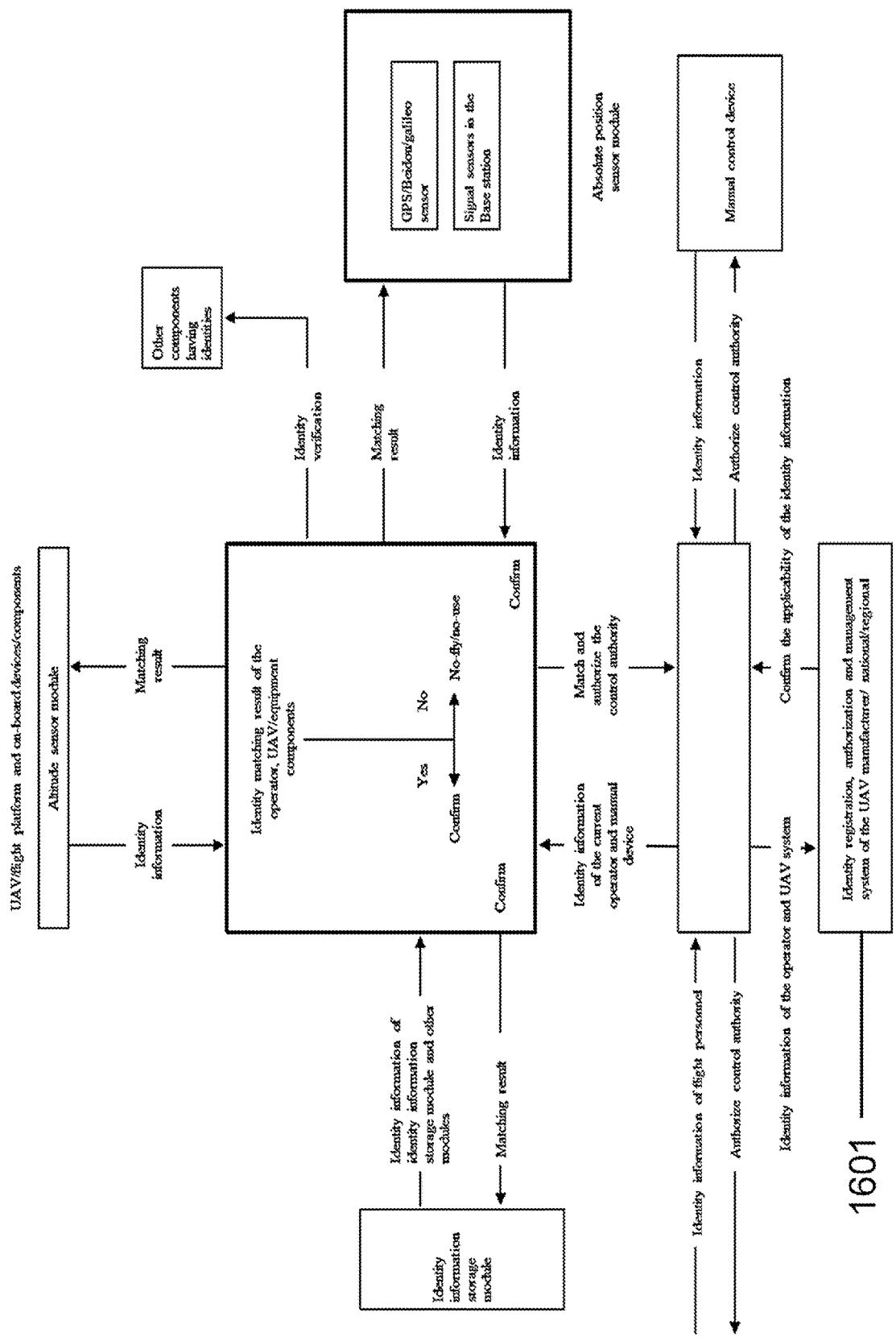
FIG. 16 illustrates a more detailed view of an identity matching system, in accordance with embodiments.

FIG. 16 illustrates a more detailed view of an identity matching system, in accordance with embodiments. In some instances, FIG. 16 may illustrate the identity matching system of FIG. 14 when online connectivity to a network is present. When connected to a network, the identities of the UAV components and/or the operator may be verified with an identity information management system (e.g. database). The identity information management system may be a platform provided by a UAV manufacturer, or relevant jurisdictional authority as previously described herein. The identity may in some instances be verified by account information and/or other identity information such as fingerprint information. In some instances, the identity matching may substantially be undertaken as described in FIG. 14. In some instances, the identity matching may substantially be undertaken as described in FIG. 14 but an identity registration, authorization, and management system of a UAV component manufacturer or relevant authority 1601 (e.g. jurisdictional or governmental authority) may receive identity information of an operator and UAV system and confirm applicability of the identity information.

Qualifications for Operating UAV Components

In some instances, to operate UAV component(s), certain qualifications may be necessary to be met. For example, information regarding the user may be considered. Information about a user may be associated with the user identifier, or user ID. For example, information about the user type (e.g., skill level, experience level, certifications, licenses, training) may be associated with the user identifier. Flight history of the user (e.g., where the user has flown, types of UAVs the user has flown, whether the user has gotten into any accidents) may be associated with the user identifier. Information about a UAV may be associated with a UAV identifier. For example, information about the UAV type (e.g., model, manufacturer, characteristics, performance parameters, level of difficulty in operation) may be associated with the UAV identifier. Flight history of the UAV (e.g., where the UAV has flown, users who have previously interacted with the UAV) may also be associated with a UAV identifier. Information associated with the user identifiers and/or the UAV identifiers may be considered in determining whether the user is authorized to operate the UAV. In some instances, additional factors may be considered such as geographical factors, timing factors, environmental factors, or any other types of factors.

If a user is designated as not being qualified to operate the UAV, the user may be prohibited from operating UAV components. In some instances, the user not qualified to operate the UAV may operate the UAV while under supervision. If no flight supervisor is designated, the user may be prohibited from operating UAV components.

Identity Matching Process

Figure 17:
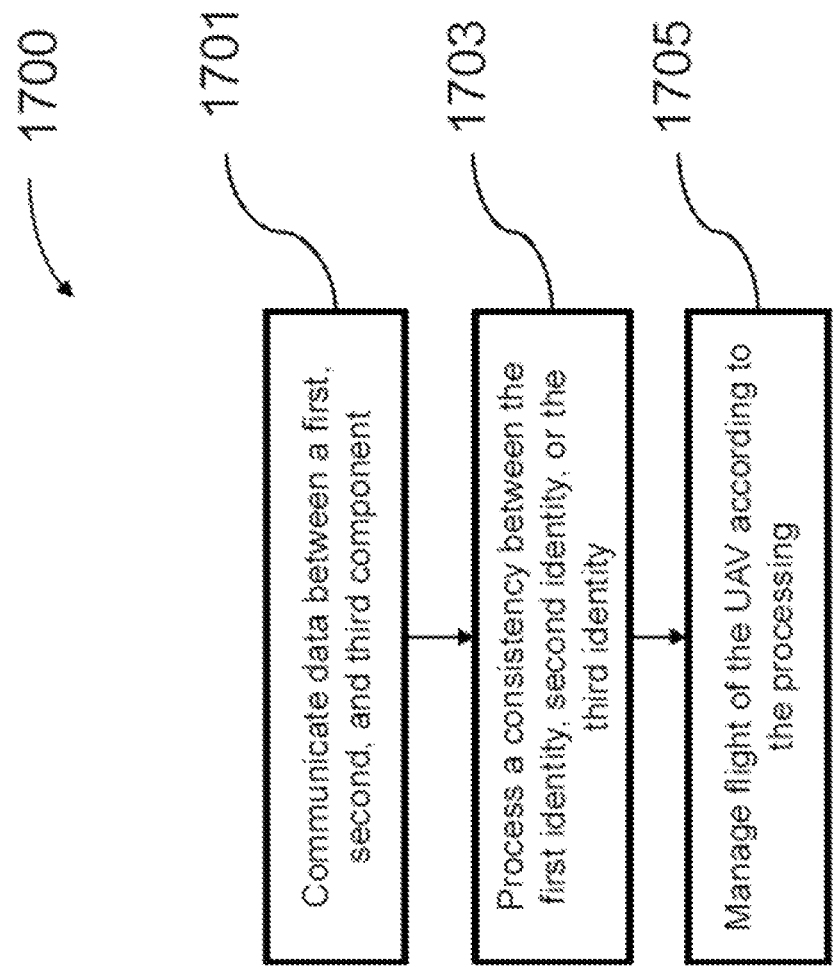
FIG. 17 illustrates a method for managing a flight of an unmanned aerial vehicle (UAV), in accordance with embodiments.

FIG. 17 illustrates a method for managing a flight of an unmanned aerial vehicle (UAV), in accordance with embodiments. In step 1701, data is communicated between a first component having a first identity, a second component having a second identity, and a third component having a third identity.

The data may comprise information regarding the first identity, the second identity, and/or the third identity. Each of the first component, second component, and third component may be components utilized in operation of the UAV. For example, the first, second, and third components may comprise a UAV, manual controller, mobile device, sensors, identity matching module, storage modules, etc. In some aspects, the first component, the second component, and/or the third component comprise a controller of the UAV. Alternatively or in addition, the first component, the second component, and/or the third component comprise a flight controller and a mobile device operably coupled to the UAV. In some instances, the first component, the second component, and/or the third component comprise a flight controller and a sensor on board the UAV. Alternatively or in addition, the first component, the second component, and/or the third component comprise a flight controller and a payload on board the UAV. Optionally, the first component may be configured to transmit data with five or more components comprising five or more corresponding identities. The different components may comprise two or more different owners.

Steps 1703-1705 may be implemented individually or collectively with aid of one or more processors. In step 1703, a consistency between the first identity, the second identity, and/or the third identity may be processed. In some aspects, the processing may be according to information in a database, substantially as described elsewhere. For example, a database comprising data regarding a relationship between the first identity, the second identity, and the third identity may be utilized as part of a UAV system. The relationship may indicate whether the different identities are meant to be utilized in concert. The relationship between the first identity, the second identity, and/or the third identity may be configurable by a user. Optionally, the user is an owner of the UAV or a manger of the UAV. In some instances, the one or more processors may process a consistency between (a) the first component and the second component, and (b) the first component and the third component. In some instances, the relationship between the different identities may be specific for a given operator of the UAV. For example, the first identity and the second identity may be configured to be utilized in conjunction for a first operator, but not a second operator. Optionally, the one or more processors may be configured to process a consistency between five or more identities.

In step 1705, the flight of the UAV may be managed according to the processing. Managing the flight of the UAV may comprise imposing a restriction on flight of the UAV. In some instances, flight regulations may be imposed if the consistency between the first identity, the second identity, and/or the third identity cannot be verified. Various flight regulations (e.g. restrictions) may be imposed. In some instances, the restriction comprises a prevention of taking off of the UAV. In some instances, the restriction comprises a warning signal, e.g. a visual, sensory, and/or auditory signal. Optionally, the restriction comprises a restriction on a flight time of the UAV, a restriction on a flight distance and/or a flight area of the UAV, or a restriction on a velocity, altitude, and/or acceleration of the UAV. In some instances, the restriction is specific to a component, and not the UAV. For example, the restriction may comprise restricting an operational parameter of the second component or the third component. Optionally, the restriction comprises disabling the second component or the third component. In some aspects, the restriction comprises restricting an operational mode of the UAV, such as an autonomous mode of the UAV.

In some instances, a system for managing a flight of an unmanned aerial vehicle (UAV) is provided. The system may be capable of performing the method of 1700 and may comprise: a first component utilized in operation of the UAV, the first component having a first identity and configured to communicate data with a second component having a second identity, wherein the data, utilized in operation of the UAV, comprise information regarding the first identity and the second identity; one or more processors, individually or collectively, configured to: process a consistency between the first identity, the second identity, and/or the third identity; and manage the flight of the UAV according to the processing.

In other instances, a non-transitory computer readable medium for managing a flight of an unmanned aerial vehicle (UAV) is provided. The computer readable medium may be capable of performing the method of 1700 and may comprise code, logic, or instructions to: communicate data between a first component having a first identity and (a) a second component having a second identity, and (b) third component having a third identity, wherein the data comprises information regarding the first identity, the second identity, and/or the third identity and wherein each of the first component, second component, and third component is utilized in operation of the UAV; with aid of one or more processors, individually or collectively, process a consistency between the first identity, the second identity, and/or the third identity; and manage the flight of the UAV according to the processing.

Workflows for Registration, Management, and Authentication

As previously described herein, a platform may be provided for users to register, manage, and/or authenticate UAV components and/or relevant users. The platform may provide an efficient approach of managing and tracking UAV components and/or determining an identity of any UAV involved in accidents or in violation of the law. In some instances, different jurisdictions may comprise different requirements for registration, management, and/or authentication.

For example, a first type of region may have no mandatory requirements for registering and/or authenticating UAV components and/or users (e.g. operators). The first type of region may not require real identity information and a user may register with real identity information or any other identity information (e.g. email address, account identity, etc).

A second type of region may have mandatory requirements for registering and/or authenticating UAV components and/or users (e.g. operators). The second type of region may further require registration of identity on-site. No online interface of authentication may be available. In some instances, real identity information may be required (e.g. real name, credit card, social security number, etc). The second type of region may require the identity of operators and/or UAV components to be registered and authenticated in real name. It may not be necessary to store the identity of operators in the UAV components, and the identity of operators and/or UAV components may be registered with the platform provided by relevant authorities or UAV manufacturers. Alternatively, the second type of region may require the real identity of operators and further require the real identity to be stored with the UAV components. Optionally, in view of privacy protection, once the operator is authenticated by the relevant authority, or authentication system, a certificate containing no real information of the operator may be issued to the operator. In some instances, the certificate may be a paper-based certificate, an operator code, etc. The operator may register the UAV components by using the certificate. Alternatively the second type of region may require the real name of the operator for registration and/or operation of UAV components, and the user may be required to register and operate the UAV with his or her real name.

In a third type of region may have mandatory requirements for UAV components and/or user authentication. An online interface, such as the platform and database substantially described herein, may be utilized for authenticating an identity of operators or UAV components in accordance with requirements of the jurisdiction. In some instances, identity may be registered and authenticated on-site, by using real identity certificates or equivalents. Alternatively or in addition, identity may be registered and authenticated online.

In a fourth type of region a user may register online the identity information (e.g. of the UAV components and/or users) through the platform provided by relevant authorities or UAV manufacturers. In addition, the authentication may be handled (e.g. exclusively) through the online platform.

For the different types of regions, more than one method of registration and/or authentication may be supported. Additionally, it is to be understood that the various types are offered as examples of different regions that may have different requirements for registration and/or authentication and that countless other types of regions may exist.

As provided above, different types of regions may require different types of information, e.g. for registration of identity information or authentication purposes. Various types of information that may be submitted for the identity registration and/or authentication may include, but is not limited to: a) non-real-name identity information such as email, phone number, social network/online messenger account; b) pseudo real-name identity information such as paper-based identity certificate, account/password, identity codes, identity registration keys, account/password transmitted by email or mobile devices, activation codes or internet links, credit card/bank cards, etc; c) real name identity information such as identity cards, driver's license, finger prints, retina information, photo/video information, social security or medical cards, social security numbers, work permits, student cards, military officer certificate, etc.

Different types of regions may comprise different registration, management, or authentication requirements. Different types of regions may require different types of information, e.g. identity information. Accordingly, it may be beneficial to provide a platform that can identify and determine a relevant workflow for a user's identity registration, authentication and management according to a relevant information, herein referred to as a trigger information. The trigger information may comprise a location information, nation information and/or corporation or organization information of the UAV system. In some instances, such trigger information may be provided by an internet address of the user, mobile communications network of the user, by the UAV system itself, or by a manufacturer of the UAV components in operation. In some instances, the automatic identifying and determining of the relevant workflow may be mandatory. Alternatively, the automatic identifying and determining of the relevant workflow may be optional and may be opted in or out by the user. In some instances, the process may be preset according to the jurisdiction the UAV is operating in, a type of UAV or UAV component in operation, a model of UAV or UAV component, operating conditions (e.g. non-restricted airspace operation, integrated airspace operation, line-of-sight operation, beyond line-of-sight operation, densely populated area operation, and other operation types based on a risk level), and/or a type of operator (e.g. public operation, civil operation, aviation model operation, consumer operation, commercial operation, etc).

In some instances if an incorrect workflow is presented to the user for registering, authenticating, or managing the UAV components or the users, an avenue for the user to provide a feedback or complaint to a relevant authority (e.g. jurisdictional authority) or UAV manufacturer may be provided. The user's feedback or complaint may be automatically provided to the relevant authority (e.g. jurisdictional authority) or UAV manufacturer to be confirmed and processed.

Workflow Management Process

Figure 18:
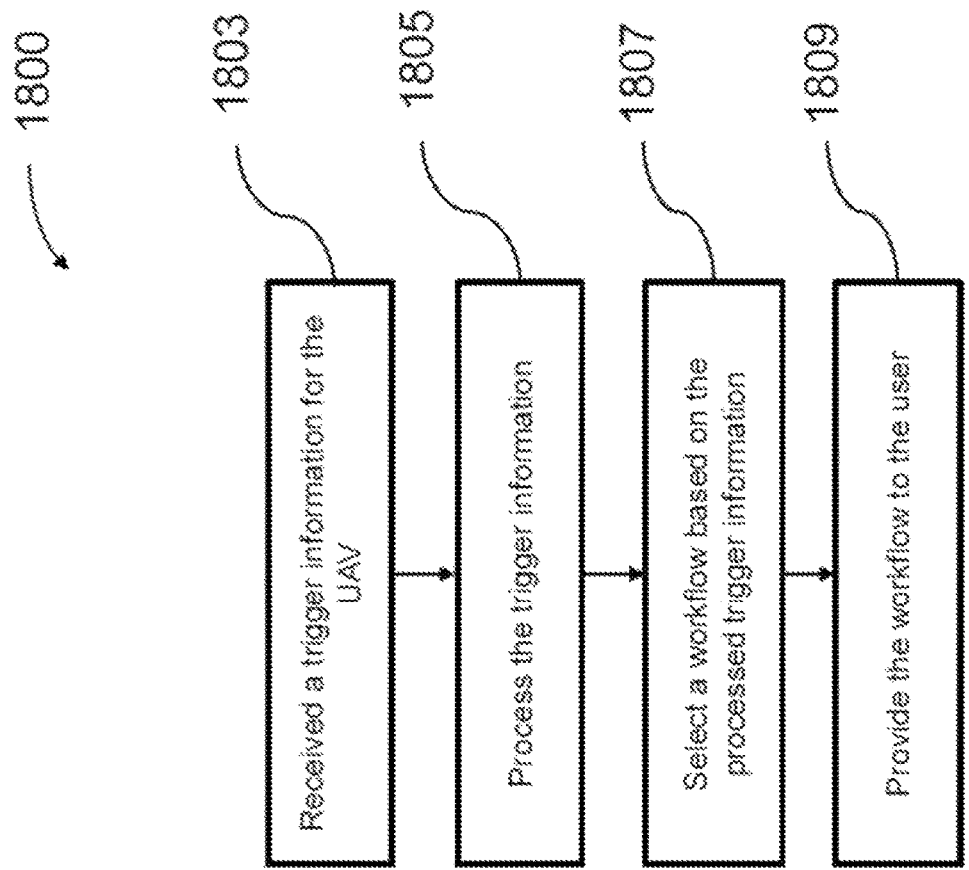
FIG. 18 illustrates a method for providing a workflow to a user of an unmanned aerial vehicle (UAV), in accordance with embodiments.

FIG. 18 illustrates a method for providing a workflow to a user of an unmanned aerial vehicle (UAV), in accordance with embodiments. In step 1801, a trigger information for the UAV may be received at one or more receivers. The trigger information may refer to any information that can be utilized in providing a relevant workflow to the user. The trigger information may comprise a location information of the UAV, a jurisdictional information of the UAV, an organizational information of the UAV, an ownership information of the UAV, an operator information of the UAV, an environmental information the UAV is operating in, a model information of the UAV, and/or an internet address of the user, UAV system, or UAV manufacturers. In some instances, the trigger information is provided by a mobile communications network of the user, UAV system, or UAV manufacturers.

Steps 1803-1807 may be implemented, individually or collectively, with aid of one or more processors. In step 1803, the trigger information may be processed.

In step 1805, the workflow may be selected based on the processed trigger information. The workflow may be a relevant workflow for the user, given the type of region the user is operating in. In some instances, the workflow may be selected from two or more workflows, or a plurality of workflows. The workflow may determine a process by which the user registers, authenticates, and/or manages the UAV. In some instances, the two or more workflows may differ in at least a type of identity information that is required for the UAV. As described elsewhere herein, the type of identity information may comprise a non-real name identity information, a pseudo real-name identity information, and real name identity information. Alternatively or in addition, the two or more workflows may differ in at least a method of registering that is required for the UAV. For example, the two or more workflows may differ in a number of inputs that is required by the user for registering the UAV, or may differ in a type of information that is required from the user for registering the UAV. In some instances, the two or more workflows may differ in at least a method of authentication that is required for the UAV. For example, the two or more workflows may differ in a number of inputs by the user required for authenticating the UAV, or may differ in a type of information required from the user for authenticating the UAV. In some instances, the two or more workflows may differ in at least a method of managing information regarding the UAV at a database. For example, the two or more workflows may differ in a number of inputs by the user required for managing the information at the database, or may differ in a type of information that is required from the user for managing the information at the database. The database may be a cloud based database. Optionally, the workflow, or relevant workflow, may be selected from three, four, five, six, seven, eight, nine, ten, fifteen, twenty, thirty, fifty, one-hundred, or more different workflows. In some instances, the workflow may be selected from a plurality of different workflows.

In step 1807, the workflow may be provided to the user. Accordingly, the user may automatically be provided with a workflow that is relevant for the type of region the UAV or the user is operating in such that the user may submit a relevant type of information or undergo an appropriate process for registering, authenticating, and/or managing identities (e.g. UAV component identities, user identities, etc) or permission parameters. Optionally, a feedback mechanism may be provided to receive feedback from the user regarding the workflow, e.g. whether the workflow is correctly provided, etc.

In some instances, a system for supporting unmanned aerial vehicle (UAV) workflow management for a user is provided. The system may be capable of performing the method of 1800 and may comprise: one or more receivers configured to receive a trigger information for the UAV; one or more processors, individually or collectively configured to, process the trigger information; select a workflow from a plurality of workflows based on the processed trigger information, wherein the selected workflow determines a process by which the user registers, authenticates, and/or manages the UAV; provide the workflow to the user In some instances, a non-transitory computer readable medium for managing a flight of an unmanned aerial vehicle (UAV) for a user is provided. The computer readable medium may be capable of performing the method of 1800 and may comprise code, logic, or instructions to: receive, at one or more receivers, a trigger information for the UAV; with aid of one or more processors, individually or collectively, process the trigger information; select the workflow based on the processed trigger information, wherein the workflow is selected from two or more workflows, and wherein the workflow determines a process by which the user registers, authenticates, and/or manages the UAV; and provide the workflow to the user.

Blacklist Mechanism

In some instances, a user may be pre-registered to operate the UAV components. Optionally, only users pre-registered to operate the UAV may be authorized to operate the UAV components. The users may be a registered owner, manager, or operator of the UAV components. When a user purchases or receives the UAV, the user may register as an owner and/or operator of the UAV. In some instances, multiple users may be able to register as an owner and/or operator of the UAV. Alternatively, only a single user may be able to register as an owner and/or operator of the UAV. The single user may be able to designate one or more other users (e.g. manager, operators, lower authority level users) that are permitted to operate the UAV. In some instances, only users who have user identifiers that have been registered to operate the UAV may be authorized to operate the UAV components. One or more registration databases, referred throughout as databases, may store information about registered users that are permitted to operate the UAV components. The registration database may be on-board the UAV or off-board the UAV. The user identifier may be compared with the information in the registration database and the user may only be permitted to operate the UAV if the user identifier matches a user identifier associated with the UAV in the registration database. The registration database may be specific to a UAV. For example, a first user may be pre-registered to operate UAV1, but may not be pre-registered to operate UAV2. The user may then be permitted to operate UAV1, but may not be permitted operate UAV2. In some instances, the registration database may be specific to a type of UAV (e.g., all UAVs of a particular model).

In other instances, the registration database may be open, regardless of UAVs. For instance, users may be pre-registered as operators of UAVs. The users may be permitted to fly any UAV, as long as those specific UAVs don't have any other requirements for authorization.

Alternatively, a UAV may default to permitting all users to operate the UAV. All users may be authorized to operate the UAV. In some instances, all users who are not on a 'blacklist' may be authorized to operate the UAV. Thus, when determining whether a user is authorized to operate the UAV, a user may be authorized to operate the UAV as long as the user is not on a blacklist. Alternatively, users on a blacklist may be prevented from being granted permission to operate UAV components. For example, managers may be unable to grant permission to operate UAV components to users listed on a blacklist. One or more blacklist databases may store information about users that are not permitted to operate UAV components. The blacklist database may store users identifiers of users not permitted to operate the UAV components. The blacklist database may be on-board UAV or off-board UAV. The user identifier may be compared with the information in the blacklist database, and the user may only be permitted to operate the UAV components if the user identifier does not match a user identifier in the blacklist database. The blacklist registration may be specific to a UAV components. For example, users may be blacklisted from flying a first UAV, but may not be blacklisted from flying a second UAV. As another example, users may be blacklisted from utilizing a first remote controller to fly a first UAV but may not be blacklisted from utilizing a second remote controller to fly the first UAV. In some instances, the blacklist registration may be specific to a UAV type. For instance, users may not be permitted to fly a UAV of a particular module, while the users are permitted to fly UAVs of other models. Alternatively, the blacklist registration need not be specific to a UAV or UAV type. The blacklist registration may be applicable to all UAVs or UAV components. For example, if a user is banned from operating any UAV components, then regardless of the UAV identity or type, the user may not be authorized to operate the UAV, and operation of the UAV may not be permitted. In some instances, the blacklist registration may be specific to users (e.g. owners, managers, etc). For example, if a user is banned from operating a UAV component owned by a certain other user, the user may also be banned from operating any UAV components owned by the certain other user.

The pre-registration or blacklist registration may also apply to other factors. For instance, the pre-registration or blacklist registration may apply to particular locations or jurisdictions. For instance, a user may be pre-registered to operate UAV components within a first jurisdiction while not being pre-registered to operate UAV components within a second jurisdiction. For instance, a user may be blacklisted from operating UAV components within a given jurisdiction. In another example, the pre-registration or backlist registration may apply to particular climate conditions. For instance, a user may be blacklisted from operating UAV components when wind speeds exceed 30 mph. In another example, other environmental conditions, such as environmental complexity, population density, or air traffic may be considered.

Additional Considerations for Operating UAV Components

Additional considerations of whether a user is authorized to operate a UAV may depend on user type. For example, user skill or experience level may be considered in determining whether the user is authorized to operate the UAV. Information about a user, such as user type, may be associated with a user identifier. When considering whether the user is authorized to operate the UAV, information about the user may be considered, such as user type. In one example, a user may only be authorized to operate the UAV if the user has met a threshold skill level. For instance, the user may be authorized to operate the UAV if the user has undergone training for UAV flight. In another example, the user may be authorized to operate the UAV if the user has undergone certification that the user has certain flight skills. In another example, the user may only be authorized to operate the UAV if the user has met a threshold experience level. For instance, the user may be authorized to operate the UAV if the user has logged at least a certain threshold number of units of time in flight. In some instances, the threshold number may apply to units of time in flight to any UAV, or only UAVs of the type matching the UAV. Information about the user may include demographic information about the user. For example, the user may only be authorized to operate the UAV if the user has reached a threshold age (e.g., is an adult). The information about the user and/or the UAV may be pulled and may be considered with aid of one or more processors in determining whether the user is authorized to operate the UAV. One or more considerations may be made in accordance with non-transitory computer readable media in determining whether the user is authorized to operate the UAV.

As previously described, additional factors may be considered in determining whether a user is authorized to operate the UAV, such as geographic factors, time factors, or environmental factors. For instance, only some users may be authorized as operating the UAV during the night, while other users may be authorized to operate the UAV during the day only. In one example, a user who has undergone night flight training may be authorized to operate the UAV during both the day and the night, while a user show has not undergone night flight training may only be authorized to operate the UAV during the day.

In some instances, different modes of UAV authorization may be provided. For example, in a pre-registration mode, only pre-registered users may be authorized to fly the UAV. In an open mode, all users may be authorized to fly the UAV. In a skill-based mode, only users that have exhibited a certain level of skill or experience may be permitted to fly the UAV. In some instances, a single mode may be provided for user authorization. In other instances, a user may be to switch between modes of user operation. For example, an owner of the UAV may switch the authorization mode under which the UAV is to function. In some instances, other factors, such as location of the UAV, time, level of air traffic, environmental conditions, may determine the authorization mode under which the UAV is to function. For example, if the environmental conditions are very windy or difficult in which to fly, the UAV may automatically only permit users that are authorized under a skill mode to fly the UAV.

When a user is not authorized to operate a UAV, the user is not permitted to operate the UAV. In some instances, this may result in the UAV not responding to a command from the user and/or a remote controller of the user. The user may not be able to cause the UAV to fly, or control flight of the UAV. The user may not be able to control any other component of the UAV, such as payload, carrier, sensors, communication unit, navigation unit, or power unit. The user may or may not be able to power the UAV on. In some instances, the user may power a UAV on, but the UAV may not respond to the user. If the user is not authorized, the UAV may optionally power itself off. In some instances, an alert or message may be provided to the user that the user is not authorized to operate the UAV. A reason the user is not authorized may or may not be provided. Optionally, an alert or message may be provided to a second user that the user is not authorized to operate the UAV, or that an attempt has been made by the user to operate the UAV. The second user may be an owner or operator of the UAV. The second user may be an individual who is authorized to operate the UAV. The second user may be an individual that exercises control over the UAV.

In some alternative embodiments, when a user is not authorized to operate a UAV, the user may only be permitted to operate the UAV in a restricted manner. This may include geographic restrictions, time restrictions, speed restrictions, restrictions on use of one or more additional components (e.g., payload, carrier, sensor, communication unit, navigation unit, power unit, etc.). This may include a mode of operation. In one example, when a user is not authorized to operate a UAV, the user may not operate the UAV at selected locations. In another example, when a user is not authorized to operate a UAV, the user may only operate the UAV at selected locations.

The systems, devices, and methods described herein can be applied to a wide variety of objects, including movable objects and stationary objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 23:
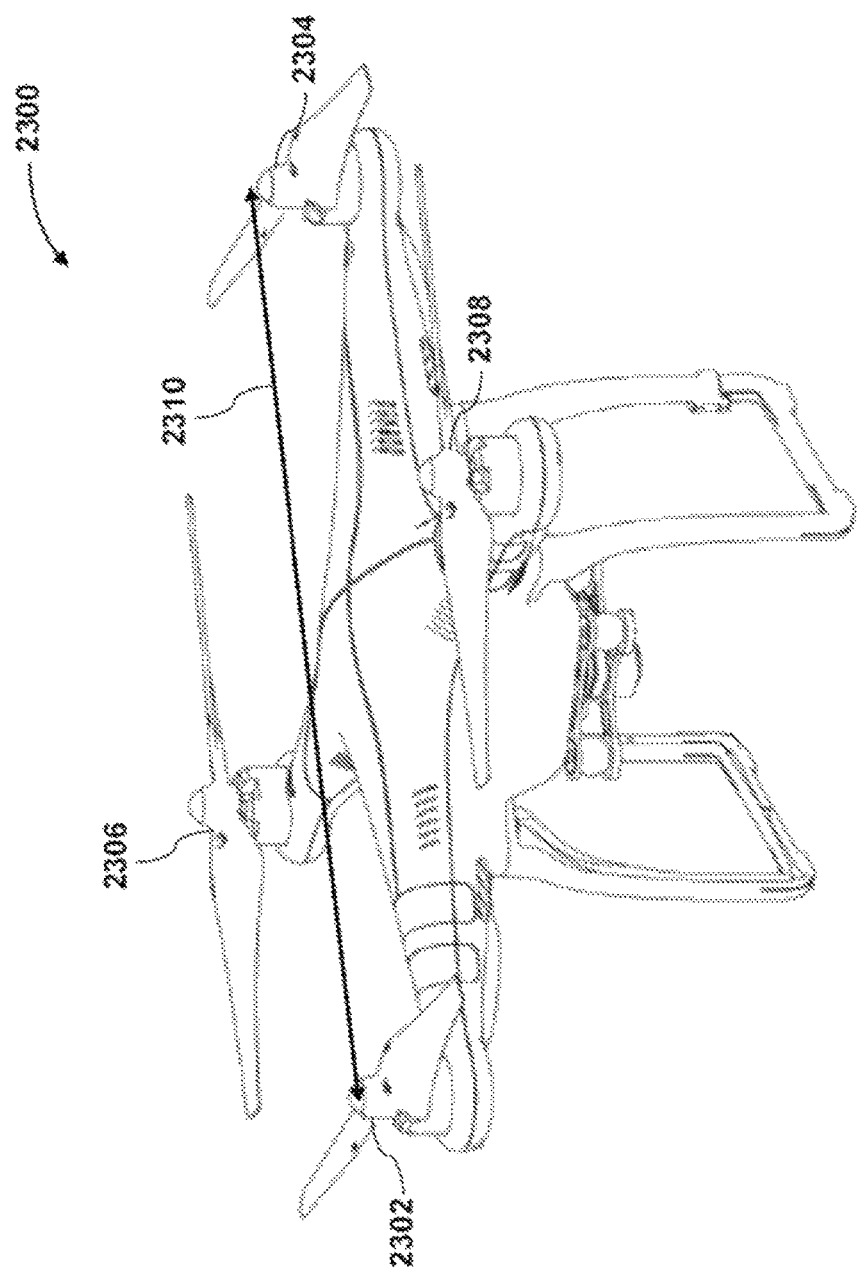
FIG. 23 illustrates an unmanned aerial vehicle (UAV), in accordance with embodiments of the present disclosure.

FIG. 23 illustrates an unmanned aerial vehicle (UAV) 2300, in accordance with embodiments. The UAV may be an example of a movable object as described herein, to which the method and apparatus of discharging a battery assembly may be applied. The UAV 2300 can include a propulsion system having four rotors 2302, 2304, 2306, and 2308. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 2310. For example, the length 2310 can be less than or equal to 2 m, or less than equal to 5 m. In some embodiments, the length 2310 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 24:
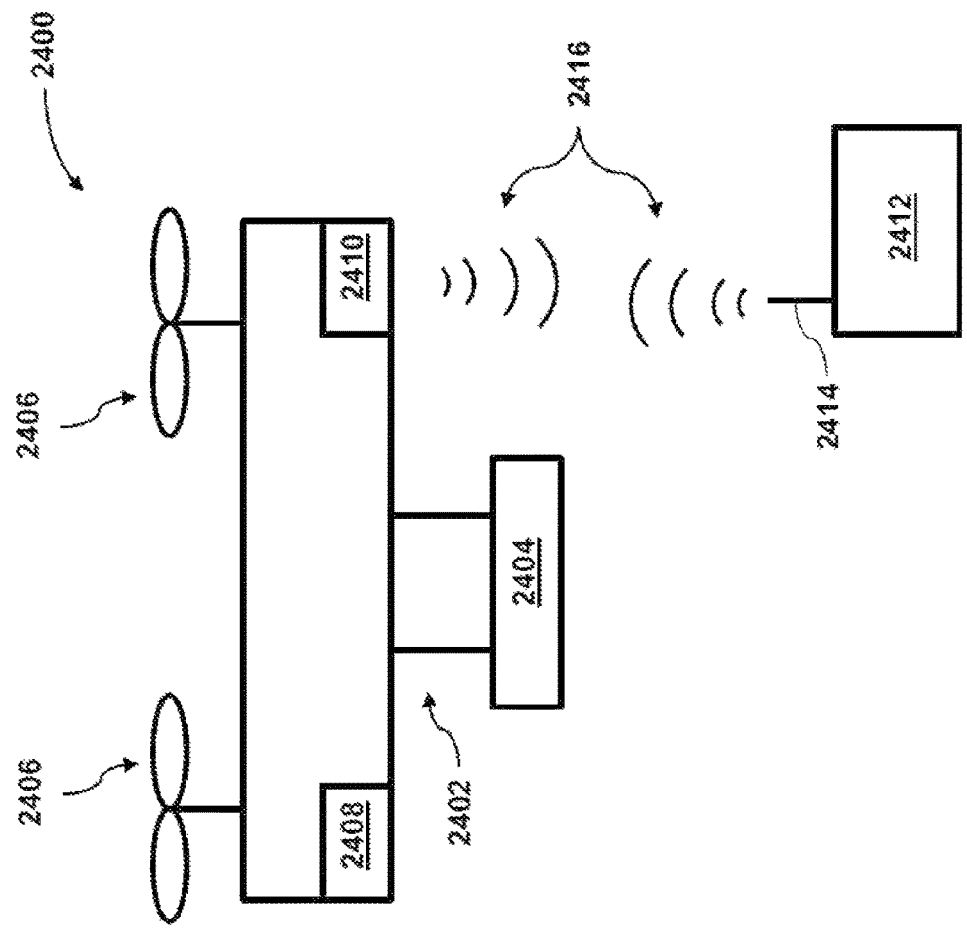
FIG. 24 illustrates a movable object including a carrier and a payload, in accordance with embodiments.

FIG. 24 illustrates a movable object 2400 including a carrier 2402 and a payload 2404, in accordance with embodiments. Although the movable object 2400 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 2404 may be provided on the movable object 2400 without requiring the carrier 2402. The movable object 2400 may include propulsion mechanisms 2406, a sensing system 2408, and a communication system 2410.

The propulsion mechanisms 2406 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 2406 can be mounted on the movable object 2400 using any suitable means, such as a support element (e.g., a drive shaft) as described elsewhere herein. The propulsion mechanisms 2406 can be mounted on any suitable portion of the movable object 2400, such on the top, bottom, front, back, sides, or suitable combinations thereof.

In some embodiments, the propulsion mechanisms 2406 can enable the movable object 2400 to take off vertically from a surface or land vertically on a surface without requiring any horizontal movement of the movable object 2400 (e.g., without traveling down a runway). Optionally, the propulsion mechanisms 2406 can be operable to permit the movable object 2400 to hover in the air at a specified position and/or orientation. One or more of the propulsion mechanisms 2400 may be controlled independently of the other propulsion mechanisms. Alternatively, the propulsion mechanisms 2400 can be configured to be controlled simultaneously. For example, the movable object 2400 can have multiple horizontally oriented rotors that can provide lift and/or thrust to the movable object. The multiple horizontally oriented rotors can be actuated to provide vertical takeoff, vertical landing, and hovering capabilities to the movable object 2400. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 2400 (e.g., with respect to up to three degrees of translation and up to three degrees of rotation).

The sensing system 2408 can include one or more sensors that may sense the spatial disposition, velocity, and/or acceleration of the movable object 2400 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 2408 can be used to control the spatial disposition, velocity, and/or orientation of the movable object 2400 (e.g., using a suitable processing unit and/or control module, as described below). Alternatively, the sensing system 2408 can be used to provide data regarding the environment surrounding the movable object, such as weather conditions, proximity to potential obstacles, location of geographical features, location of manmade structures, and the like.

The communication system 2410 enables communication with terminal 2412 having a communication system 2414 via wireless signals 2416. The communication systems 2410, 2414 may include any number of transmitters, receivers, and/or transceivers suitable for wireless communication. The communication may be one-way communication, such that data can be transmitted in only one direction. For example, one-way communication may involve only the movable object 2400 transmitting data to the terminal 2412, or vice-versa. The data may be transmitted from one or more transmitters of the communication system 2410 to one or more receivers of the communication system 2412, or vice-versa. Alternatively, the communication may be two-way communication, such that data can be transmitted in both directions between the movable object 2400 and the terminal 2412. The two-way communication can involve transmitting data from one or more transmitters of the communication system 2410 to one or more receivers of the communication system 2414, and vice-versa.

In some embodiments, the terminal 2412 can provide control data to one or more of the movable object 2400, carrier 2402, and payload 2404 and receive information from one or more of the movable object 2400, carrier 2402, and payload 2404 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 2406), or a movement of the payload with respect to the movable object (e.g., via control of the carrier 2402). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 2408 or of the payload 2404). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 2412 can be configured to control a state of one or more of the movable object 2400, carrier 2402, or payload 2404. Alternatively or in combination, the carrier 2402 and payload 2404 can also each include a communication module configured to communicate with terminal 2412, such that the terminal can communicate with and control each of the movable object 2400, carrier 2402, and payload 2404 independently.

In some embodiments, the movable object 2400 can be configured to communicate with another remote device in addition to the terminal 2412, or instead of the terminal 2412. The terminal 2412 may also be configured to communicate with another remote device as well as the movable object 2400. For example, the movable object 2400 and/or terminal 2412 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 2400, receive data from the movable object 2400, transmit data to the terminal 2412, and/or receive data from the terminal 2412. Optionally, the remote device can be connected to the Internet or other telecommunications network, such that data received from the movable object 2400 and/or terminal 2412 can be uploaded to a website or server.

Figure 25:
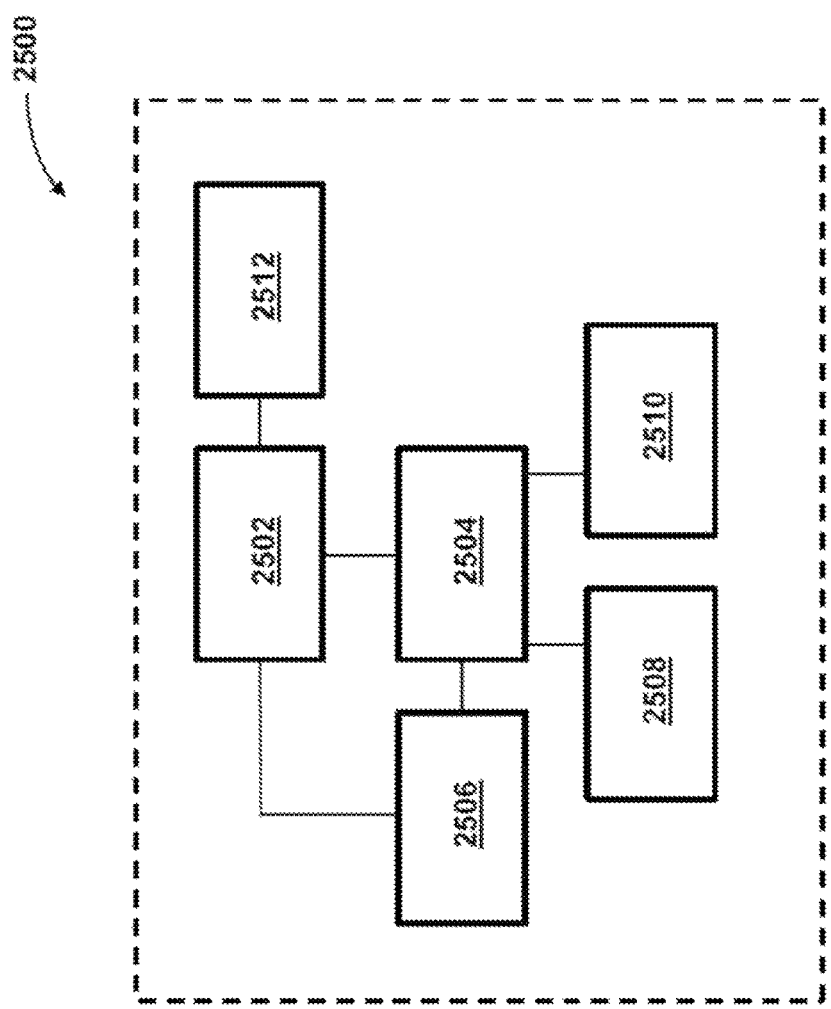
FIG. 25 is a schematic illustration by way of block diagram of a system for controlling a movable object, in accordance with embodiments.

FIG. 25 is a schematic illustration by way of block diagram of a system 2500 for controlling a movable object, in accordance with embodiments. The system 2500 can be used in combination with any suitable embodiment of the systems, devices, and methods disclosed herein. The system 2500 can include a sensing module 2502, processing unit 2504, non-transitory computer readable medium 2506, control module 2508, and communication module 2510.

The sensing module 2502 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 2502 can be operatively coupled to a processing unit 2504 having a plurality of processors. In some embodiments, the sensing module can be operatively coupled to a transmission module 2512 (e.g., a Wi-Fi image transmission module) configured to directly transmit sensing data to a suitable external device or system. For example, the transmission module 2512 can be used to transmit images captured by a camera of the sensing module 2502 to a remote terminal.

The processing unit 2504 can have one or more processors, such as a programmable processor (e.g., a central processing unit (CPU)). The processing unit 2504 can be operatively coupled to a non-transitory computer readable medium 2506. The non-transitory computer readable medium 2506 can store logic, code, and/or program instructions executable by the processing unit 2504 for performing one or more steps. The non-transitory computer readable medium can include one or more memory units (e.g., removable media or external storage such as an SD card or random access memory (RAM)). In some embodiments, data from the sensing module 2502 can be directly conveyed to and stored within the memory units of the non-transitory computer readable medium 2506. The memory units of the non-transitory computer readable medium 2506 can store logic, code and/or program instructions executable by the processing unit 2504 to perform any suitable embodiment of the methods described herein. For example, the processing unit 2504 can be configured to execute instructions causing one or more processors of the processing unit 2504 to analyze sensing data produced by the sensing module. The memory units can store sensing data from the sensing module to be processed by the processing unit 2504. In some embodiments, the memory units of the non-transitory computer readable medium 2506 can be used to store the processing results produced by the processing unit 2504.

In some embodiments, the processing unit 2504 can be operatively coupled to a control module 2508 configured to control a state of the movable object. For example, the control module 2508 can be configured to control the propulsion mechanisms of the movable object to adjust the spatial disposition, velocity, and/or acceleration of the movable object with respect to six degrees of freedom. Alternatively or in combination, the control module 2508 can control one or more of a state of a carrier, payload, or sensing module.

The processing unit 2504 can be operatively coupled to a communication module 2510 configured to transmit and/or receive data from one or more external devices (e.g., a terminal, display device, or other remote controller). Any suitable means of communication can be used, such as wired communication or wireless communication. For example, the communication module 2510 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 2510 can transmit and/or receive one or more of sensing data from the sensing module 2502, processing results produced by the processing unit 2504, predetermined control data, user commands from a terminal or remote controller, and the like.

The components of the system 2500 can be arranged in any suitable configuration. For example, one or more of the components of the system 2500 can be located on the movable object, carrier, payload, terminal, sensing system, or an additional external device in communication with one or more of the above. Additionally, although FIG. 25 depicts a single processing unit 2504 and a single non-transitory computer readable medium 2506, one of skill in the art would appreciate that this is not intended to be limiting, and that the system 2500 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 2500 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A system for managing an unmanned aerial vehicle (UAV), the system comprising:
 one or more storage media storing offline data that comprises verified information associated with a user;
 an input device configured to receive an input from the user;
 a flight regulation module configured to:
  generate or suggest a set of flight plans for the UAV that comply with a set of flight regulations;

suggest modifications to a first candidate flight plan to put the first candidate flight plan in compliance with the set of flight regulations; and reject a second candidate flight plan that is in contradiction to the set of flight regulations for the UAV; and one or more processors, individually or collectively configured to:

determine whether a connection to an online database is established; and upon determining that the connection to the database is not established:

process the input and the offline data to at least determine an inconsistency between the input and the offline data according to a predetermined criterion, the inconsistency being associated with a degree of deviation from the predetermined criterion; and impose a restriction to a flight of the UAV according to the inconsistency between the input and the offline data, a degree of the restriction being correlated with the degree of deviation from the predetermined criterion.

2. The system of claim 1, wherein the one or more processors are configured to, upon determining that the connection to the database is established, (i) process the input and real-time data received from the database that comprises the verified information associated with the user, and (ii) manage the flight of the UAV according to the processing of the input and the real-time data.

3. The system of claim 1, wherein the one or more storage media are configured to store the offline data for a predetermined period of time.

4. The system of claim 1, wherein the one or more storage media are configured to store the offline data:
(i) at a predetermined location, or (ii) within a predetermined distance from the predetermined location; or
for up to a predetermined data capacity of the one or more storage media; or
for a predetermined operating session.

5. The system of claim 1, wherein:
the user is a first user;
the offline data further comprises verified information associated with a second user;
the input device is further configured to receive an input from the second user; and
the one or more processors are configured to manage a flight of the UAV for the second user.

6. The system of claim 1, wherein the verified information comprises a verified identity of the user, and/or a verified permission level of the UAV for the user.

7. The system of claim 1, wherein the one or more storage media are further configured to store flight data of the UAV.

8. The system of claim 7, further comprising a transmitter configured to transmit the flight data of the UAV to the database.

9. The system of claim 8, wherein the transmitter is configured to upload the flight data of the UAV to the database according to a predetermined uploading criterion.

10. The system of claim 9, wherein the predetermined uploading criterion is a change in time, a change in location, a change in data capacity of the one or more storage media, a beginning of an operating session, or an ending of the operating session.

11. The system of claim 1, wherein the one or more processors are configured to process the input and the offline data to check for a consistency between the input and the verified information.

12. The system of claim 1, wherein the one or more storage media are located on board a mobile device, on board the UAV, and/or on board a controller, and the offline data is stored locally on the mobile device, the UAV, and/or the controller having the one or more storage media.

13. The system of claim 1, wherein the one or more storage media comprise a cache memory.

14. The system of claim 1, wherein:
the input device comprises a fingerprint sensor or an image recognition device; or
the input device is configured to receive a user ID and a password from the user; or
the input device is configured to receive information about a credit card of the user.

15. The system of claim 1, wherein the database is a cloud based database.

16. The system of claim 1, wherein the predetermined criterion includes verifying a consistency at a predetermined time interval or processing the consistency within a predetermined change in distance of the UAV.

17. The system of claim 1, wherein:
the offline data includes identity information previously transmitted from the online database and stored in the one or more storage media; and
the input includes identity information entered by the user.

18. The system of claim 1, wherein the degree of the restriction increases as the inconsistency continues until the UAV is grounded or reports to a relevant authority.

19. A method for managing an unmanned aerial vehicle (UAV), the method comprising:
storing, at one or more storage media, offline data that comprises verified information associated with a user;
receiving, at an input device, an input from the user;
with aid of a flight regulation module:
generating or suggesting a set of flight plans for the UAV that comply with a set of flight regulations;
suggesting modifications to a first candidate flight plan to put the first candidate flight plan in compliance with the set of flight regulations; and
rejecting a second candidate flight plan that is in contradiction to the set of flight regulations for the UAV; and
with aid of one or more processors, individual or collectively:
determining whether a connection to the database is established; and
upon determining that the connection to the database is not established:
processing the input and the offline data to at least determine an inconsistency between the input and the offline data according to a predetermined criterion, the inconsistency being associated with a degree of deviation from the predetermined criterion; and
imposing restriction to a flight of the UAV according to the inconsistency between the input and the offline data, a degree of the restriction being correlated with the degree of deviation from the predetermined criterion.

20. A non-transitory computer readable medium for managing an unmanned aerial vehicle (UAV), the computer readable medium comprising code, logic, or instructions to:

store, at one or more storage media, offline data that comprises verified information associated with a user;

receive, at an input device, an input from the user;

with aid of a flight regulation module:
- generate or suggest a set of flight plans for the UAV that comply with a set of flight regulations;
- suggest modifications to a first candidate flight plan to put the first candidate flight plan in compliance with the set of flight regulations; and
- reject a second candidate flight plan that is in contradiction to the set of flight regulations for the UAV; and with aid of one or more processors, individual or collectively:
- determine whether a connection to the database is established; and
- upon determining that the connection to the database is not established:
  - process the input and the offline data to at least determine an inconsistency between the input and the offline data according to a predetermined criterion, the inconsistency being associated with a degree of deviation from the predetermined criterion; and
  - impose restriction to a flight of the UAV according to the inconsistency between the input and the offline data, a degree of the restriction being correlated with the degree of deviation from the predetermined criterion.

* * * * *